US012748499B2

(12) United States Patent
Holz

(10) Patent No.: US 12,748,499 B2
(45) Date of Patent: *Sep. 29, 2026

(54) SYSTEMS AND METHODS FOR MACHINE CONTROL

(71) Applicant: SIM IP HXR LLC, Sunny Isles Beach, FL (US)

(72) Inventor: David S. Holz, San Francisco, CA (US)

(73) Assignee: SIM IP HXR LLC, Sunny Isles Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/026,259

(22) Filed: Jan. 16, 2025

(65) Prior Publication Data

US 2025/0165079 A1 May 22, 2025

Related U.S. Application Data

(63) Continuation of application No. 18/209,259, filed on Jun. 13, 2023, now Pat. No. 12,260,023, which is a continuation of application No. 17/862,212, filed on Jul. 11, 2022, now Pat. No. 11,720,180, which is a continuation of application No. 16/908,643, filed on (Continued)

(51) Int. Cl.

| | |
|---|---|
| ***G06F 3/01*** | (2006.01) |
| ***G06F 3/03*** | (2006.01) |
| ***G06V 10/145*** | (2022.01) |
| ***G06V 40/10*** | (2022.01) |

(52) U.S. Cl.

CPC ............ *G06F 3/017* (2013.01); *G06F 3/0304* (2013.01); *G06V 10/145* (2022.01); *G06V 40/113* (2022.01); *G06F 2218/08* (2023.01)

(58) Field of Classification Search

CPC .... G06F 3/017; G06F 3/0304; G06F 2218/08; G06F 3/011; G06V 10/145; G06V 40/113; G06V 40/107; G06T 2207/10152; G06T 2207/30196

See application file for complete search history.

(56) References Cited

U.S. PATENT DOCUMENTS

| | | | |
|---|---|---|---|
| 2,665,041 | A | 1/1954 | Maffucci |
| 3,064,704 | A | 11/1962 | Fabien |

(Continued)

FOREIGN PATENT DOCUMENTS

| | | | |
|---|---|---|---|
| BE | 1014643 | A3 | 2/2004 |
| CA | 2479564 | C | 7/2009 |

(Continued)

OTHER PUBLICATIONS

Barat et al., "Feature Correspondences From Multiple Views of Coplanar Ellipses", 2nd International Symposium on Visual Computing, Author Manuscript, 2006, 10 pages.

(Continued)

*Primary Examiner* — Ibrahim A Khan
(74) *Attorney, Agent, or Firm* — ALSTON & BIRD LLP

(57) ABSTRACT

A region of space may be monitored for the presence or absence of one or more control objects, and object attributes and changes thereto may be interpreted as control information provided as input to a machine or application. In some embodiments, the region is monitored using a combination of scanning and image-based sensing.

20 Claims, 15 Drawing Sheets

Related U.S. Application Data

Jun. 22, 2020, now Pat. No. 11,493,998, which is a continuation of application No. 15/696,086, filed on Sep. 5, 2017, now Pat. No. 10,691,219, which is a continuation of application No. 15/392,920, filed on Dec. 28, 2016, now Pat. No. 9,778,752, which is a continuation of application No. 14/280,018, filed on May 16, 2014, now Pat. No. 9,679,215, which is a continuation-in-part of application No. 14/106,140, filed on Dec. 13, 2013, now Pat. No. 9,153,028, which is a continuation of application No. 13/742,953, filed on Jan. 16, 2013, now Pat. No. 8,638,989, which is a continuation-in-part of application No. 13/414,485, filed on Mar. 7, 2012, now abandoned, and a continuation-in-part of application No. 13/724,357, filed on Dec. 21, 2012, now Pat. No. 9,070,019, said application No. 14/280,018 is a continuation-in-part of application No. 14/212,485, filed on Mar. 14, 2014, now abandoned, said application No. 14/280,018 is a continuation-in-part of application No. 14/154,730, filed on Jan. 14, 2014, now Pat. No. 9,501,152, and a continuation-in-part of application No. 14/250,758, filed on Apr. 11, 2014, now abandoned, said application No. 13/724,357 is a continuation-in-part of application No. 13/414,485, filed on Mar. 7, 2012, now abandoned.

(60) Provisional application No. 61/724,891, filed on Nov. 9, 2012, provisional application No. 61/587,554, filed on Jan. 17, 2012, provisional application No. 61/792,025, filed on Mar. 15, 2013, provisional application No. 61/800,327, filed on Mar. 15, 2013, provisional application No. 61/801,479, filed on Mar. 15, 2013, provisional application No. 61/825,515, filed on May 20, 2013, provisional application No. 61/825,480, filed on May 20, 2013, provisional application No. 61/873,351, filed on Sep. 3, 2013, provisional application No. 61/816,487, filed on Apr. 26, 2013, provisional application No. 61/824,691, filed on May 17, 2013, provisional application No. 61/752,725, filed on Jan. 15, 2013, provisional application No. 61/752,731, filed on Jan. 15, 2013, provisional application No. 61/752,733, filed on Jan. 15, 2013, provisional application No. 61/791,204, filed on Mar. 15, 2013, provisional application No. 61/808,959, filed on Apr. 5, 2013, provisional application No. 61/808,984, filed on Apr. 5, 2013, provisional application No. 61/872,538, filed on Aug. 30, 2013, provisional application No. 61/873,758, filed on Sep. 4, 2013, provisional application No. 61/811,415, filed on Apr. 12, 2013, provisional application No. 61/886,586, filed on Oct. 3, 2013, provisional application No. 61/952,843, filed on Mar. 13, 2014, provisional application No. 61/877,641, filed on Sep. 13, 2013, provisional application No. 61/898,462, filed on Oct. 31, 2013.

(56) References Cited

U.S. PATENT DOCUMENTS

| | | | |
|---|---|---|---|
| 3,638,989 | A | 2/1972 | Sandquist |
| 3,768,022 | A | 10/1973 | Lang |
| 4,175,862 | A | 11/1979 | Dimatteo et al. |
| 4,631,676 | A | 12/1986 | Pugh |
| 4,876,455 | A | 10/1989 | Sanderson et al. |
| 4,879,659 | A | 11/1989 | Bowlin et al. |
| 4,891,749 | A | 1/1990 | Hoffman et al. |
| 4,893,223 | A | 1/1990 | Arnold |
| 4,894,551 | A | 1/1990 | Kishimoto et al. |
| 5,038,258 | A | 8/1991 | Koch et al. |
| 5,109,435 | A | 4/1992 | Lo et al. |
| 5,134,661 | A | 7/1992 | Reinsch |
| 5,282,067 | A | 1/1994 | Liu |
| 5,333,297 | A | 7/1994 | Lemaire et al. |
| 5,434,617 | A | 7/1995 | Bianchi |
| 5,454,043 | A | 9/1995 | Freeman |
| 5,538,013 | A | 7/1996 | Brannon |
| 5,574,511 | A | 11/1996 | Yang et al. |
| 5,581,276 | A | 12/1996 | Cipolla et al. |
| 5,594,469 | A | 1/1997 | Freeman et al. |
| 5,610,674 | A | 3/1997 | Martin |
| 5,613,071 | A | 3/1997 | Rankin et al. |
| 5,659,475 | A | 8/1997 | Brown |
| 5,691,737 | A | 11/1997 | Ito et al. |
| 5,734,590 | A | 3/1998 | Tebbe |
| 5,739,797 | A | 4/1998 | Karasawa et al. |
| 5,742,263 | A | 4/1998 | Wang et al. |
| 5,883,969 | A | 3/1999 | Le et al. |
| 5,900,863 | A | 5/1999 | Numazaki |
| 5,901,170 | A | 5/1999 | Peysakhovich et al. |
| 5,940,282 | A | 8/1999 | Oglesbee |
| 5,940,538 | A | 8/1999 | Spiegel et al. |
| 5,940,828 | A | 8/1999 | Anaya et al. |
| 5,983,909 | A | 11/1999 | Yeol et al. |
| 5,995,770 | A | 11/1999 | Rochford et al. |
| 6,002,808 | A | 12/1999 | Freeman |
| 6,016,510 | A | 1/2000 | Quattromani et al. |
| 6,031,161 | A | 2/2000 | Baltenberger |
| 6,031,568 | A | 2/2000 | Wakitani |
| 6,031,661 | A | 2/2000 | Tanaami |
| 6,072,494 | A | 6/2000 | Nguyen |
| 6,075,610 | A | 6/2000 | Ueda et al. |
| 6,075,892 | A | 6/2000 | Fan et al. |
| 6,075,895 | A | 6/2000 | Qiao et al. |
| 6,101,420 | A | 8/2000 | Vandoren et al. |
| 6,147,678 | A | 11/2000 | Kumar et al. |
| 6,154,558 | A | 11/2000 | Hsieh |
| 6,181,343 | B1 | 1/2001 | Lyons |
| 6,184,326 | B1 | 2/2001 | Razavi et al. |
| 6,184,926 | B1 | 2/2001 | Khosravi et al. |
| 6,195,104 | B1 | 2/2001 | Lyons |
| 6,204,852 | B1 | 3/2001 | Kumar et al. |
| 6,252,598 | B1 | 6/2001 | Segen |
| 6,256,033 | B1 | 7/2001 | Nguyen |
| 6,256,400 | B1 | 7/2001 | Takata et al. |
| 6,263,091 | B1 | 7/2001 | Jain et al. |
| 6,266,061 | B1 | 7/2001 | Doi et al. |
| 6,296,358 | B1 | 10/2001 | Cornsweet et al. |
| 6,298,143 | B1 | 10/2001 | Kikuchi et al. |
| 6,346,933 | B1 | 2/2002 | Lin |
| 6,417,866 | B1 | 7/2002 | Man et al. |
| 6,417,970 | B1 | 7/2002 | Travers et al. |
| 6,421,453 | B1 | 7/2002 | Kanevsky et al. |
| 6,463,402 | B1 | 10/2002 | Bennett et al. |
| 6,492,986 | B1 | 12/2002 | Metaxas et al. |
| 6,493,041 | B1 | 12/2002 | Hanko et al. |
| 6,498,628 | B2 | 12/2002 | Iwamura |
| 6,515,669 | B1 | 2/2003 | Mohri |
| 6,578,203 | B1 | 6/2003 | Anderson et al. |
| 6,597,801 | B1 | 7/2003 | Cham et al. |
| 6,602,475 | B1 | 8/2003 | Chiao |
| 6,603,867 | B1 | 8/2003 | Sugino et al. |
| 6,629,065 | B1 | 9/2003 | Gadh et al. |
| 6,661,918 | B1 | 12/2003 | Gordon et al. |
| 6,674,877 | B1 | 1/2004 | Jojic et al. |
| 6,702,494 | B2 | 3/2004 | Dumler et al. |
| 6,734,911 | B1 | 5/2004 | Lyons |
| 6,738,424 | B1 | 5/2004 | Allmen et al. |
| 6,738,871 | B2 | 5/2004 | Van et al. |
| 6,751,698 | B1 | 6/2004 | Deneroff et al. |
| 6,758,215 | B2 | 7/2004 | Begum |
| 6,771,294 | B1 | 8/2004 | Pulli et al. |
| 6,798,628 | B1 | 9/2004 | Macbeth |
| 6,804,654 | B2 | 10/2004 | Kobylevsky et al. |
| 6,804,656 | B1 | 10/2004 | Rosenfeld et al. |

(56) References Cited

U.S. PATENT DOCUMENTS 6,814,656 B2 11/2004 Rodriguez
6,819,796 B2 11/2004 Hong et al.
6,857,004 B1 2/2005 Howard et al.
6,901,170 B1 5/2005 Terada et al.
6,919,880 B2 7/2005 Morrison et al.
6,925,547 B2 8/2005 Scott et al.
6,931,146 B2 8/2005 Aoki et al.
6,950,534 B2 9/2005 Cohen et al.
6,981,074 B2 12/2005 Oner et al.
6,993,157 B1 1/2006 Oue et al.
7,136,205 B1 11/2006 Kaye
7,149,356 B2 12/2006 Clark et al.
7,152,024 B2 12/2006 Marschner et al.
7,210,066 B2 4/2007 Mandava et al.
7,213,707 B2 5/2007 Hubbs et al.
7,215,828 B2 5/2007 Luo
7,219,178 B2 5/2007 Harris et al.
7,236,611 B2 6/2007 Roberts et al.
7,244,233 B2 7/2007 Krantz et al.
7,257,237 B1 8/2007 Luck et al.
7,259,873 B2 8/2007 Sikora et al.
7,292,250 B2 11/2007 Sepulveda
7,308,112 B2 12/2007 Fujimura et al.
7,333,648 B2 2/2008 Edic et al.
7,340,077 B2 3/2008 Gokturk et al.
7,372,977 B2 5/2008 Fujimura et al.
7,443,869 B2 10/2008 Solomon et al.
7,472,047 B2 12/2008 Kramer et al.
7,483,049 B2 1/2009 Aman et al.
7,519,223 B2 4/2009 Dehlin et al.
7,532,206 B2 5/2009 Morrison et al.
7,536,032 B2 5/2009 Bell
7,542,586 B2 6/2009 Johnson
7,598,942 B2 10/2009 Underkoffler et al.
7,603,658 B2 10/2009 Subramanian et al.
7,606,417 B2 10/2009 Steinberg et al.
7,646,372 B2 1/2010 Marks et al.
7,650,434 B2 1/2010 Blumrich et al.
7,656,372 B2 2/2010 Sato et al.
7,660,439 B1 2/2010 Lu et al.
7,665,041 B2 2/2010 Wilson et al.
7,692,625 B2 4/2010 Morrison et al.
7,769,994 B2 8/2010 Peles
7,831,088 B2 11/2010 Frakes et al.
7,831,932 B2 11/2010 Josephsoon et al.
7,840,031 B2 11/2010 Albertson et al.
7,861,188 B2 12/2010 Josephsoon et al.
7,868,887 B1 1/2011 Yhann
7,886,229 B2 2/2011 Pachet
7,886,236 B2 2/2011 Kolmykov-Zotov et al.
7,940,885 B2 5/2011 Stanton et al.
7,948,493 B2 5/2011 Klefenz et al.
7,958,182 B2 6/2011 Arimilli et al.
7,958,183 B2 6/2011 Arimilli et al.
7,961,174 B1 6/2011 Markovic et al.
7,961,934 B2 6/2011 Thrun et al.
7,971,156 B2 6/2011 Albertson et al.
7,980,885 B2 7/2011 Gattwinkel et al.
8,005,263 B2 8/2011 Fujimura et al.
8,023,698 B2 9/2011 Niwa et al.
8,023,726 B2 9/2011 Sundaresan et al.
8,035,624 B2 10/2011 Bell et al.
8,045,825 B2 10/2011 Shimoyama et al.
8,059,153 B1 11/2011 Barreto et al.
8,059,894 B1 11/2011 Flagg et al.
8,064,704 B2 11/2011 Kim et al.
8,085,339 B2 12/2011 Marks
8,086,971 B2 12/2011 Radivojevic et al.
8,107,687 B2 1/2012 Gold, Jr.
8,111,239 B2 2/2012 Pryor et al.
8,112,719 B2 2/2012 Hsu et al.
8,116,527 B2 2/2012 Sabol et al.
8,144,233 B2 3/2012 Fukuyama
8,149,210 B2 4/2012 Klier et al.
8,159,536 B2 4/2012 Wang et al.
8,180,114 B2 5/2012 Nishihara et al.
8,185,176 B2 5/2012 Mangat et al.
8,213,707 B2 7/2012 Li et al.
8,218,858 B2 7/2012 Gu
8,229,134 B2 7/2012 Duraiswami et al.
8,230,852 B2 7/2012 Zhang et al.
8,235,529 B1 8/2012 Raffle et al.
8,239,866 B2 8/2012 Carrie
8,244,233 B2 8/2012 Chang et al.
8,249,345 B2 8/2012 Wu et al.
8,253,564 B2 8/2012 Lee et al.
8,270,669 B2 9/2012 Aichi et al.
8,281,286 B2 10/2012 Nguyen
8,289,162 B2 10/2012 Mooring et al.
8,290,208 B2 10/2012 Kurtz et al.
8,296,734 B2 10/2012 Geppert et al.
8,304,727 B2 11/2012 Lee et al.
8,319,832 B2 11/2012 Nagata et al.
8,325,993 B2 12/2012 Dinerstein et al.
8,351,651 B2 1/2013 Lee
8,363,010 B2 1/2013 Nagata
8,395,600 B2 3/2013 Kawashima et al.
8,405,680 B1 3/2013 Cardoso et al.
8,423,962 B2 4/2013 Becker et al.
8,432,377 B2 4/2013 Newton
8,457,353 B2 6/2013 Reville et al.
8,458,267 B2 6/2013 Chen et al.
8,471,848 B2 6/2013 Tschesnok
8,497,842 B2 7/2013 Tomkins et al.
8,514,221 B2 8/2013 King et al.
8,542,320 B2 9/2013 Berestov et al.
8,553,037 B2 10/2013 Smith et al.
8,561,036 B1 10/2013 Beans et al.
8,567,395 B2 10/2013 Savona et al.
8,582,809 B2 11/2013 Halimeh et al.
8,593,417 B2 11/2013 Kawashima et al.
8,605,202 B2 12/2013 Muijs et al.
8,620,024 B2 12/2013 Huang et al.
8,631,355 B2 1/2014 Murillo et al.
8,632,182 B2 1/2014 Chen et al.
8,638,989 B2 1/2014 Holz
8,643,628 B1 2/2014 Eriksson et al.
8,659,594 B2 2/2014 Kim et al.
8,659,658 B2 2/2014 Vassigh et al.
8,686,943 B1 * 4/2014 Rafii ........................ G06F 3/011
345/158
8,693,731 B2 4/2014 Holz et al.
8,719,788 B2 5/2014 Merry
8,723,789 B1 * 5/2014 Rafii ........................ G06F 3/017
345/158
8,724,906 B2 5/2014 Shotton et al.
8,738,181 B2 5/2014 Greer et al.
8,738,523 B1 5/2014 Sanchez et al.
8,744,122 B2 6/2014 Salgian et al.
8,751,979 B1 6/2014 Socha
8,768,022 B2 7/2014 Miga et al.
8,773,512 B1 * 7/2014 Rafii ...................... A63F 13/213
375/240.23
8,781,234 B2 7/2014 Zhang et al.
8,786,596 B2 7/2014 House
8,803,885 B1 8/2014 Carron
8,817,087 B2 8/2014 Weng et al.
8,824,749 B2 9/2014 Leyvand et al.
8,836,768 B1 * 9/2014 Rafii ..................... G02B 27/017
348/47
8,842,084 B2 9/2014 Andersson et al.
8,843,857 B2 9/2014 Berkes et al.
8,854,433 B1 10/2014 Rafii
8,872,914 B2 10/2014 Gobush
8,878,749 B1 11/2014 Wu et al.
8,879,835 B2 11/2014 Krishnaswamy et al.
8,891,868 B1 11/2014 Ivanchenko
8,902,224 B2 12/2014 Wyeld
8,907,982 B2 12/2014 Zontrop et al.
8,917,239 B2 12/2014 Eriksson et al.
8,922,590 B1 12/2014 Luckett et al.
8,924,656 B1 12/2014 Usgaonkar et al.
8,929,609 B2 1/2015 Padovani et al.
8,930,852 B2 1/2015 Chen et al.

(56) References Cited

U.S. PATENT DOCUMENTS 8,942,881 B2 1/2015 Hobbs et al.
8,954,340 B2 2/2015 Sanchez et al.
8,957,857 B2 2/2015 Lee et al.
8,958,631 B2 2/2015 Kutliroff et al.
9,014,414 B2 4/2015 Katano et al.
9,056,396 B1 6/2015 Linnell
9,058,122 B1 6/2015 Nesbit et al.
9,063,574 B1 6/2015 Ivanchenko
9,070,019 B2 6/2015 Holz
9,076,257 B2 7/2015 Sharma et al.
9,110,860 B2 8/2015 Shahar
9,119,670 B2 9/2015 Yang et al.
9,122,354 B2 9/2015 Sharma
9,123,175 B1 9/2015 Goldenthal et al.
9,123,176 B2 9/2015 Lu et al.
9,124,778 B1 9/2015 Crabtree
9,135,503 B2 9/2015 Sundaresan et al.
9,152,603 B1 10/2015 Kelly, III
9,153,028 B2 10/2015 Holz
9,164,702 B1 10/2015 Nesbit et al.
9,170,674 B2 10/2015 Forutanpour et al.
9,182,812 B2 11/2015 Ybanez Zepeda
9,182,838 B2 11/2015 Kikkeri
9,229,901 B1 1/2016 Nesbit et al.
9,244,880 B2 1/2016 Philip et al.
9,274,742 B2 3/2016 Phillips
9,285,893 B2 3/2016 Holz
9,305,229 B2 4/2016 Delean et al.
9,317,924 B2 4/2016 Aratani et al.
9,329,691 B2 5/2016 Izumi
9,330,313 B2 5/2016 Jung et al.
9,342,160 B2 5/2016 Bailey et al.
9,389,779 B2 7/2016 Anderson et al.
9,392,196 B2 7/2016 Holz
9,400,548 B2 7/2016 Zhang et al.
9,436,288 B2 9/2016 Holz
9,436,998 B2 9/2016 Holz
9,448,634 B1 9/2016 Wakeford et al.
9,459,697 B2 10/2016 Bedikian et al.
9,495,221 B2 11/2016 Kramer
9,495,613 B2 11/2016 Holz et al.
9,501,152 B2 11/2016 Bedikian et al.
9,552,075 B2 1/2017 Holz
9,600,935 B2 3/2017 Cohen
9,626,591 B2 4/2017 Holz et al.
9,646,201 B1 5/2017 Horowitz
9,652,668 B2 5/2017 Holz et al.
9,672,441 B2 6/2017 Holz et al.
9,702,977 B2 7/2017 Holz
9,712,383 B2 7/2017 Lu et al.
9,721,383 B1 8/2017 Horowitz et al.
9,766,855 B2 9/2017 Lapidot et al.
9,767,370 B1 9/2017 Lo et al.
9,857,868 B2 1/2018 Plagemann et al.
9,874,977 B1 1/2018 Soyannwo et al.
9,927,522 B2 3/2018 Holz
9,927,880 B2 3/2018 Holz
9,934,580 B2 4/2018 Holz et al.
9,934,609 B2 4/2018 Horowitz et al.
9,945,660 B2 4/2018 Holz
10,007,350 B1 6/2018 Holz et al.
10,042,430 B2 8/2018 Bedikian et al.
10,088,924 B1* 10/2018 Ivanchenko ............ G06F 3/041
10,210,382 B2 2/2019 Shotton et al.
10,228,242 B2 3/2019 Abovitz et al.
10,254,849 B2 4/2019 Holz
10,281,987 B1 5/2019 Yang et al.
10,346,685 B2 7/2019 Ding et al.
10,366,308 B2 7/2019 Holz et al.
10,395,385 B2 8/2019 Zhou et al.
10,404,938 B1 9/2019 De et al.
10,445,593 B1 10/2019 Mathiesen et al.
10,445,881 B2 10/2019 Spizhevoy et al.
10,459,530 B2 10/2019 Holz
10,585,193 B2 3/2020 Holz
10,607,413 B1 3/2020 Marcolina et al.
10,620,709 B2 4/2020 Holz
10,656,720 B1 5/2020 Holz
10,691,219 B2 6/2020 Holz
10,699,155 B2 6/2020 Holz et al.
10,739,862 B2 8/2020 Bedikian et al.
10,767,982 B2 9/2020 Holz
10,768,708 B1 9/2020 Sills et al.
10,776,639 B2 9/2020 Steinberg et al.
10,831,281 B2 11/2020 Yang et al.
10,846,942 B1 11/2020 Horowitz et al.
10,901,519 B2 1/2021 Holz
11,178,384 B2 11/2021 Nakamura et al.
11,194,404 B2 12/2021 Holz
11,231,581 B2 1/2022 Jia et al.
11,353,962 B2 6/2022 Bedikian et al.
11,429,194 B2 8/2022 Holz
11,461,966 B1 10/2022 Horowitz et al.
11,493,998 B2 11/2022 Holz
11,561,519 B2 1/2023 Gordon et al.
11,567,578 B2 1/2023 Yang et al.
11,693,115 B2 7/2023 Holz
11,720,180 B2 8/2023 Holz
11,720,181 B2 8/2023 Holz
11,740,705 B2 8/2023 Bedikian et al.
11,868,687 B2 1/2024 Holz et al.
11,874,970 B2 1/2024 Bedikian et al.
11,994,377 B2 5/2024 Holz
12,045,394 B2 7/2024 Holz
12,379,787 B2 8/2025 Holz
2001/0044858 A1 11/2001 Rekimoto
2001/0052985 A1 12/2001 Ono
2002/0008139 A1 1/2002 Albertelli
2002/0008211 A1 1/2002 Kask
2002/0021287 A1 2/2002 Tomasi et al.
2002/0041327 A1 4/2002 Hildreth et al.
2002/0063740 A1 5/2002 Forlenza et al.
2002/0080094 A1 6/2002 Biocca et al.
2002/0105484 A1 8/2002 Navab et al.
2002/0140665 A1 10/2002 Gordon
2002/0179866 A1 12/2002 Hoeller et al.
2003/0053658 A1 3/2003 Pavlidis
2003/0053659 A1 3/2003 Pavlidis et al.
2003/0081141 A1 5/2003 Mazzapica
2003/0097650 A1 5/2003 Bahrs et al.
2003/0123703 A1 7/2003 Pavlidis et al.
2003/0152289 A1 8/2003 Luo
2003/0156756 A1 8/2003 Gokturk et al.
2003/0202697 A1 10/2003 Simard et al.
2003/0210262 A1 11/2003 Gahm et al.
2004/0046736 A1* 3/2004 Pryor ..................... G16H 50/50
345/156
2004/0068409 A1 4/2004 Tanaka et al.
2004/0078493 A1 4/2004 Blumrich et al.
2004/0103111 A1 5/2004 Miller et al.
2004/0125228 A1 7/2004 Dougherty
2004/0125984 A1 7/2004 Ito et al.
2004/0128584 A1 7/2004 Mandava et al.
2004/0141162 A1* 7/2004 Olbrich ................... G06F 3/017
348/E5.137
2004/0145809 A1 7/2004 Brenner
2004/0155877 A1 8/2004 Hong et al.
2004/0190776 A1 9/2004 Higaki et al.
2004/0212725 A1 10/2004 Raskar
2005/0007673 A1 1/2005 Chaoulov et al.
2005/0068518 A1 3/2005 Baney et al.
2005/0094019 A1 5/2005 Grosvenor et al.
2005/0097300 A1 5/2005 Gildea et al.
2005/0131607 A1 6/2005 Breed
2005/0156888 A1 7/2005 Xie et al.
2005/0166163 A1* 7/2005 Chang ................... G06F 3/0304
382/103
2005/0168461 A1 8/2005 Acosta et al.
2005/0168578 A1 8/2005 Gobush
2005/0193291 A1 9/2005 Subramanian et al.
2005/0210105 A1 9/2005 Hirata et al.
2005/0210419 A1 9/2005 Kela et al.
2005/0229159 A1 10/2005 Haba et al.
2005/0236558 A1 10/2005 Nabeshima et al.

(56) References Cited

U.S. PATENT DOCUMENTS

2005/0238201 A1 10/2005 Shamaie
2005/0271279 A1 12/2005 Fujimura et al.
2006/0006235 A1 1/2006 Kurzweil et al.
2006/0017807 A1 1/2006 Lee et al.
2006/0028656 A1 2/2006 Venkatesh et al.
2006/0029296 A1 2/2006 King et al.
2006/0033713 A1 2/2006 Pryor
2006/0034545 A1 2/2006 Mattes et al.
2006/0050979 A1 3/2006 Kawahara
2006/0072105 A1 4/2006 Wagner
2006/0098899 A1 5/2006 King et al.
2006/0111878 A1 5/2006 Pendyala et al.
2006/0204040 A1 9/2006 Freeman et al.
2006/0210112 A1 9/2006 Cohen et al.
2006/0262421 A1 11/2006 Matsumoto et al.
2006/0268285 A1 11/2006 Karabassi et al.
2006/0290950 A1 12/2006 Platt et al.
2007/0014466 A1 1/2007 Baldwin
2007/0018966 A1* 1/2007 Blythe .................. G06F 3/0488 345/173
2007/0042346 A1 2/2007 Weller, III
2007/0057764 A1 3/2007 Sato et al.
2007/0066394 A1 3/2007 Ikeda et al.
2007/0076224 A1 4/2007 Alexander
2007/0086621 A1 4/2007 Aggarwal et al.
2007/0124702 A1 5/2007 Morisaki
2007/0130547 A1 6/2007 Boillot
2007/0203904 A1 8/2007 Ren et al.
2007/0206719 A1 9/2007 Suryanarayanan et al.
2007/0211023 A1 9/2007 Boillot
2007/0230929 A1 10/2007 Niwa et al.
2007/0234127 A1 10/2007 Nguyen
2007/0236475 A1 10/2007 Wherry
2007/0238956 A1 10/2007 Haras et al.
2007/0268316 A1 11/2007 Kajita et al.
2007/0275755 A1 11/2007 Chae et al.
2008/0002860 A1 1/2008 Super et al.
2008/0005703 A1 1/2008 Radivojevic et al.
2008/0009412 A1 1/2008 Funada et al.
2008/0013826 A1 1/2008 Hillis et al.
2008/0019576 A1 1/2008 Senftner et al.
2008/0019589 A1 1/2008 Yoon et al.
2008/0030429 A1 2/2008 Hailpern et al.
2008/0031492 A1 2/2008 Lanz
2008/0056752 A1 3/2008 Denton et al.
2008/0059131 A1 3/2008 Tokita et al.
2008/0059915 A1 3/2008 Boillot
2008/0064954 A1 3/2008 Adams et al.
2008/0106637 A1 5/2008 Nakao et al.
2008/0106746 A1 5/2008 Shpunt et al.
2008/0110994 A1 5/2008 Knowles et al.
2008/0111710 A1 5/2008 Boillot
2008/0113756 A1 5/2008 Williams et al.
2008/0118091 A1 5/2008 Serfaty et al.
2008/0126937 A1 5/2008 Pachet
2008/0141181 A1* 6/2008 Ishigaki .............. G06F 3/04847 715/863
2008/0150913 A1 6/2008 Bell et al.
2008/0152875 A1 6/2008 Tomita et al.
2008/0170776 A1 7/2008 Albertson et al.
2008/0174547 A1 7/2008 Kanevsky et al.
2008/0174550 A1 7/2008 Laurila et al.
2008/0175507 A1 7/2008 Lookingbill et al.
2008/0186475 A1 8/2008 Kawata et al.
2008/0187175 A1 8/2008 Kim et al.
2008/0192005 A1 8/2008 Elgoyhen et al.
2008/0244468 A1 10/2008 Nishihara et al.
2008/0246759 A1 10/2008 Summers
2008/0247462 A1 10/2008 Demos
2008/0273764 A1 11/2008 Scholl
2008/0278589 A1 11/2008 Thorn
2008/0291160 A1 11/2008 Rabin
2008/0300055 A1 12/2008 Lutnick et al.
2008/0304740 A1 12/2008 Sun et al.
2008/0317292 A1 12/2008 Baker et al.
2008/0319356 A1 12/2008 Cain et al.
2009/0002489 A1 1/2009 Yang et al.
2009/0063815 A1 3/2009 Arimilli et al.
2009/0073117 A1 3/2009 Tsurumi et al.
2009/0093307 A1 4/2009 Miyaki
2009/0102840 A1 4/2009 Li
2009/0103780 A1* 4/2009 Nishihara ............. G06F 3/0425 382/103
2009/0109178 A1 4/2009 Kim et al.
2009/0116742 A1 5/2009 Nishihara
2009/0122146 A1 5/2009 Zalewski et al.
2009/0128564 A1 5/2009 Okuno
2009/0139778 A1 6/2009 Butler et al.
2009/0153655 A1 6/2009 Ike et al.
2009/0184920 A1 7/2009 Francis
2009/0203993 A1 8/2009 Mangat et al.
2009/0203994 A1 8/2009 Mangat et al.
2009/0217211 A1 8/2009 Hildreth et al.
2009/0239587 A1 9/2009 Negron et al.
2009/0256817 A1 10/2009 Perlin et al.
2009/0257623 A1 10/2009 Tang et al.
2009/0274339 A9 11/2009 Cohen et al.
2009/0309710 A1 12/2009 Kakinami
2009/0313606 A1 12/2009 Geppert et al.
2010/0001998 A1 1/2010 Mandella et al.
2010/0013662 A1 1/2010 Stude
2010/0013832 A1 1/2010 Xiao et al.
2010/0014781 A1 1/2010 Liu et al.
2010/0020078 A1 1/2010 Shpunt
2010/0023015 A1 1/2010 Park
2010/0026963 A1 2/2010 Faulstich
2010/0027845 A1 2/2010 Kim et al.
2010/0046842 A1 2/2010 Conwell
2010/0049836 A1 2/2010 Kramer
2010/0053164 A1 3/2010 Imai et al.
2010/0053209 A1 3/2010 Rauch et al.
2010/0053612 A1 3/2010 Ou-Yang et al.
2010/0058252 A1 3/2010 Ko
2010/0066676 A1 3/2010 Kramer et al.
2010/0066737 A1 3/2010 Liu
2010/0066975 A1 3/2010 Rehnstrom
2010/0091110 A1 4/2010 Hildreth
2010/0095206 A1 4/2010 Kim
2010/0102570 A1 4/2010 Boyd-Wilson et al.
2010/0103106 A1 4/2010 Chui
2010/0117963 A1 5/2010 Westerman et al.
2010/0118123 A1 5/2010 Freedman et al.
2010/0121189 A1 5/2010 Ma et al.
2010/0125815 A1 5/2010 Wang et al.
2010/0127995 A1 5/2010 Rigazio et al.
2010/0131850 A1 5/2010 Berus
2010/0141762 A1 6/2010 Siann et al.
2010/0156676 A1 6/2010 Mooring et al.
2010/0158372 A1 6/2010 Kim et al.
2010/0162165 A1 6/2010 Addala et al.
2010/0177042 A1 7/2010 Chen
2010/0177049 A1 7/2010 Levy et al.
2010/0177929 A1 7/2010 Kurtz et al.
2010/0182136 A1* 7/2010 Pryor ...................... G06F 3/017 340/425.5
2010/0194863 A1 8/2010 Lopes et al.
2010/0199221 A1 8/2010 Yeung et al.
2010/0199229 A1 8/2010 Kipman et al.
2010/0199230 A1 8/2010 Latta et al.
2010/0199232 A1 8/2010 Mistry et al.
2010/0201880 A1 8/2010 Iwamura
2010/0208942 A1 8/2010 Porter et al.
2010/0219934 A1 9/2010 Matsumoto
2010/0222102 A1 9/2010 Rodriguez
2010/0225588 A1* 9/2010 Newton ................ G06F 3/0346 345/156
2010/0225745 A1 9/2010 Chen et al.
2010/0229155 A1 9/2010 Adiyapatham et al.
2010/0231512 A1 9/2010 Perez et al.
2010/0235786 A1 9/2010 Maizels et al.
2010/0245289 A1 9/2010 Svajda
2010/0248836 A1 9/2010 Suzuki et al.
2010/0262822 A1 10/2010 Honjo
2010/0264833 A1 10/2010 Van et al.

(56) References Cited

U.S. PATENT DOCUMENTS

| | | | | |
|---|---|---|---|---|
| 2010/0275159 | A1 | 10/2010 | Matsubara et al. | |
| 2010/0275208 | A1 | 10/2010 | Carrie | |
| 2010/0277411 | A1 | 11/2010 | Yee et al. | |
| 2010/0278393 | A1 | 11/2010 | Snook et al. | |
| 2010/0281434 | A1 | 11/2010 | Schroder et al. | |
| 2010/0283739 | A1 | 11/2010 | Zhang et al. | |
| 2010/0295772 | A1* | 11/2010 | Alameh | G06F 3/017 715/863 |
| 2010/0295773 | A1 | 11/2010 | Alameh et al. | |
| 2010/0296698 | A1 | 11/2010 | Lien et al. | |
| 2010/0302015 | A1 | 12/2010 | Kipman et al. | |
| 2010/0302357 | A1 | 12/2010 | Hsu et al. | |
| 2010/0303298 | A1 | 12/2010 | Marks et al. | |
| 2010/0306712 | A1 | 12/2010 | Snook et al. | |
| 2010/0306713 | A1 | 12/2010 | Geisner et al. | |
| 2010/0309097 | A1 | 12/2010 | Raviv et al. | |
| 2010/0321289 | A1 | 12/2010 | Kim et al. | |
| 2010/0321377 | A1 | 12/2010 | Gay et al. | |
| 2010/0325590 | A1 | 12/2010 | Homma et al. | |
| 2010/0329509 | A1 | 12/2010 | Fahn et al. | |
| 2011/0007072 | A1 | 1/2011 | Khan et al. | |
| 2011/0018795 | A1 | 1/2011 | Jang | |
| 2011/0025818 | A1 | 2/2011 | Gallmeier et al. | |
| 2011/0026765 | A1 | 2/2011 | Ivanich et al. | |
| 2011/0035666 | A1 | 2/2011 | Geisner et al. | |
| 2011/0043806 | A1 | 2/2011 | Guetta et al. | |
| 2011/0057875 | A1 | 3/2011 | Shigeta et al. | |
| 2011/0066984 | A1 | 3/2011 | Li | |
| 2011/0080337 | A1 | 4/2011 | Matsubara et al. | |
| 2011/0080470 | A1 | 4/2011 | Kuno et al. | |
| 2011/0080490 | A1 | 4/2011 | Clarkson et al. | |
| 2011/0088014 | A1 | 4/2011 | Becker et al. | |
| 2011/0090407 | A1 | 4/2011 | Friedman | |
| 2011/0093820 | A1 | 4/2011 | Zhang et al. | |
| 2011/0096033 | A1* | 4/2011 | Ko | H04M 1/724 345/175 |
| 2011/0107216 | A1 | 5/2011 | Bi | |
| 2011/0113083 | A1 | 5/2011 | Shahar | |
| 2011/0115486 | A1 | 5/2011 | Froehlich et al. | |
| 2011/0116684 | A1 | 5/2011 | Coffman et al. | |
| 2011/0119640 | A1 | 5/2011 | Berkes et al. | |
| 2011/0134112 | A1 | 6/2011 | Koh et al. | |
| 2011/0134251 | A1 | 6/2011 | Kim et al. | |
| 2011/0148875 | A1 | 6/2011 | Kim et al. | |
| 2011/0157483 | A1 | 6/2011 | Reichow et al. | |
| 2011/0163976 | A1 | 7/2011 | Barnhoefer et al. | |
| 2011/0169726 | A1 | 7/2011 | Holmdahl et al. | |
| 2011/0169760 | A1 | 7/2011 | Largillier | |
| 2011/0173204 | A1 | 7/2011 | Murillo et al. | |
| 2011/0173235 | A1 | 7/2011 | Aman et al. | |
| 2011/0173399 | A1 | 7/2011 | Chen et al. | |
| 2011/0173574 | A1 | 7/2011 | Clavin et al. | |
| 2011/0175822 | A1 | 7/2011 | Poon et al. | |
| 2011/0176146 | A1 | 7/2011 | Alvarez Diez et al. | |
| 2011/0181509 | A1 | 7/2011 | Rautiainen et al. | |
| 2011/0193778 | A1 | 8/2011 | Lee et al. | |
| 2011/0193939 | A1 | 8/2011 | Vassigh et al. | |
| 2011/0205151 | A1 | 8/2011 | Newton et al. | |
| 2011/0213664 | A1 | 9/2011 | Osterhout et al. | |
| 2011/0225566 | A1 | 9/2011 | Muharsky et al. | |
| 2011/0228978 | A1 | 9/2011 | Chen et al. | |
| 2011/0231797 | A1 | 9/2011 | Huhtala et al. | |
| 2011/0234543 | A1 | 9/2011 | Gaerdenfors et al. | |
| 2011/0234631 | A1 | 9/2011 | Kim et al. | |
| 2011/0234840 | A1 | 9/2011 | Klefenz et al. | |
| 2011/0243451 | A1 | 10/2011 | Oyaizu | |
| 2011/0251896 | A1 | 10/2011 | Impollonia et al. | |
| 2011/0261178 | A1 | 10/2011 | Lo et al. | |
| 2011/0267259 | A1 | 11/2011 | Tidemand et al. | |
| 2011/0267265 | A1 | 11/2011 | Stinson | |
| 2011/0267310 | A1 | 11/2011 | Tsukahara et al. | |
| 2011/0267344 | A1 | 11/2011 | Germann et al. | |
| 2011/0279397 | A1 | 11/2011 | Rimon et al. | |
| 2011/0286676 | A1 | 11/2011 | El Dokor | |
| 2011/0289455 | A1 | 11/2011 | Reville et al. | |
| 2011/0289456 | A1 | 11/2011 | Reville et al. | |
| 2011/0291925 | A1 | 12/2011 | Israel et al. | |
| 2011/0291988 | A1 | 12/2011 | Bamji et al. | |
| 2011/0296353 | A1 | 12/2011 | Ahmed et al. | |
| 2011/0296384 | A1 | 12/2011 | Pasternak | |
| 2011/0299737 | A1 | 12/2011 | Wang et al. | |
| 2011/0304600 | A1 | 12/2011 | Yoshida | |
| 2011/0304650 | A1 | 12/2011 | Campillo et al. | |
| 2011/0306420 | A1 | 12/2011 | Nishimoto et al. | |
| 2011/0310007 | A1 | 12/2011 | Margolis et al. | |
| 2011/0310220 | A1 | 12/2011 | Mceldowney | |
| 2011/0314427 | A1 | 12/2011 | Sundararajan | |
| 2011/0316679 | A1 | 12/2011 | Pihlaja | |
| 2011/0317871 | A1 | 12/2011 | Tossell et al. | |
| 2012/0001938 | A1 | 1/2012 | Sandberg | |
| 2012/0030637 | A1 | 2/2012 | Dey et al. | |
| 2012/0038637 | A1 | 2/2012 | Marks | |
| 2012/0042246 | A1 | 2/2012 | Schwesinger et al. | |
| 2012/0050157 | A1 | 3/2012 | Latta et al. | |
| 2012/0053015 | A1 | 3/2012 | Esaki et al. | |
| 2012/0062489 | A1 | 3/2012 | Andersson et al. | |
| 2012/0062558 | A1 | 3/2012 | Lee et al. | |
| 2012/0062736 | A1 | 3/2012 | Xiong | |
| 2012/0065499 | A1 | 3/2012 | Chono | |
| 2012/0068914 | A1 | 3/2012 | Jacobsen et al. | |
| 2012/0079421 | A1 | 3/2012 | Arriola | |
| 2012/0092254 | A1 | 4/2012 | Wong et al. | |
| 2012/0098744 | A1 | 4/2012 | Stinson, III | |
| 2012/0105613 | A1 | 5/2012 | Weng et al. | |
| 2012/0113223 | A1 | 5/2012 | Hilliges et al. | |
| 2012/0113255 | A1 | 5/2012 | Kasuya et al. | |
| 2012/0113316 | A1 | 5/2012 | Ueta et al. | |
| 2012/0127070 | A1 | 5/2012 | Ryoo et al. | |
| 2012/0127484 | A1 | 5/2012 | Kiyose | |
| 2012/0133580 | A1 | 5/2012 | Kirby et al. | |
| 2012/0150650 | A1 | 6/2012 | Zahand | |
| 2012/0151421 | A1 | 6/2012 | Clarkson | |
| 2012/0157203 | A1 | 6/2012 | Latta et al. | |
| 2012/0159380 | A1 | 6/2012 | Kocienda et al. | |
| 2012/0163675 | A1 | 6/2012 | Joo et al. | |
| 2012/0167134 | A1 | 6/2012 | Hendricks et al. | |
| 2012/0176343 | A1 | 7/2012 | Holmgren et al. | |
| 2012/0194517 | A1 | 8/2012 | Izadi et al. | |
| 2012/0204133 | A1 | 8/2012 | Guendelman et al. | |
| 2012/0214594 | A1 | 8/2012 | Kirovski et al. | |
| 2012/0218183 | A1 | 8/2012 | Givon et al. | |
| 2012/0218263 | A1 | 8/2012 | Meier et al. | |
| 2012/0223959 | A1 | 9/2012 | Lengeling | |
| 2012/0236287 | A1 | 9/2012 | Lee et al. | |
| 2012/0236288 | A1 | 9/2012 | Stanley | |
| 2012/0250936 | A1 | 10/2012 | Holmgren | |
| 2012/0257797 | A1 | 10/2012 | Leyvand et al. | |
| 2012/0266109 | A1 | 10/2012 | Lim et al. | |
| 2012/0268410 | A1 | 10/2012 | King et al. | |
| 2012/0268642 | A1 | 10/2012 | Kawai | |
| 2012/0270654 | A1 | 10/2012 | Padovani et al. | |
| 2012/0274781 | A1 | 11/2012 | Shet et al. | |
| 2012/0280900 | A1 | 11/2012 | Wang et al. | |
| 2012/0281873 | A1 | 11/2012 | Brown et al. | |
| 2012/0281884 | A1 | 11/2012 | Whillock et al. | |
| 2012/0293642 | A1* | 11/2012 | Berini | G06V 40/197 348/77 |
| 2012/0293667 | A1 | 11/2012 | Baba et al. | |
| 2012/0309532 | A1 | 12/2012 | Ambrus et al. | |
| 2012/0314030 | A1 | 12/2012 | Datta et al. | |
| 2012/0320080 | A1 | 12/2012 | Giese et al. | |
| 2012/0320092 | A1* | 12/2012 | Shin | G06F 3/017 345/633 |
| 2012/0320158 | A1* | 12/2012 | Junuzovic | G06F 3/1454 348/E7.083 |
| 2013/0014052 | A1 | 1/2013 | Frey et al. | |
| 2013/0019204 | A1 | 1/2013 | Kotler et al. | |
| 2013/0027300 | A1 | 1/2013 | Nakasu et al. | |
| 2013/0030573 | A1 | 1/2013 | Mercangoez et al. | |
| 2013/0033483 | A1 | 2/2013 | Im et al. | |
| 2013/0038694 | A1 | 2/2013 | Nichani et al. | |
| 2013/0044951 | A1 | 2/2013 | Cherng et al. | |
| 2013/0050425 | A1* | 2/2013 | Im | G06F 3/0304 348/46 |

(56) References Cited

U.S. PATENT DOCUMENTS

2013/0054852 A1 2/2013 Fuco et al.
2013/0055120 A1 2/2013 Galor et al.
2013/0057469 A1 3/2013 Ajika
2013/0063340 A1 3/2013 Mondragon et al.
2013/0077831 A1* 3/2013 Momozono ............ G06F 3/017 382/107
2013/0080898 A1 3/2013 Lavian et al.
2013/0086531 A1 4/2013 Sugita et al.
2013/0097566 A1 4/2013 Berglund
2013/0106686 A1 5/2013 Bennett
2013/0108109 A1 5/2013 Leuck et al.
2013/0120319 A1 5/2013 Givon
2013/0135288 A1 5/2013 King et al.
2013/0148852 A1 6/2013 Partis et al.
2013/0152047 A1 6/2013 Moorthi et al.
2013/0167092 A1 6/2013 Yu et al.
2013/0181897 A1 7/2013 Izumi
2013/0182077 A1 7/2013 Holz
2013/0182079 A1 7/2013 Holz
2013/0182897 A1 7/2013 Holz
2013/0182902 A1 7/2013 Holz
2013/0185375 A1 7/2013 Aho et al.
2013/0185381 A1 7/2013 Aho et al.
2013/0187952 A1 7/2013 Berkovich et al.
2013/0190093 A1 7/2013 Wohlstadter et al.
2013/0191911 A1 7/2013 Dellinger et al.
2013/0194173 A1 8/2013 Zhu et al.
2013/0194238 A1 8/2013 Sakai
2013/0207970 A1 8/2013 Shpunt et al.
2013/0208948 A1 8/2013 Berkovich et al.
2013/0215059 A1 8/2013 Lim et al.
2013/0215148 A1 8/2013 Antonyuk et al.
2013/0222233 A1 8/2013 Park et al.
2013/0222640 A1 8/2013 Baek et al.
2013/0225999 A1 8/2013 Banjanin et al.
2013/0229508 A1 9/2013 Li et al.
2013/0239059 A1 9/2013 Chen et al.
2013/0241832 A1 9/2013 Rimon et al.
2013/0252691 A1 9/2013 Alexopoulos
2013/0257736 A1 10/2013 Hou et al.
2013/0258140 A1 10/2013 Lipson et al.
2013/0271397 A1 10/2013 Macdougall et al.
2013/0275907 A1 10/2013 Lau et al.
2013/0278499 A1 10/2013 Anderson
2013/0283213 A1 10/2013 Guendelman et al.
2013/0290911 A1 10/2013 Praphul et al.
2013/0296057 A1 11/2013 Gagner et al.
2013/0300831 A1 11/2013 Mavromatis et al.
2013/0307935 A1 11/2013 Rappel et al.
2013/0318397 A1 11/2013 Jamison
2013/0321265 A1 12/2013 Bychkov et al.
2014/0002365 A1 1/2014 Ackley et al.
2014/0002495 A1 1/2014 Lamb et al.
2014/0008436 A1 1/2014 Boury et al.
2014/0010441 A1 1/2014 Shamaie
2014/0015831 A1 1/2014 Kim et al.
2014/0023247 A1 1/2014 Kuwahara et al.
2014/0028861 A1 1/2014 Holz
2014/0035946 A1 2/2014 Chang et al.
2014/0037135 A1 2/2014 Kutliroff et al.
2014/0043547 A1 2/2014 Marhefka
2014/0055352 A1 2/2014 Davis et al.
2014/0055385 A1 2/2014 Duheille
2014/0055396 A1 2/2014 Aubauer et al.
2014/0063055 A1 3/2014 Osterhout et al.
2014/0063060 A1 3/2014 Maciocci et al.
2014/0064566 A1 3/2014 Shreve et al.
2014/0071069 A1 3/2014 Anderson et al.
2014/0081521 A1 3/2014 Froejdh et al.
2014/0082559 A1 3/2014 Suggs
2014/0085203 A1 3/2014 Kobayashi
2014/0095119 A1 4/2014 Lee et al.
2014/0098018 A1 4/2014 Kim et al.
2014/0111423 A1 4/2014 Park et al.
2014/0113507 A1 4/2014 Vanzetto
2014/0118255 A1 5/2014 Billerbeck
2014/0125775 A1 5/2014 Holz
2014/0125813 A1 5/2014 Holz
2014/0132555 A1 5/2014 Becouarn et al.
2014/0132738 A1 5/2014 Ogura et al.
2014/0134733 A1 5/2014 Wu et al.
2014/0139425 A1 5/2014 Sakai
2014/0139632 A1* 5/2014 Livshitz .................. G01S 17/50 348/46
2014/0139641 A1 5/2014 Holz
2014/0143688 A1 5/2014 Hou et al.
2014/0149754 A1* 5/2014 Silva ....................... G06F 3/017 713/300
2014/0157135 A1 6/2014 Lee et al.
2014/0157209 A1 6/2014 Dalal et al.
2014/0160035 A1 6/2014 Sauer et al.
2014/0161311 A1 6/2014 Kim
2014/0168062 A1 6/2014 Katz et al.
2014/0168084 A1* 6/2014 Burr ....................... G06V 10/96 345/156
2014/0176310 A1 6/2014 Kotlicki
2014/0176420 A1 6/2014 Zhou et al.
2014/0177913 A1 6/2014 Holz
2014/0184493 A1 7/2014 Chen
2014/0184496 A1 7/2014 Gribetz et al.
2014/0189579 A1 7/2014 Rimon et al.
2014/0192024 A1 7/2014 Holz
2014/0195988 A1 7/2014 Kramer et al.
2014/0198024 A1 7/2014 Adzhigirey et al.
2014/0201666 A1 7/2014 Bedikian et al.
2014/0201674 A1 7/2014 Holz
2014/0201683 A1 7/2014 Holz
2014/0201684 A1 7/2014 Holz
2014/0201689 A1 7/2014 Bedikian et al.
2014/0201690 A1 7/2014 Holz
2014/0210707 A1 7/2014 Holz
2014/0222385 A1 8/2014 Muenster et al.
2014/0223385 A1 8/2014 Ton et al.
2014/0225826 A1 8/2014 Juni
2014/0225918 A1 8/2014 Mittal et al.
2014/0236529 A1 8/2014 Gyorfi
2014/0240215 A1 8/2014 Tremblay et al.
2014/0240225 A1 8/2014 Eilat
2014/0247695 A1 9/2014 Vangeel et al.
2014/0248950 A1 9/2014 Tosas Bautista
2014/0249961 A1 9/2014 Zagel et al.
2014/0253512 A1 9/2014 Narikawa et al.
2014/0253711 A1 9/2014 Balch et al.
2014/0253785 A1 9/2014 Chan et al.
2014/0258880 A1 9/2014 Holm et al.
2014/0258886 A1 9/2014 Strong
2014/0267098 A1 9/2014 Na et al.
2014/0267666 A1 9/2014 Holz
2014/0282224 A1 9/2014 Pedley
2014/0282274 A1 9/2014 Everitt et al.
2014/0282282 A1 9/2014 Holz
2014/0304665 A1 10/2014 Holz
2014/0306903 A1 10/2014 Huang et al.
2014/0307920 A1 10/2014 Holz
2014/0320274 A1 10/2014 De et al.
2014/0320408 A1 10/2014 Zagorsek et al.
2014/0331185 A1 11/2014 Carls et al.
2014/0340311 A1 11/2014 Holz
2014/0344731 A1 11/2014 Holz
2014/0344762 A1 11/2014 Grasset et al.
2014/0364209 A1 12/2014 Perry
2014/0364212 A1 12/2014 Osman et al.
2014/0369558 A1 12/2014 Holz
2014/0375531 A1 12/2014 Latypov et al.
2014/0375547 A1 12/2014 Katz et al.
2014/0376773 A1 12/2014 Holz
2015/0003673 A1 1/2015 Fletcher
2015/0009149 A1 1/2015 Gharib et al.
2015/0016777 A1 1/2015 Abovitz et al.
2015/0022447 A1 1/2015 Hare et al.
2015/0029091 A1 1/2015 Nakashima et al.
2015/0040040 A1 2/2015 Balan et al.
2015/0054729 A1 2/2015 Minnen et al.
2015/0054734 A1 2/2015 Raghoebardajal et al.

(56) References Cited

U.S. PATENT DOCUMENTS

| | | | |
|---|---|---|---|
| 2015/0084864 | A1 | 3/2015 | Geiss et al. |
| 2015/0097772 | A1 | 4/2015 | Starner |
| 2015/0103004 | A1 | 4/2015 | Cohen et al. |
| 2015/0115802 | A1 | 4/2015 | Kuti et al. |
| 2015/0116214 | A1 | 4/2015 | Grunnet-Jepsen et al. |
| 2015/0131859 | A1 | 5/2015 | Kim et al. |
| 2015/0153832 | A1 | 6/2015 | Krepec |
| 2015/0153833 | A1 | 6/2015 | Pinault et al. |
| 2015/0159992 | A1 | 6/2015 | Buckland et al. |
| 2015/0172539 | A1 | 6/2015 | Neglur |
| 2015/0193669 | A1 | 7/2015 | Gu et al. |
| 2015/0198716 | A1 | 7/2015 | Romano et al. |
| 2015/0205358 | A1 | 7/2015 | Lyren |
| 2015/0205400 | A1 | 7/2015 | Hwang et al. |
| 2015/0206320 | A1 | 7/2015 | Itani et al. |
| 2015/0206321 | A1 | 7/2015 | Scavezze et al. |
| 2015/0220149 | A1 | 8/2015 | Plagemann et al. |
| 2015/0220150 | A1 | 8/2015 | Plagemann et al. |
| 2015/0220776 | A1 | 8/2015 | Cronholm |
| 2015/0227795 | A1 | 8/2015 | Starner et al. |
| 2015/0234469 | A1 | 8/2015 | Akiyoshi |
| 2015/0234569 | A1 | 8/2015 | Hess |
| 2015/0253428 | A1 | 9/2015 | Holz |
| 2015/0258432 | A1 | 9/2015 | Stafford et al. |
| 2015/0261291 | A1 | 9/2015 | Mikhailov et al. |
| 2015/0293597 | A1 | 10/2015 | Mishra et al. |
| 2015/0301607 | A1* | 10/2015 | Saka .................. G06F 3/04817 345/175 |
| 2015/0304593 | A1 | 10/2015 | Sakai |
| 2015/0309629 | A1 | 10/2015 | Amariutei et al. |
| 2015/0317831 | A1 | 11/2015 | Ebstyne et al. |
| 2015/0323785 | A1 | 11/2015 | Fukata et al. |
| 2015/0331720 | A1 | 11/2015 | Huetter et al. |
| 2015/0363001 | A1 | 12/2015 | Malzbender |
| 2015/0363070 | A1 | 12/2015 | Katz |
| 2016/0012643 | A1 | 1/2016 | Kezele et al. |
| 2016/0026255 | A1* | 1/2016 | Katz ....................... G06F 1/325 345/156 |
| 2016/0062573 | A1 | 3/2016 | Dascola et al. |
| 2016/0086046 | A1 | 3/2016 | Holz et al. |
| 2016/0086055 | A1 | 3/2016 | Holz et al. |
| 2016/0093105 | A1 | 3/2016 | Rimon et al. |
| 2016/0147376 | A1 | 5/2016 | Kim et al. |
| 2016/0270656 | A1 | 9/2016 | Samec et al. |
| 2016/0323564 | A1 | 11/2016 | Pacheco et al. |
| 2016/0328022 | A1 | 11/2016 | Holz |
| 2016/0378294 | A1 | 12/2016 | Wright et al. |
| 2017/0061205 | A1 | 3/2017 | Holz et al. |
| 2017/0102791 | A1 | 4/2017 | Hosenpud et al. |
| 2017/0124928 | A1 | 5/2017 | Edwin et al. |
| 2017/0131784 | A1 | 5/2017 | Holz |
| 2017/0236293 | A1 | 8/2017 | Holz et al. |
| 2017/0329503 | A1 | 11/2017 | Tilton et al. |
| 2018/0276846 | A1 | 9/2018 | Mostafavi |
| 2018/0285923 | A1 | 10/2018 | Fateh |
| 2019/0012564 | A1 | 1/2019 | Holz et al. |
| 2019/0012794 | A1 | 1/2019 | Radwin et al. |
| 2019/0019303 | A1 | 1/2019 | Siver et al. |
| 2019/0019332 | A1 | 1/2019 | Horowitz et al. |
| 2019/0073112 | A1 | 3/2019 | Holz |
| 2019/0116322 | A1 | 4/2019 | Holzer et al. |
| 2019/0392247 | A1 | 12/2019 | Holz et al. |
| 2020/0019766 | A1 | 1/2020 | Choi et al. |
| 2020/0053277 | A1 | 2/2020 | Shin et al. |
| 2020/0105057 | A1 | 4/2020 | Horowitz et al. |
| 2020/0334491 | A1 | 10/2020 | Holz et al. |
| 2020/0401232 | A1 | 12/2020 | Sills et al. |
| 2021/0302732 | A1 | 9/2021 | Lin et al. |
| 2022/0179219 | A1 | 6/2022 | Jiang et al. |
| 2022/0198776 | A1 | 6/2022 | Holz et al. |
| 2023/0161415 | A1 | 5/2023 | Yang et al. |
| 2023/0334636 | A1 | 10/2023 | Price et al. |
| 2024/0004479 | A1 | 1/2024 | Holz et al. |
| 2024/0085714 | A1 | 3/2024 | Kollin et al. |
| 2024/0103441 | A1 | 3/2024 | Wang et al. |

FOREIGN PATENT DOCUMENTS

| | | | |
|---|---|---|---|
| CN | 1984236 | A | 6/2007 |
| CN | 101124534 | A | 2/2008 |
| CN | 201332447 | Y | 10/2009 |
| CN | 101729808 | A | 6/2010 |
| CN | 101826217 | A | 9/2010 |
| CN | 101930286 | A | 12/2010 |
| CN | 101930610 | A | 12/2010 |
| CN | 101951474 | A | 1/2011 |
| CN | 102053702 | A | 5/2011 |
| CN | 201859393 | U | 6/2011 |
| CN | 102117117 | A | 7/2011 |
| CN | 102135796 | A | 7/2011 |
| CN | 102184014 | A | 9/2011 |
| CN | 102184020 | A | 9/2011 |
| CN | 102201121 | A | 9/2011 |
| CN | 102216883 | A | 10/2011 |
| CN | 102236412 | A | 11/2011 |
| CN | 102262438 | A | 11/2011 |
| CN | 102402290 | A | 4/2012 |
| CN | 102439538 | A | 5/2012 |
| CN | 102696057 | A | 9/2012 |
| CN | 103090862 | A | 5/2013 |
| CN | 105308536 | A | 2/2016 |
| DE | 4201934 | A1 | 7/1993 |
| DE | 10326035 | A1 | 1/2005 |
| DE | 102007015495 | A1 | 10/2007 |
| DE | 102007015497 | A1 | 10/2007 |
| DE | 112014000441 | T5 | 10/2015 |
| EP | 0999542 | A1 | 5/2000 |
| EP | 1477924 | A2 | 11/2004 |
| EP | 1837665 | A2 | 9/2007 |
| EP | 2369433 | A1 | 9/2011 |
| EP | 2369443 | A2 | 9/2011 |
| EP | 2378488 | A2 | 10/2011 |
| GB | 2419433 | A | 4/2006 |
| GB | 2480140 | A | 11/2011 |
| GB | 2519418 | A | 4/2015 |
| JP | 02-236407 | A | 9/1990 |
| JP | 08-261721 | A | 10/1996 |
| JP | 09-259278 | A | 10/1997 |
| JP | 2000-023038 | A | 1/2000 |
| JP | 2002-512069 | A | 4/2002 |
| JP | 2002-133400 | A | 5/2002 |
| JP | 2003-256814 | A | 9/2003 |
| JP | 2004-246252 | A | 9/2004 |
| JP | 2006-019526 | A | 1/2006 |
| JP | 2006-259829 | A | 9/2006 |
| JP | 2007-272596 | A | 10/2007 |
| JP | 2008-227569 | A | 9/2008 |
| JP | 2009-031939 | A | 2/2009 |
| JP | 2009-037594 | A | 2/2009 |
| JP | 2010-060548 | A | 3/2010 |
| JP | 2010-523948 | A | 7/2010 |
| JP | 2011-010258 | A | 1/2011 |
| JP | 2011-501316 | A | 1/2011 |
| JP | 2011-065652 | A | 3/2011 |
| JP | 2011-107681 | A | 6/2011 |
| JP | 2011-248376 | A | 12/2011 |
| JP | 4906960 | B2 | 3/2012 |
| JP | 2012-527145 | A | 11/2012 |
| KR | 10-2009-0006825 | A | 1/2009 |
| KR | 10-1092909 | B1 | 12/2011 |
| RU | 2422878 | C1 | 6/2011 |
| SU | 1375483 | A1 | 2/1988 |
| TW | 200844871 | A | 11/2008 |
| WO | 94/26057 | A1 | 11/1994 |
| WO | 96/17258 | A2 | 6/1996 |
| WO | 97/46975 | A1 | 12/1997 |
| WO | 2004/114220 | A1 | 12/2004 |
| WO | 2006/020846 | A2 | 2/2006 |
| WO | 2006/090197 | A1 | 8/2006 |
| WO | 2007/137093 | A2 | 11/2007 |
| WO | 2010/007662 | A1 | 1/2010 |
| WO | 2010/032268 | A2 | 3/2010 |
| WO | 2010/076622 | A1 | 7/2010 |
| WO | 2010/088035 | A2 | 8/2010 |
| WO | 2010/138741 | A1 | 12/2010 |

(56) References Cited

FOREIGN PATENT DOCUMENTS

| | | | |
|---|---|---|---|
| WO | 2010/148155 | A2 | 12/2010 |
| WO | 2011/024193 | A2 | 3/2011 |
| WO | 2011/036618 | A2 | 3/2011 |
| WO | 2011/044680 | A1 | 4/2011 |
| WO | 2011/045789 | A1 | 4/2011 |
| WO | 2011/119154 | A1 | 9/2011 |
| WO | 2012/027422 | A2 | 3/2012 |
| WO | 2012/039140 | A1 | 3/2012 |
| WO | 2013/109608 | A2 | 7/2013 |
| WO | 2013/109609 | A2 | 7/2013 |
| WO | 2014/113507 | A1 | 7/2014 |
| WO | 2014/200589 | A2 | 12/2014 |
| WO | 2014/208087 | A1 | 12/2014 |
| WO | 2015/026707 | A1 | 2/2015 |

OTHER PUBLICATIONS

Bardinet et al., Fitting of Iso-Surfaces using Superquadrics and Free-Form Deformations [on-line], Jun. 24-25, 1994 [retrieved Jan. 9, 2014], 1994 Proceedings of the IEEE Workshop on Biomedical Image Analysis, pp. 184-193. Retrieved from the Internet: http://ieeexplore.ieee.org/xpls/abs_all.jsp?arnumber=315882&tag=1.

Butail et al., "Three-Dimensional Reconstruction of the Fast-Start Swimming Kinematics of Densely Schooling Fish", Journal of the Royal Society Interface, Jun. 2011, pp. 1-12.

Cheikh et al., "Multipeople Tracking Across Multiple Cameras", International Journal on New Computer Architectures and Their Applications (IJNCAA), vol. 2, No. 1, 2012 (see pp. 23-25, 27-29, 31).

Cumani et al., "Recovering the 3D structure of tubular objects from stereo silhouettes", Pattern Recognition, Elsevier, GB, vol. 30, No. 7, Jul. 1, 1997, pp. 1051-1059, XP022849623.

Davis et al., "Toward 3-D Gesture Recognition", International Journal of Pattern Recognition and Artificial Intelligence, vol. 13, No. 03, 1999 (see pp. 7-9, 11).

Di Zenzo, Silvano et al."Advances in image segmentation", Image and Vision Computing, Elsevier, Guildford, GB, vol. 1, No. 4, Nov. 1, 1983, pp. 196-210.

Domback, D , et al., "Optical Recording of Action Potentials with Second-Harmonic Generation Microscopy," The Journal of Neuroscience, Jan. 28, 2004, vol. 24(4) 999-1003, pp. 1-5.

Forbes et al., "Using Silhouette Consistency Constraints to Build 3D Models", In Proceedings of the Fourteenth Annual Symposium of the Pattern Recognition Association of South Africa (PRASA 2003), Nov. 2003, pp. 33-38.

Forbes, Keith et al. "Using Silhouette Consistency Constraints to Build 3D Models", retrieved from the Internet Jun. 17, 2013 <URL:http://citeseerx.ist.psu.edu/viewdoc/download?doi=10.1.1.59.272&rep=rep1&type=pdf>.

Getting-a-read-on-3d-bar-code, Modern Machine Shop, Feb. 15, 2001, Retrieved on [Sep. 15, 2015] Retrieved from <http://www.mmsonline.comlarticles/getting-a-read-on-3d-bar-codes>.

Heikkila, "Accurate Camera Calibration and Feature Based 3-D Reconstruction From Monocular Image Sequences," Infotech Oulu and Department of Electrical Engineering, University of Oulu, Finland, Oulu, Oct. 10, 1997, pp. 1-126.

International Search Report and Written Opinion mailed Sep. 12, 2013 for International Application No. PCT/US2013/021709 (22 pages).

IPEA/409—International Preliminary Report on Patentability Mailed on Jul. 30, 2015 for WO Application No. PCT/US14/011649, 8 page(s).

IPEA/409—International Preliminary Report on Patentability Mailed on Jul. 30, 2015 for WO Application No. PCT/US14/011737, 15 page(s).

IPEA/409—International Preliminary Report on Patentability Mailed on Sep. 24, 2015 for WO Application No. PCT/US14/028265, 1 page(s).

Kalkofen et al., "Comprehensible Visualization for Augmented Reality", IEEE Transaction on Visuallization and Computer Graphics, 12 page, vol. 15, No. 2. Mar./Apr. 2009.

Kanhangad, V., et al., "A Unified Framework for Contactless Hand Verification," IEEE Transactions on Information Forensics and Security, IEEE, Piscataway, NJ, US., vol. 6, No. 3, Sep. 1, 2011 (see p. 1018).

Kim, et al , "Development of an Orthogonal Double-Image Processing Algorithm to Measure Bubble," Department of Nuclear Engineering and Technology, Seoul National University Korea, vol. 39 No. 4, Published Jul. 6, 2007, pp. 1-14.

Kulesza et al., "Arrangement of a Multi Stereo Visual Sensor System for a Human Activities Space", Stereo Vision Edited by Asim Bhatti, Chapter 10, 2008, pp. 153-172.

Lee et al., "Robust fingertip extraction with improved skin color segmentation for finger gesture recognition in Human-robot interaction," WCCI 2012 IEEE World Congress on Computational Intelligence, Jun. 2012, 7 pages.

Mateos, A Camera Calibration Technique Using Targets of Circular Features, Jan. 2000, uploaded Dec. 12, 2013, <https://www.researchgate.net/publication/250669007> (Year: 2000).

May et al., "Robust 3D-Mapping with Time-of-Flight Cameras", The 2009 IEEE/RSJ International Conference on Intelligent Robots and Systems, Oct. 11-15, 2009, pp. 1673-1678.

Olsson et al., "Shape from Silhouette Scanner", Master's Degree Project, M. Sc in Media Technology and Engineering University of Linkoping, Sweden, Performed the Autumn of 2001 at VCG (Visual Computing Group), CNR (Italian National Research Council) in Pisa, Italy 2001, 52 pages.

Outgoing—ISA/210—International Search Report Mailed on May 9, 2014 for WO Application No. PCT/US14/011649, 4 page(s).

Outgoing Written Opinion of the ISA Mailed on May 9, 2014 for WO Application No. PCT/US14/011649, 6 page (s).

PCT International Patent Application No. PCT/US2014/028265, International Search Report and Written Opinion mailed Jan. 7, 2015, 15 pages.

PCT/US2013/069231—International Search Report and Written Opinion mailed Mar. 13, 2014, 10 pages (Leap 1003-3WO).

Rasmussen, "An Analytical Framework for the Preparation and Animation of a Virtual Mannequin for the Purpose of Mannequin-Clothing Interaction Modeling," Thesis for Master of Science in Civil and Environmental ENgineering, Graduate College of the University of Iowa, Copyright Dec. 2008, 98 pages.

Schaar, R., VCNL4020 Vishay Semiconductors. Application Note [online]. Extended Detection Range with VCNL Family of Proximity Sensor Vishay Intertechnology, Inc, Doc No. 84225, Revised Oct. 25, 2013 [retrieved Mar. 4, 2014]. Retrieved from the Internet: <www.vishay.com>. 4 pages.

Search Machine translation: Method for Measuring Roundness of Round Wire of JP-2010523948-A to Studer, retrieved Sep. 10, 2022, 13 pages. (Year: 2022).

Veldhuis, Henri, et. al., "The 3D Reconstruction of Straight and Curved Pipes using Digital Line Photogrammetry", Mar. 20, 1997, 11 pages (ULTI 1006-17).

Zenzo et al., "Advances in Image Segmentation," Image and Vision Computing, Elsevier Guildford, GB, Nov. 1, 1983, pp. 196-210.

Devasena et al., "Controlling of Electronic Equipment Using Gesture Recognition", International Journal of Engineering and Advanced Technology (IJEAT), vol. 3, Iss. 2, Dec. 2013, 4 pages.

Ko et al., "Gesture Recognition: Enabling Natural Interactions with Electronics", Texas Instruments, https://www.edge-ai-vision.com/2012/04/gesture-recognition-enabling-natural-interactions-with-electronics/ (Apr. 13, 2012) (Year: 2012), in 17 pages.

Non-Final Rejection Mailed on Mar. 16, 2026 for U.S. Appl. No. 18/827,544, 23 page(s).

Non-Final Rejection Mailed on Mar. 19, 2026 for U.S. Appl. No. 19/281,507, 17 page(s).

Non-Final Rejection Mailed on Mar. 27, 2026 for U.S. Appl. No. 19/217,930, 15 page(s).

Notice of Allowance and Fees Due (PTOL-85) Mailed on Apr. 28, 2026 for U.S. Appl. No. 18/780,192, 10 page (s).

* cited by examiner

ALT: MULTI-LENS

ALT: IMAGE DIRECTING FILM

ALT: MULTIPLE ELEMENTS ON DIE

ALT: STRUCTURED LIGHT

ALT: MULTI-LENS

ALT: IMAGE DIRECTING FILM

ALT: MONO OR STEREOSCOPIC

ALT: INTERLEAVED

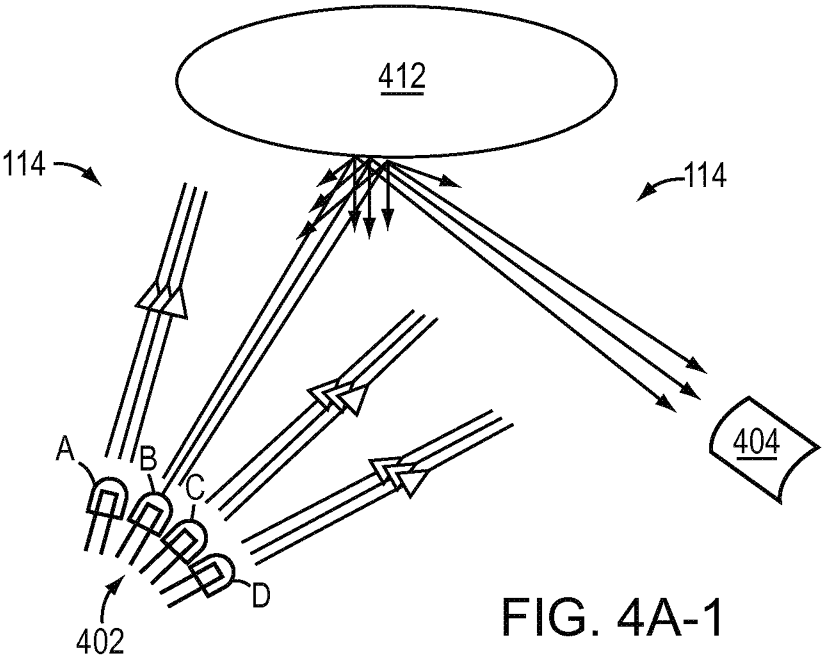
FIG. 4A-1
FIG. 4A-3
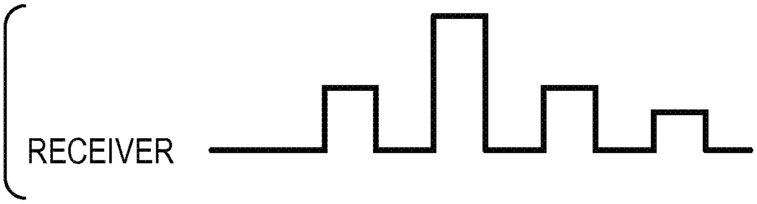
FIG. 4A-2
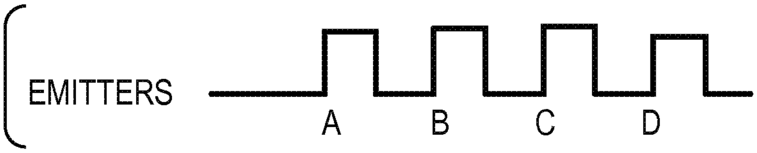
FIG. 4A-4
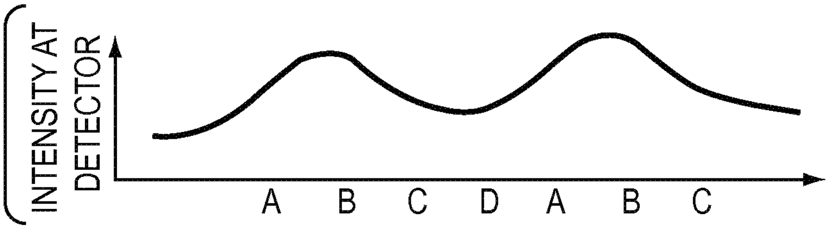
FIG. 4A-5
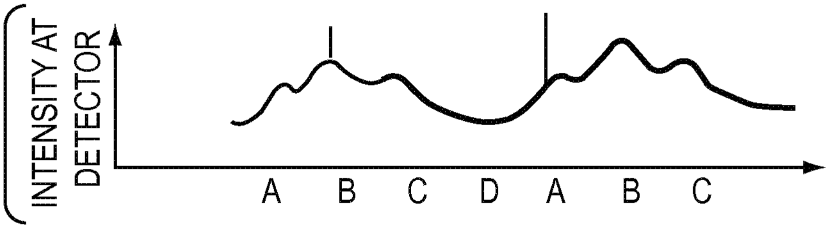

SYSTEMS AND METHODS FOR MACHINE CONTROL

CROSS-REFERENCE TO RELATED APPLICATIONS

This application is a continuation of U.S. application Ser. No. 18/209,259, filed 13 Jun. 2023, which is a continuation of U.S. application Ser. No. 17/862,212, filed 11 Jul. 2022, which is a continuation of U.S. application Ser. No. 16/908,643, filed 22 Jun. 2020, now U.S. Pat. No. 11,493,998, issued 8 Nov. 2022, which is a continuation of U.S. application Ser. No. 15/696,086, filed 5 Sep. 2017, now U.S. Pat. No. 10,691,219, issued 23 Jun. 2020, which is a continuation of Ser. No. 15/392,920, filed 28 Dec. 2016, now U.S. Pat. No. 9,778,752, issued 3 Oct. 2017, which is a continuation of U.S. patent application Ser. No. 14/280,018, filed 16 May 2014, now U.S. Pat. No. 9,679,215, issued 13 Jun. 2017, which is a continuation-in-part of: (i) U.S. patent application Ser. No. 14/106,140, filed on 13 Dec. 2013, now U.S. Pat. No. 9,153,028 issued on 6 Oct. 2015, which is a continuation of U.S. patent application Ser. No. 13/742,953, filed on 16 Jan. 2013, now U.S. Pat. No. 8,638,989, issued on 28 Jan. 2014, which is a continuation-in-part of (a) U.S. patent application Ser. No. 13/414,485 filed on 7 Mar. 2012, which claims priority to and the benefit of U.S. Provisional Patent Application No. 61/587,554 filed on 17 Jan. 2012 and (b) U.S. patent application Ser. No. 13/724,357, filed on 21 Dec. 2012, now U.S. Pat. No. 9,070,019, issued 30 Jun. 2015, which claims priority to and the benefit of U.S. Provisional Patent Application No. 61/724,091, filed on 8 Nov. 2012; (ii) U.S. patent application Ser. No. 14/212,485, filed on 14 Mar. 2014, which claims priority to U.S. Provisional Application Nos. 61/792,025, 61/800,327, and 61/801,479, each filed on 15 Mar. 2013); (iii) U.S. patent application Ser. No. 14/154,730, filed on 14 Jan. 2014, now U.S. Pat. No. 9,501,152, issued 22 Nov. 2016, which claims priority to (a) U.S. Provisional Patent Application Nos. 61/825,515 and 61/825,480, both filed on 20 May 2013, (b) U.S. Provisional Patent Application No. 61/873,351, filed on 3 Sep. 2013 and 61/877,641, filed on Sep. 13, 2013, (c) U.S. Provisional Patent Application No. 61/816,487, filed on Apr. 26, 2013, (d) U.S. Provisional Patent Application No. 61/824,691, filed on 17 May 2013, (e) U.S. Provisional Patent Application Nos. 61/752,725, 61/752,731, and 61/752,733, all filed on 15 Jan. 2013, (f) U.S. Provisional Patent Application No. 61/791,204, filed on 15 Mar. 2013, (g) U.S. Provisional Patent Application Nos. 61/808,959 and 61/808,984, both filed on 5 Apr. 2013 and (h) U.S. Provisional Patent Application No. 61/872,538, filed on 30 Aug. 2013; and (iv) U.S. patent application Ser. No. 14/250,758, filed on 11 Apr. 2014, which claims priority to and the benefit of U.S. Provisional Patent Application No. 61/811,415, filed on 12 Apr. 2013. U.S. patent application Ser. No. 14/280,018 also claims priority to and the benefit of U.S. Provisional Patent Application No. 61/886,586, filed on 3 Oct. 2013, U.S. Provisional Patent Application No. 61/871,790, filed 29 Aug. 2013, U.S. Provisional Patent Application No. 61/873,758, filed on 4 Sep. 2013, U.S. Provisional Patent Application No. 61/898,462, filed on 31 Oct. 2013 and U.S. Provisional Patent Application No. 61/952,843 filed on 13 Mar. 2014. U.S. patent application Ser. No. 13/724,357, now U.S. Pat. No. 9,070,019, issued 30 Jun. 2015 is also a continuation-in-part of U.S. patent application Ser. No. 13/414,485.

All of the foregoing applications are hereby incorporated herein by reference in their entireties.

TECHNICAL FIELD

Embodiments relate generally to machine user interfaces, and more specifically to the use of machine-acquired sensory inputs to formulate control input to machines.

BACKGROUND

Conventional machine interfaces generally require users to provide input mechanically, typically via one or more switches. The keys of a computer keyboard or the buttons on a computer mouse, for instance, are obviously switches. Even a tablet touch screen is at its core a collection of switches, arranged in an array that facilitates locating the point or region of touch based on the subset of switches that are being activated. Beyond just user interfaces for personal computers and consumer electronics, machine interfaces used in industrial, medical, and military contexts, such as robot teach pendants or input devices for computer-assisted surgery, likewise rely on contact-based control input via switches or similar mechanical input elements. Unfortunately, such reliance on physical contact and operation of switches severely limits not only the machine user's freedom to move about, but also the realm of types of user input that are possible. Therefore, an alternative user-interface approach that remedies the shortcomings of traditional interfaces by providing greater flexibility is needed.

SUMMARY

Aspects of the systems and methods described herein provide for improved image- and sensory-signal-based machine interactivity and/or communication by interpreting the position and/or motion of an object (including objects having one or more articulating members, e.g., hands, but more generally any moving parts of humans and/or animals and/or machines) acquired through various machine sensory mechanisms. Among other aspects, embodiments can enable automatically (e.g., programmatically) determining command information (including command information to the sensory system itself, e.g., indicating the manner of further scanning or other sensory data acquisition) using inputs detected from positional information (e.g., position, volume, and/or surface characteristics) and/or motion information (e.g., translation, rotation, deformation and/or other structural change) of a portion of a hand or other detectable object moving in free space. In some embodiments, this is based upon scanning a scene to detect variations that might indicate a presence, position and/or variation (conformations, deformations, translations, rotations, or other object state changes) of a control object portion. Scanning can be performed according to coarse as well as refined scanning patterns and/or intermixed with capturing of images and/or other sensory data capture. Inputs can be interpreted from scan(s), image(s) and/or other sensory data in conjunction with providing command information, machine input, commands, communications and/or other user-machine interfacing, gathering information about objects, events and/or actions existing or occurring within an area being explored, monitored, or controlled, and/or combinations thereof.

In various embodiments, a scene is scanned with a moving directed emission of light or other electromagnetic radiation (e.g., a light beam "sweeping" the scene), or multiple sequentially activated emissions in generally different directions, in accordance with a scan pattern, and reflections of the light off any objects within the scanned region are detected with one or more photosensors (e.g., a collection of sensors such as a camera). Once the presence of an object has been detected based on its reflection signal, a second scan may be performed, typically at a higher resolution and optionally limited to a reduced scan field surrounding the object, to obtain more detailed information about the object or a portion thereof, e.g., to determine its three-dimensional shape and configuration. Subsequent scans may be used to track motions, deformations, and other state changes of the object or object portion. Alternatively to using refined scans (or additionally), detailed object information may be determined by imaging the region with one or more cameras. For instance, images of the object acquired simultaneously by two or more cameras from different vantage points may be analyzed to reconstruct the three-dimensional shape of the object surface. Conversely, in some embodiments, an (e.g., low-resolution) image of a region of interest may be acquired initially to detect objects within the region, and upon such detection, subsequent higher-resolution images or reflections created through scans of the region or object may be acquired to obtain more detailed information about the object. The type(s) of technology (technologies) employed and/or, if applicable, the order in which multiple technologies are employed to detect objects (or object portions) and subsequently determine object attributes (such as a position, orientation, shape, configuration, or parameters of motion or deformation, etc.) depends on the performance characteristics of the technologies (e.g., spatial and/or temporal resolution of the acquired data, responsiveness to changes in the monitored region, complexity and cost of the technology, reliability and robustness of detection algorithms, etc.) and the particular application (e.g., motion tracking, identification, gesture recognition, etc.). Combining a fast scan of the scene with subsequent image-based object tracking, for instance, may advantageously facilitate monitoring a large region in real-time with limited computational resources while providing a wealth of information once an object has been detected.

Accordingly, among other aspects, a computer implemented method for conducting machine control is provided by conducting scanning of a region of space. Scanning can include directing at least two emission cycles to form at least two scan patterns from an emission region to a region of space that might include a control object. Emissions can be cyclical (e.g., repeated) and in accordance to one or more scan patterns directing a sequence, or pattern of activating emissive elements during the emission. Directing can be achieved by a first power state variance at a first light emitter at least partially concurrent with second power state variance at a second light emitter. Alternatively, directing can be achieved by extinguishing a first light emitter completely before activating a second light emitter. An emission region includes a first emission point and a second emission point rotationally pivot-able about one or more axes having an origin point within the emission region. The first emission point can be the same as, or different from, the second emission point.

A reflectance of the at least two scan patterns is detected. Detecting can be achieved by detecting the reflectance with at least one suitable photo-sensitive element, capturing an image with at least one suitable photo-sensitive array element, or combinations thereof. When determined that the detected reflectance indicates a presence of an object in the region of space, a first object attribute set of one or more object attributes of the object is determined for a first one of the at least two scan patterns and a second object attribute set of one or more object attributes of the object is determined for a second one of the at least two scan patterns.

Analyzing the first object attribute set and the second object attribute set enables a system to determine a potential control portion of the object (e.g., a finger-tip of a hand, working-tip of a tool, etc.). In one implementation, analyzing first and second object attribute sets includes finding a known feature. In one implementation, finding a known feature includes identifying characteristics of the object corresponding to characteristics common to features of control portions of determining a reflector affixed to the object. In one implementation, the determining object attribute set includes, in addition to detecting the at least two scan patterns, capturing at least one image with an imaging system including at least one camera.

Comparing the first object attribute set and the second object attribute set can determine control information (e.g., command information including command(s) to a machine or system under control, command(s) to a system conducting the scanning to change one or more parameters of the scanning, other command information such as permissions, authorization, and so forth, or combinations thereof). Accordingly, the indicated control information can be responded to according to response criteria. A response criteria can include determining whether to respond to the control information.

Object attributes can be attributes of the control portion of the object when a control portion is identified. Control portions can inherit certain ones of the object attributes thereby becoming associated with control portion attributes. Control portions can have control portion attributes in addition to the control portion attributes inherited from the object attributes (e.g., finger-tip pointing up or down, etc.). Accordingly, comparing the first object attribute set and the second object attribute set can include comparing control portion attributes selected from the first set with control portion attributes selected from the second set.

An emission cycle can be directed in a first scan pattern and first and second sets of one or more object attributes can be determined by conducting a second scanning in a second pattern. The second scan pattern can be more refined than the first scan pattern. Accordingly, the refined scan pattern captures surface detail about the control object not otherwise captured by a less refined scan pattern. In one implementation, determining first and second sets of one or more object attributes can include determining control-portion attributes based at least in part on captured surface detail about the object. Comparing the first object attribute set with the second object attribute set to determine control information can be achieved by comparing differences in captured surface detail of control portion(s) of the object from control portion attributes of the first scan and the second scan to determine a change indicating control information. For example, determining a change indicating control information can be determining whether an engagement gesture has occurred. In another example, determining a change indicating control information can be determining whether a prospective user has come into vicinity of a machine under control. In a further example, determining a change indicating control information can be determining whether an object is there or not present. In a yet further example, determining a change indicating control information can be determining a correction to control information by comparing the control information to a prior determined control information.

In one implementation, the directing is configured to cause a light emission pattern of a first light emitter to interfere or to create an interference pattern with a light emission pattern of a second light emitter.

In another aspect, a computer implemented method for conducting machine control includes monitoring a region of space for a presence of an object using a first sensing modality. Upon detection of the presence of an object, using a second sensing modality, first and second sets of object attributes are determined for the object. For example, monitoring the region using the first sensing modality can include scanning the region with an emission and detecting a reflectance, and using the second sensing modality comprises acquiring images of the region. Alternatively, monitoring the region using the first sensing modality can include acquiring images of the region, and using the second sensing modality comprises scanning the region with an emission and detecting a reflectance. Comparing the first object attribute set and the second object attribute set enables a system to determine control information. A system under control can respond to the indicated control information according to response criteria.

In a further aspect, a system for conducting machine control includes an emission module for directing an emission cycle to a region of interest in accordance with a scan pattern. A detection module provides (i) detecting a time-variable signal indicative of reflection of the emission by an object in the region of interest, and (ii) acquiring images of the region of interest. For example, the detection module can include one or more cameras for acquiring the images of the region of interest. Additionally, the detection module can include a photosensitive element for detecting a reflection. Additionally, the detection module further comprises circuitry for extracting the time-variable signal from the reflection. A controller provides coordinating operation of the emission and detection modules. A computational facility for processing the reflection signal and the images to determine therefrom a presence of the object and object attributes associated therewith, and for inferring machine-control information from the object attributes.

Advantageously, some embodiments can enable improved machine interfacing and sensory capabilities using "free-space" (i.e., not requiring physical contact) interfacing with a variety of machines. In some embodiments, scanning performed according to coarse as well as refined scanning patterns, and/or intermixed with image capture and/or other sensory data capture, can provide enhanced sensory input acquisition by machines. In fact, some embodiments can provide improvements to their own sensory capabilities by providing command information to the sensory system itself. For example, in embodiments, a sensory acquisition system can indicate to itself a manner for further scanning or other sensory data acquisition. Some embodiments can indicate to themselves improvements in the manner of interpreting scanning or sensory data. Inputs interpreted from scan(s), image(s) and/or other sensory data can provide command information, machine input, commands, communications and/or other user-machine interfacing, gathering information about objects, events and/or actions existing or occurring within an area being explored, monitored, or controlled, and/or combinations thereof.

BRIEF DESCRIPTION OF THE DRAWINGS

A more complete understanding of the subject matter can be derived by referring to the detailed description and claims when considered in conjunction with the following figures, wherein like reference numbers refer to similar elements throughout the figures.

FIG. 4A-1 illustrates a machine sensory and control system providing scanning functionality in accordance with various embodiments;

FIGS. 4A-2 and 4A-3 illustrate light emission and detection intensities, respectively, for an exemplary binary control scheme of the scanning system of FIG. 4A-1;

FIGS. 4A-4 and 4A-5 illustrate light detection intensities for an exemplary continuous control schemes of the scanning system of FIG. 4A-1;

FIG. 4B-1 illustrates a machine sensory and control system providing image-based sending functionality in accordance with various embodiments;

FIGS. 4B-2 and 4B-3 conceptually illustrate reconstruction of a cross-section of a control object using the image-based sensing system of FIG. 4B-1;

DETAILED DESCRIPTION

Techniques described herein can be implemented as one or a combination of methods, systems or processor-executed code to form embodiments capable of improved control of machines or other computing resources based at least in part upon determining whether positions and/or motions of a control object (e.g., hand, tool, hand and tool combinations, other detectable objects or combinations thereof) might be interpreted as an interaction with one or more virtual objects. Embodiments can enable modeling of physical objects, created objects and interactions with combinations thereof for machine control or other purposes.

Figure 1:
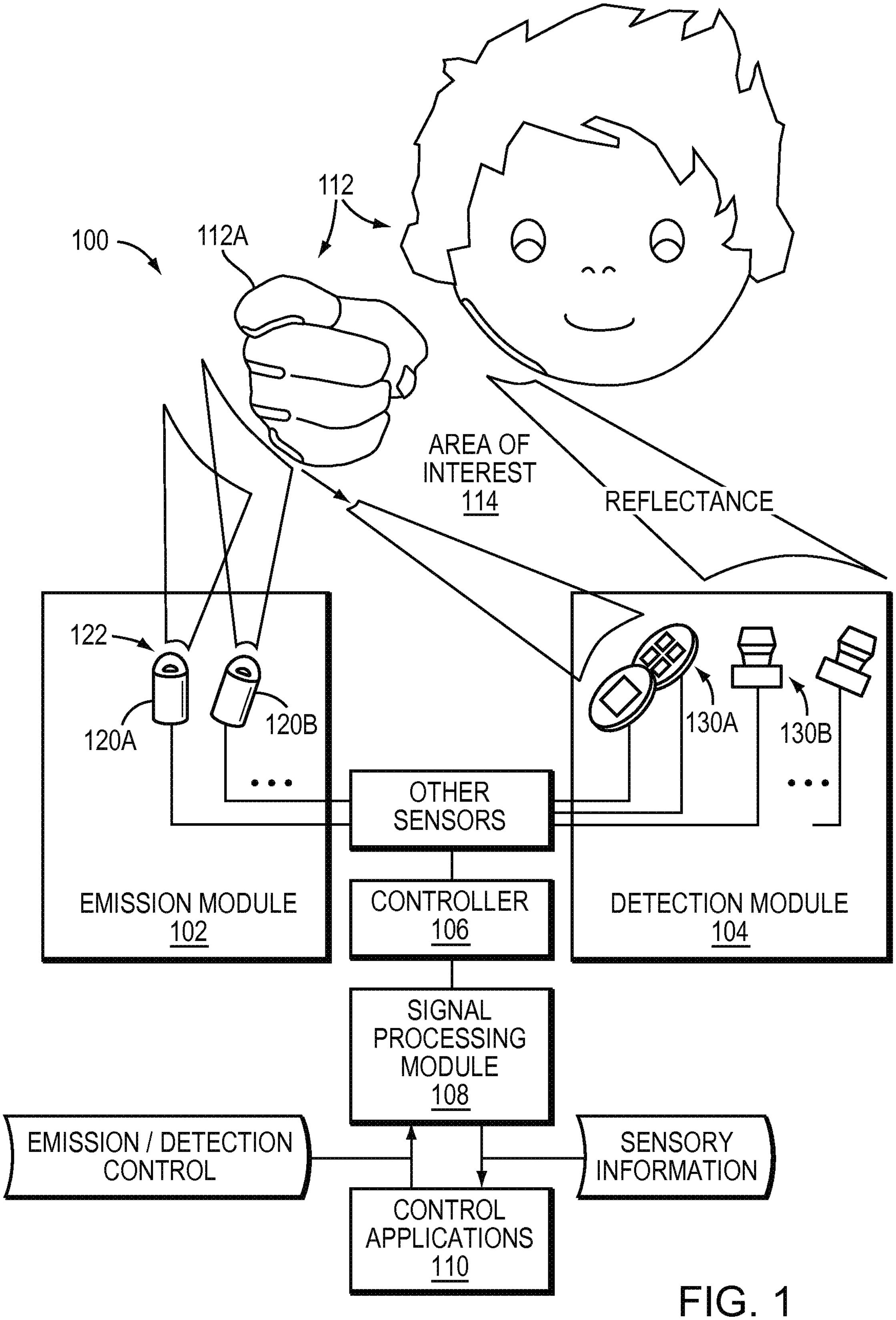
FIG. 1 illustrates an example machine sensory and control system in embodiments.

FIG. 1 illustrates an exemplary machine sensory and control system in embodiments. In one embodiment, a motion-sensing and controller system provides for detecting that some variation(s) in one or more portions of interest of a user (or other object) has occurred, for determining that an interaction with one or more machines corresponds to the variation(s), for determining whether the interaction should occur, and, if so, for affecting the interaction. The machine sensory and control system (MSCS) typically includes a portion-detection system, a variation-determination system, an interaction system, and an application-control system.

Figure 2A:
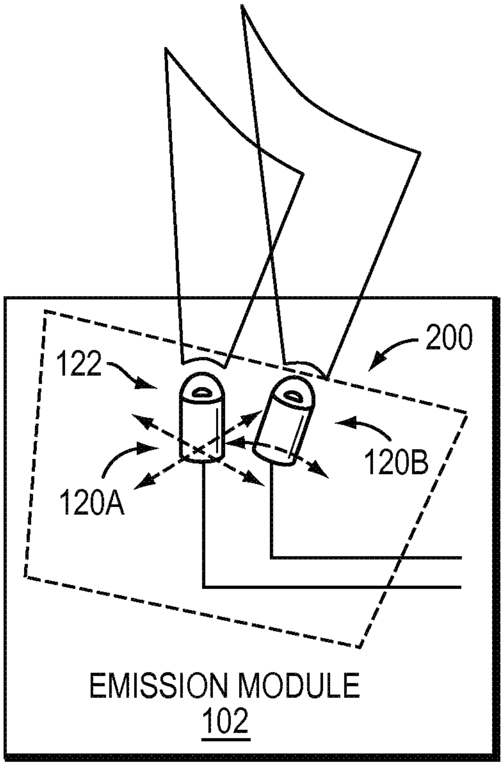
FIGS. 2A, 2B, 2C, 2D and 2E illustrate example emission components of the machine sensory and control system of FIG. 1, in accordance with various embodiments.
Figure 2B:
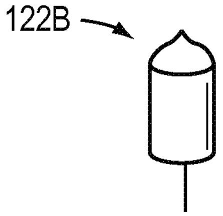
Figure 2C:
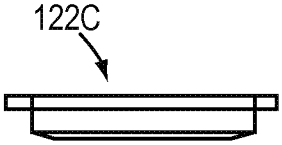
Figure 2D:
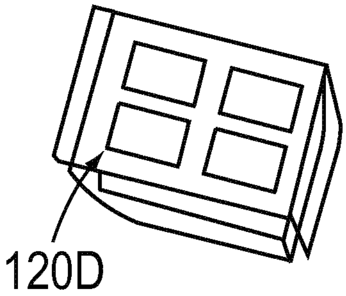
Figure 2E:
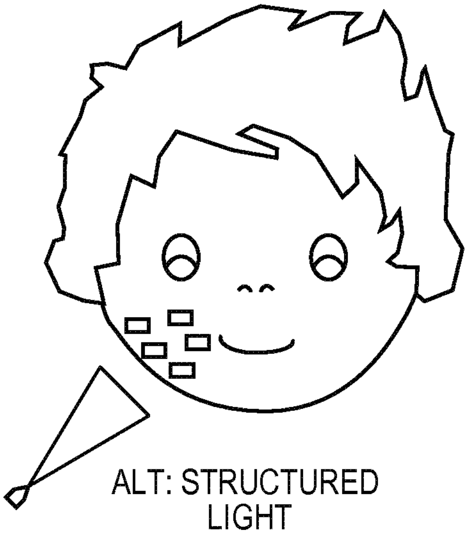
Figure 3A:
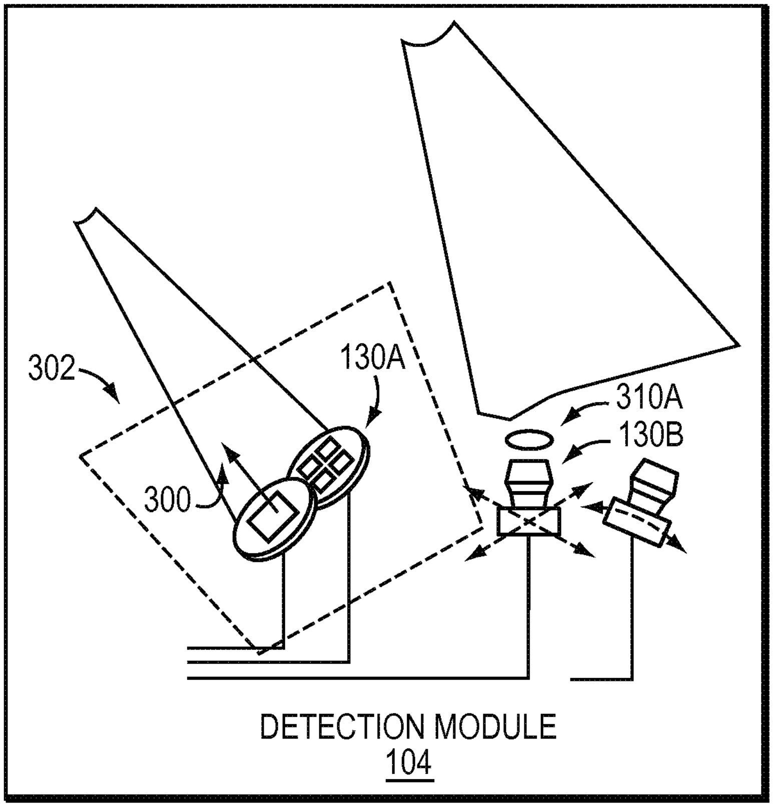
FIGS. 3A, 3B, 3C, 3D, and 3E illustrate example detector components of the machine sensory and control system of FIG. 1, in accordance with various embodiments.
Figure 3B:
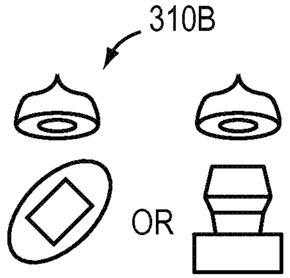
Figure 3C:
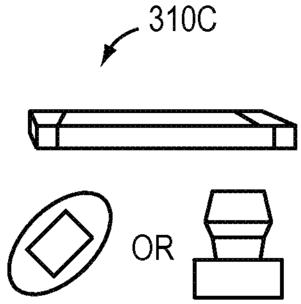
Figure 3E:
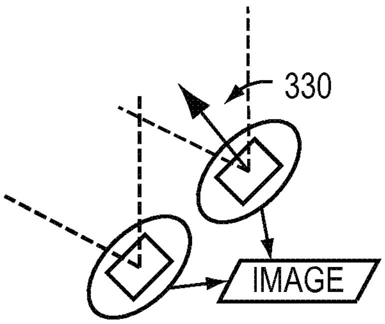
Figure 3D:
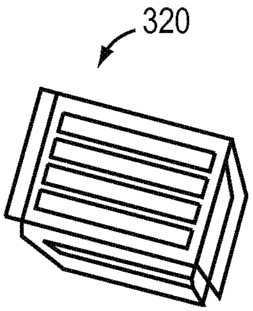

The detection system may detect and capture positional and/or motion information about a control object based on light reflected or scattered by the object. In some embodiments, reflections of ambient light by the object suffice for object detection; in alternative embodiments, the system includes one or more light sources for actively illuminating a region of interest and the object(s) therein. For example, as FIG. 1 shows, one embodiment of detection system 100 includes an emission module 102, a detection module 104, a controller 106, a processing module 108, and a machine-control module interface 110. The emission module 102 illuminates one or more objects of interest 112 (e.g., the user's finger or some other control object) within an area of interest 114. In one embodiment, the emission module 102 includes one or more emitter(s) 120A, 120B (e.g., LEDs or other devices emitting light in the IR, visible, or other spectrum regions, or combinations thereof; radio and/or other electromagnetic signal emitting devices) that are controllable via emitter parameters (e.g., frequency, activation state, firing sequences and/or patterns, and so forth) by the controller 106. However, other existing/emerging emission mechanisms and/or some combination thereof can also be utilized in accordance with the requirements of a particular implementation. The emitters 120A, 120B can be individual elements coupled with materials and/or devices 122. For instance, a light-emitting element 120A, 120B may be combined with a lens 122A (see FIG. 2A), multi-lens 122B (see FIG. 2B), image-directing film (IDF) 122C (see FIG. 2C), liquid lens, multiple such elements or combinations thereof, and/or others, with varying or variable optical properties to direct the emission. Further information about image directing films can be found in U.S. Provisional Patent Application No. 61/886,586, filed Oct. 3, 2013), the entire disclosure of which is hereby incorporated by reference. Further, as shown in FIG. 2D, one or more arrays 120D of emissive elements (combined on a die or otherwise) may be used with or without the addition of devices 122 for directing the emission, and positioned within an emission region 200 (see FIG. 2A) according to one or more emitter parameters (e.g., statically mounted (e.g., fixed, parallel, orthogonal or forming other angles with a work surface, one another or a display or other presentation mechanism), dynamically mounted (e.g., pivotable, rotatable and/or translatable), embedded (e.g., within a machine or machinery under control) or otherwise coupleable using an interface (e.g., wired or wireless). Arrays of emissive elements can be implemented together as vertical cavity surface emitting laser (vcsel) elements, such that portions of the array can be illuminated selectively to enable illuminating areas of interest (e.g., containing objects) within the region of interest for power savings or other operational criteria. In some embodiments, illustrated in FIG. 2E, structured lighting techniques can provide improved surface-feature-capture capability by casting illumination according to a reference pattern onto the object. Image-capture techniques described in further detail herein can be applied to capture and analyze differences in the reference pattern and the pattern as reflected by the object. In yet further embodiments, the detection system 100 may omit the emission module 102 altogether (e.g., in favor of ambient lighting).

With renewed reference to FIG. 1 and further reference to FIGS. 3A-3E, in one embodiment, the detection module 104 includes one or more capture device(s) 130A, 130B (e.g., e.g., devices sensitive to visible light or other electromagnetic radiation) that are controllable via the controller 106. The capture device(s) 130A, 130B can comprise one or more individual image-capture elements 130A or arrays of image-capture elements 130A (e.g., pixel arrays, CMOS or CCD photo sensor arrays, or other imaging arrays) or individual photosensitive elements 130B or arrays of photosensitive elements 130B (e.g., photodiodes, photo sensors, single detector arrays, multi-detector arrays, or other configurations of photo sensitive elements), or combinations thereof. However, other existing/emerging detection mechanisms and/or some combination thereof can also be utilized in accordance with the requirements of a particular implementation.

Capture device(s) 130A, 130B can each define a particular vantage point 300 from which objects 112 within the area of interest 114 are sensed, and can be positioned within a detection region 302 (see FIG. 3A) according to one or more detector parameters (either statically (e.g., fixed, parallel, orthogonal or forming other angles with a work surface, one another, or a display or other presentation mechanism) or dynamically (e.g., pivotably, rotatably, and/or translatably); and mounted, embedded (e.g., within a machine or machinery under control), or otherwise coupleable using a wired or wireless interface). Capture devices 130A, 130B can be coupled with devices and/or materials (such as, e.g., lenses 310A (see FIG. 3A), multi-lenses 310B (see FIG. 3B), image-directing film (IDF) 310C (see FIG. 3C), liquid lenses, combinations thereof, and/or others) with varying or variable optical properties for directing the reflectance to the capture device 130A, 130B for controlling or adjusting resolution, sensitivity, and/or contrast. Capture devices 130A, 130B can be designed or adapted to operate in the IR, visible, or other spectrum regions, or combinations thereof; or alternatively operable in conjunction with radio—and/or other electromagnetic—signal-emitting devices in various applications. Multiple capture devices 130A, 130B can be organized in arrays 320, in which the image capture device(s) can be interleaved by row (see, e.g., FIG. 3D), column, or according to a pattern, or can be otherwise addressable individually or in groups. In an embodiment, capture devices 130A, 130B can capture one or more images for sensing objects 112 and capturing information about the object (e.g., position, motion, and so forth). In embodiments comprising more than one capture device, particular vantage points of capture devices 130A, 130B can be directed to area of interest 114 so that fields of view 330 of the capture devices at least partially overlap. Overlap in the fields of view 330 (see, e.g., FIG. 3E) provides capability to employ stereoscopic vision techniques, including those known in the art, to obtain information from a plurality of images captured substantially contemporaneously.

While illustrated with reference to a particular embodiment in which control of emission module 102 and detection module 104 are co-located within a common controller 106, it should be understood that these control functions may, in alternative embodiments, be implemented in separate hardware components, or may each be distributed over a plurality of components. Controller 106 comprises control logic (implemented in hardware, software, or combinations thereof) to conduct selective activation/de-activation of emitter(s) 120A, 120B in on-off or other activation states or combinations thereof (and/or to control active directing devices) to produce emissions of (e.g., spatiotemporally) varying intensities, e.g., in accordance with a scan pattern which can be directed to scan the area of interest 114. For example, the controller may sequentially activate emitters pointing in different directions. Controller 106 may, similarly, include control logic (implemented in hardware, software or combinations thereof) to conduct selection, activation, and control of capture device(s) 130A, 130B (and/or to control associated active directing devices) to capture images or otherwise sense differences in reflectance or other illumination. Signal-processing module 108 determines whether captured images and/or sensed differences in reflectance and/or other sensor-perceptible phenomena indicate a possible presence of one or more objects of interest 112, such as control objects 112A; the presence of such objects, and/or variations thereof (e.g., in position, shape, etc.), can be used as input to a machine controller via the machine- and application-control module interface 110.

The determination whether an object of interest is present can be made, e.g., based on intensity-based foreground-background discrimination, exploiting the fact that objects of interest are typically to be expected in the image foreground. Further, to discriminate between static foreground objects that are not of interest and a control object, which is typically moving, a static image baseline may be accumulated over a time series of images and subtracted from a current image to identify the moving object. Of course, any kind of motion-detecting image-processing technique may be used alternatively or additionally. In some embodiments, the presence of an object of interest is determined from comparison of the image data, or portions thereof, against a library of image templates for objects of interest; suitable techniques for such template matching include image correlation, block-based matching, edge detection, feature and keypoint extractions, combinations thereof, and others.

In various embodiments, the variation of one or more portions of interest of a user or control object can correspond to a variation of one or more attributes (e.g., position, motion, appearance, surface patterns) of a user's hand or finger(s), points of interest on the hand, a facial portion, etc., or other control objects (e.g., styli, tools), and so on (or some combination thereof) that is detectable by, or directed at, but otherwise occurs independently of the operation of the machine sensory and control system. Thus, for example, the system may be configurable to "observe" ordinary user locomotion (e.g., motion, translation, expression, flexing, deformation, and so on), locomotion directed at controlling one or more machines (e.g., gesturing, intentionally system-directed facial contortion, and so forth), and/or attributes thereof (e.g., rigidity, deformation, fingerprints, veins, pulse rates, and/or other biometric parameters); see, e.g., U.S. Provisional Patent Application No. 61/952,843 (filed on Mar. 13, 2014), the entire disclosure of which is hereby incorporated by reference. In one embodiment, the system provides for detecting that some variation(s) in one or more portions of interest (e.g., fingers, fingertips, or other control surface portions) of a user has occurred, for determining that an interaction with one or more machines corresponds to the variation(s), for determining whether the interaction should occur, and, if so, for at least one of initiating, conducting, continuing, discontinuing, and/or modifying the interaction (and/or a corresponding or related interaction).

The system 100 may facilitate different object-sensing modalities, including, e.g., a scanning modality and/or an image-based sensing modality, as are now described in more detail. FIG. 4A-1 illustrates portions of the system 100 configured for scanning a region of interest 114. Herein, the emission module 402 includes a number (e.g., four in the depicted embodiment) emitters A, B, C, D that point in different directions and thereby illuminate different portions of the region of interest 114. Emissions that intercept an object 112 are reflected, and a portion of the reflection is captured by a detector element, arrangement of detector elements, camera or camera-like device (comprising a pixelated sensor), or other device of the detection module 404. The controller 106 may operate the emitters A, B, C, D sequentially, e.g., in a binary fashion where they are turned on and off one at a time as illustrated in FIGS. 4A-2 and 4A-3. Alternatively, the controller 106 may operate the emitters A, B, C, D in a continuous, gradual fashion where each emitter reaches its intensity maximum at a different point in time; in this case, the emission from one emitter may be completely extinguished before the next emitter is activated, or the emissions of two or more emitters may temporally overlap (e.g., to create a "cross-fade"). In continuous emission mode, the signal intensity received at the reflector likewise varies continuously, resulting either in a single intensity maximum per cycle as illustrated in FIG. 4A-4, or in multiple local maxima with typically one global maximum per cycle as illustrated in FIG. 4A-5. Whether the emission module is operated in binary or continuous mode, the emitter that causes the most direct illumination of the object (emitter B in the depicted embodiment) generally results in the highest-intensity reflection measured by the detector module 104. Thus, by controlling the order in which the emitters are activated (or reach their respective peak emissions) and correlating it to the time-dependent signal received at the detector, locational information about the object 112 can be inferred (e.g., the direction at which the object appears from the standpoint of the emission module may be determined). In some embodiments, the detector module 104 provides additional, independent locational information. For example, if a camera is used, the position of the object 112 within the camera image can be determined. This information, together with the temporal occurrence of the reflection peak in the reflection signal may facilitate computing depth information and determining the three-dimensional location of the object, e.g., based on triangulation.

In some implementations, operating emitters, such as emitters A, B, C, D, at more than one characteristic rates, e.g., the time period to complete single cycle, provides scanning of the region of interest 114 with illumination having different characteristic timing, thereby enabling an interference pattern to be generated by the constructive and destructive interference between the different scan patterns. Constructive interference between the two or more scan patterns can enable a "sweep" of the region of interest by a peak in the interference pattern. The peak in illumination can sweep the region of interest (similar to a light house sweeping the horizon) with a locally concentrated burst of radiant intensity. (Analogously, destructive interference can enable a trough to sweep the region of interest.) In another implementation, a static interference pattern can be cast upon the object 112 in order to enable detecting features of the surface of object 112 by observing distortions in the interference pattern when reflected by the object 112 (see e.g., FIG. 2E).

Various modifications of the emission and detection modules and associated control and signal-processing facilities may be employed. For example, the number and configuration of the individual light emitters may be changed, or a moving (e.g., rotating) emitter, or a stationary emitter in conjunction with a moving (e.g., rotating) deflecting optic or screen, may be used instead of discrete emitters to continuously shift the emission direction across the scene. Further, more complex control schemes of the emission module and, synchronized therewith, the detection module may be used, and detailed information about the relative location and orientation of the emitter and detector elements may be exploited, to increase the amount of information inferable about the object 112. As will be readily appreciated by one of skill in the art, the region of interest 114 may be scanned at various spatial and temporal resolutions, depending on the capabilities of the particular system implementation and the needs of the particular application. For example, a scan may be fine-grained enough to capture surface detail of a person or other control object and may be repeated at sufficient frequency to accurately track movements, deformations, and other state changes. Further detail about systems and methods for scanning-based object detection, reconstruction, and tracking can be found in U.S. patent application Ser. No. 14/212,485, filed on Mar. 14, 2014, which is hereby incorporated herein by reference in its entirety.

Figures 1, 4B:
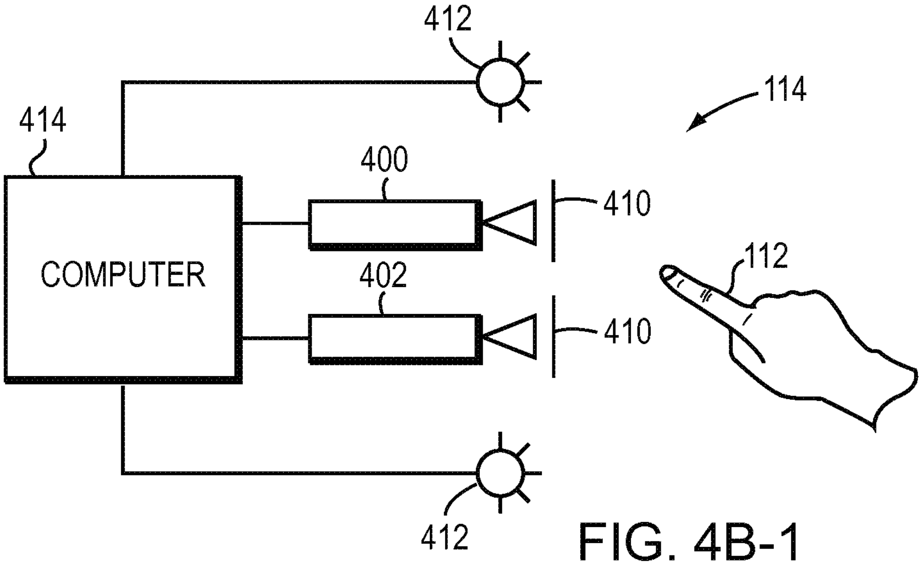
Figures 2, 4B:
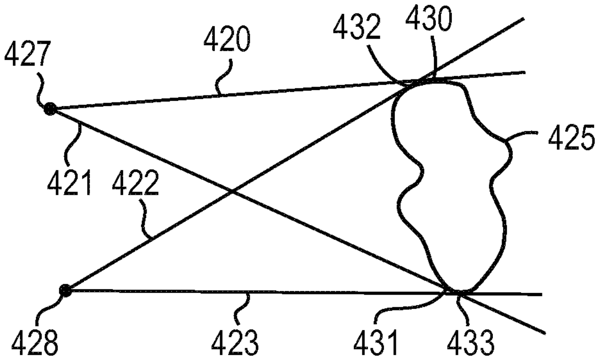
Figures 3, 4B:
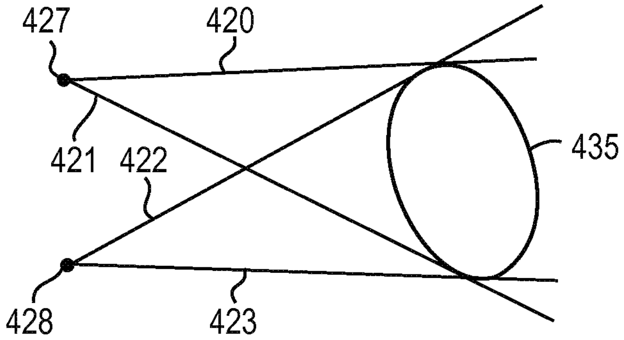

FIG. 4B-1 illustrates portions of the system 100 configured for image-based object detection in a region of interest 114. Herein, the detection module 104 includes two (or more) video cameras 400, 402 that acquire a stream of images of the region of interest 114 from two different vantage points (see also FIG. 3E). The cameras 400, 402 may be, e.g., CCD or CMOS cameras, and may operate, e.g., in the visible, infrared (IR), or ultraviolet wavelength regime, either by virtue of the intrinsic sensitivity of their sensors primarily to these wavelengths, or due to appropriate filters 410 placed in front of the cameras 400, 402. In some embodiments, the emission module 102 includes one or more light sources 412 co-located with the cameras 400, 402 for illuminating the region of interest 114 at wavelengths matching the wavelength regime of the cameras 400, 402. For example, the light sources 412 may be LEDs that emit IR light, and the cameras 400, 402 may capture IR light that is reflected off the control object and/or objects in the background. Due to the inverse-square dependence of the illumination intensity on the distance between the light sources 412 and the illuminated object, foreground objects such as the control object 112 generally appear significantly brighter in the images than background objects, aiding in intensity-based foreground/background discrimination. In some embodiments, the cameras 400, 402 and light sources 412 are disposed below the control object to be tracked and point upward. For example, they may be placed on a desk to capture hand motions taking place in a spatial region above the desk, e.g., in front of the screen. This location may be optimal both for foreground/background discrimination (because the background is in this case typically the ceiling and, thus, far away) and for discerning the control object's direction and tip position (because the usual pointing direction will lie, more or less, in the image plane).

The signal processing module 108, which may be implemented, e.g., on a computer 414, may analyze pairs of image frames acquired by the two cameras 400, 402 to identify the control object (or an object including the control object or multiple control objects, such as a user's hand) therein (e.g., as a non-stationary foreground object) and detect its edges and/or other features. The module 108 may analyze corresponding rows in each pair of images to estimate a cross-section of the object based on edge points thereof as seen from the vantage points of the two cameras. In more detail, as shown in FIGS. 4B-2 and 4B-3, tangent lines 420, 421, 422, 423 on the control object 425, extending from the vantage points 427, 428 (where the cameras are located) to the respective edge points 430, 431, 432, 433 of the control object 425 may be defined, and an ellipse 435 (or other geometric shape defined by only a few parameters) may be inscribed therein. Accordingly, the ellipse 435 can serve as a model, obviating the need to conduct processing on the control object 425. This can be advantageous in situations where the control object has complex surface details making it computationally difficult to work with. The cross-sections obtained for multiple adjacent rows of the image pairs may then be computationally connected in a manner that is consistent with certain heuristics and known properties of the control object (e.g., the requirement of a smooth surface) to resolve any ambiguities in the fitted ellipse parameters. As a result, the control object is reconstructed or modeled in three dimensions. This method, and systems for its implementation, are described in more detail in U.S. patent application Ser. No. 13/414,485, filed on Jan. 17, 2012, the entire enclosure of which is incorporated herein by reference. A larger object including multiple control objects can similarly be reconstructed with respective tangent lines and fitted ellipses, typically exploiting information of internal constraints of the object (such as a maximum physical separation between the fingertips of one hand). As described further below, the computer may also extract relevant control object attributes, such as tip positions and orientations as well as velocities, from the three-dimensional model. In some embodiments, this information can be inferred from the images at a lower level, prior to or without the need for fully reconstructing the control object. These operations are readily implemented by those skilled in the art without undue experimentation.

Figure 4C:
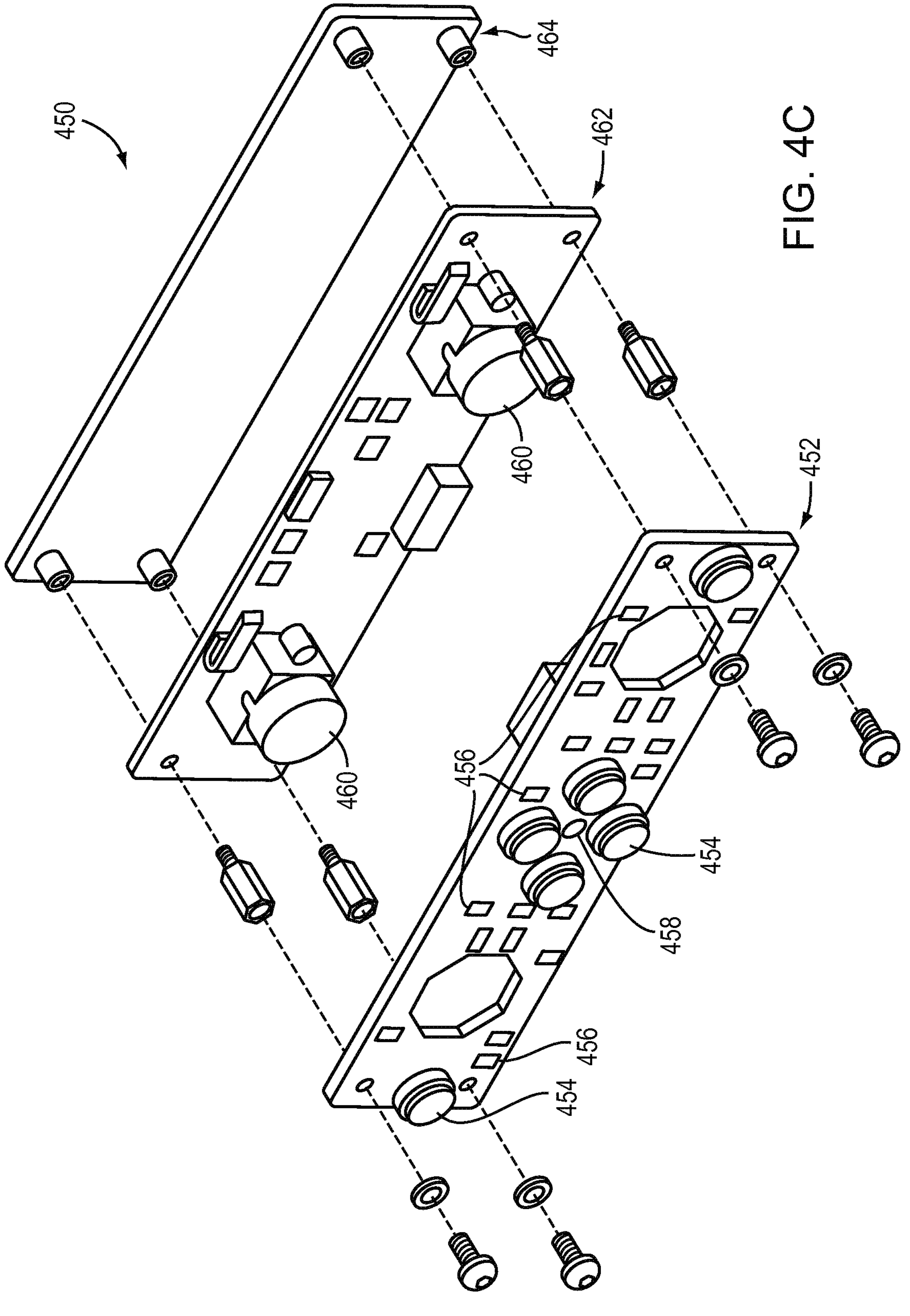
FIG. 4C illustrates a device integrating scanning and image-based sensing functionality in accordance with one embodiment.

In embodiments that facilitate both scanning and image-based sensing modalities, these modalities may be supported by separate hardware, or include components that are shared between the two modalities. For example, separate detection and emission modules for scanning and imaging may be connected or connectable to the same control module, or certain components of the emission or detection module (e.g., a camera) may be selectively usable in either modality. In some embodiments, components of the emission and detection modules for both modalities, and optionally also the associated control functionality, are integrated into a single unit. For example, scanner hardware may be provided on a daughter board designed for ready integration into a camera-based motion controller; FIG. 4C shows an exemplary implementation 450. Herein, scanning is facilitated by an LED board 452 that has a number of individually controllable LEDs 454, 456 embedded therein. Some, but not necessarily all of the LEDs may have associated focusing optics. In the depicted embodiment, for instance, six LEDs 454 (four of which are arranged at the center and two of which flank the board 452 at the sides) have focusing lenses, and ten additional LEDs 456 (which are arranged in columns of two, three, three, and two LEDs, respectively) are without focusing lenses. The LED board 452 may also include a socket 458 for coupling (e.g., to a photodetector not shown). Two cameras 460 for image-based sensing may be provided in the main board 462 of the device. The main board 462 may also include a processor for basic image processing and/or control of the cameras 460 and/or the LED board 452. The LED board 452 and main board 462 may be secured with threaded fasteners or otherwise mounted on a base plate 464. As will be readily appreciated by one of skill in the art, various modifications of the design shown in FIG. 4C are possible; for example, the number and arrangement of LEDs, photodetectors, and cameras may vary, and/or the scanning and imaging hardware may be integrated on a single board. Advantageously, integrating scanning and image-based sensing capabilities into a single motion controller 450 provides a multi-functionality, yet compact device suitable, e.g., for installation in machines with limited space, such as, e.g., vehicles, appliances, etc.

Figure 5A:
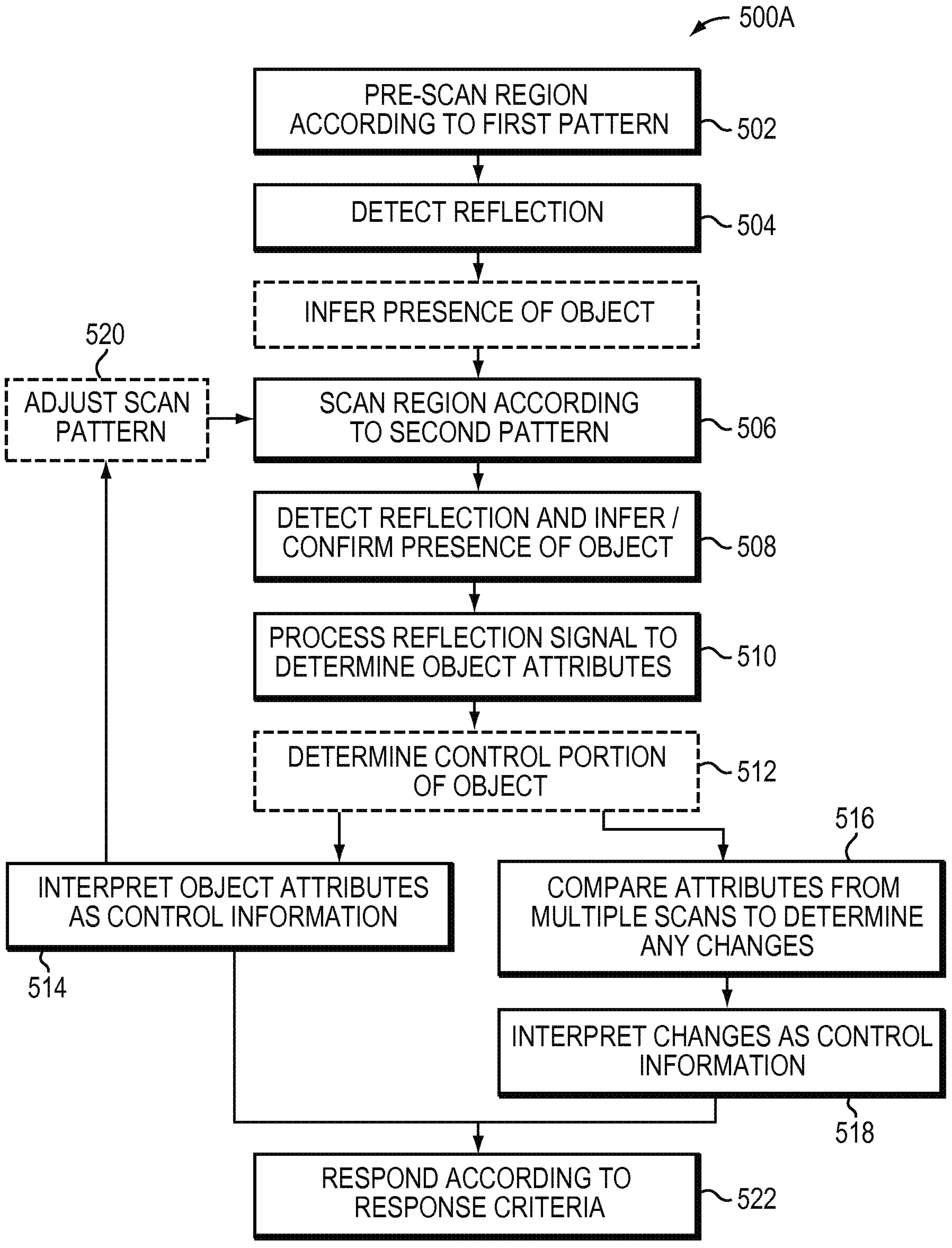
FIG. 5A illustrates a method for detecting and monitoring a control object using at least two scanning patterns in accordance with various embodiments.
Figure 5B:
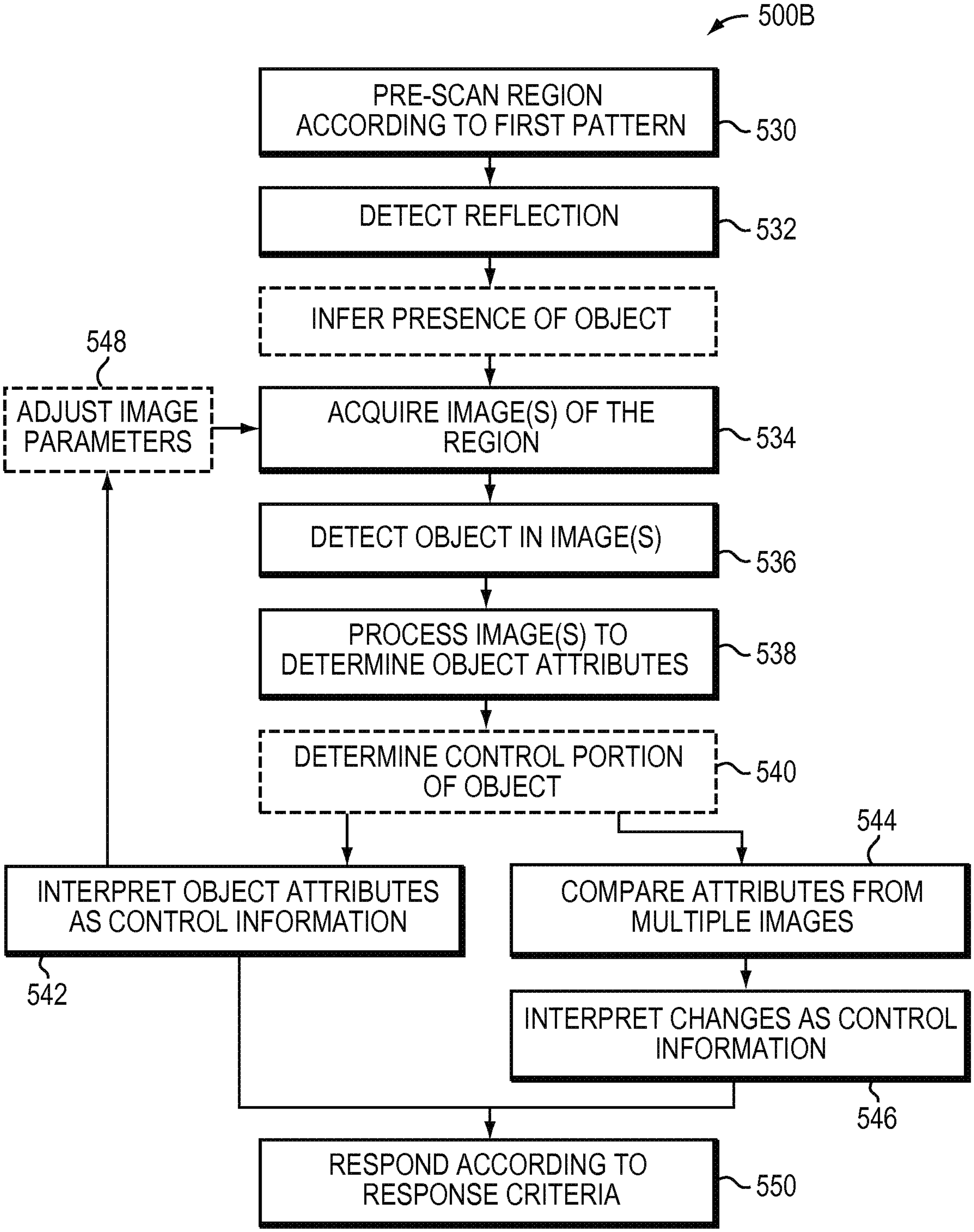
FIGS. 5B and 5C illustrate methods for detecting and monitoring a control object using both scanning and image-based sensing in accordance with various embodiments.
Figure 5C:
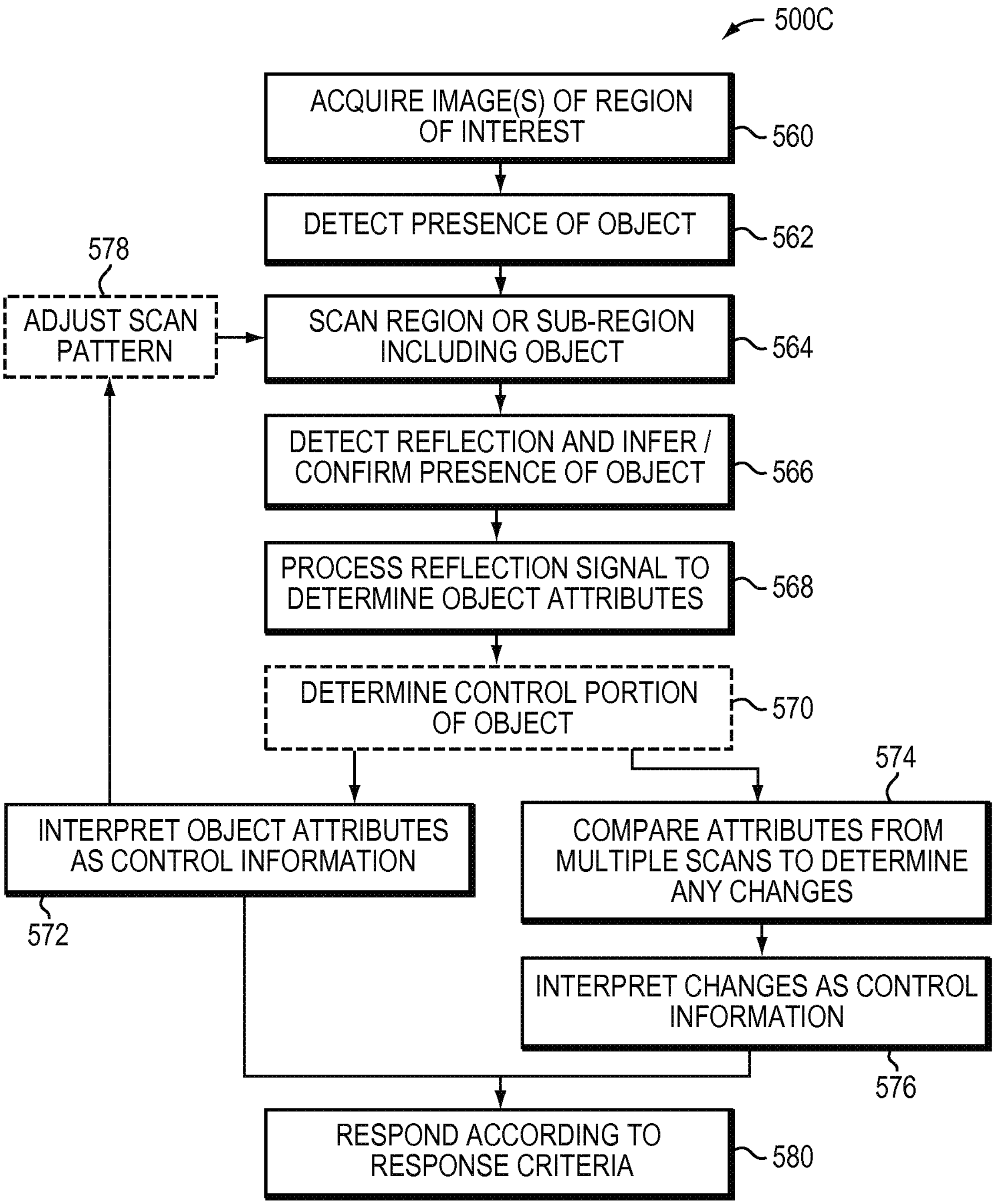

Referring now to FIGS. 5A-5C, various methods for detecting control objects and attributes and state changes thereof using systems as described above are illustrated. In one embodiment, shown by flowchart 500A in FIG. 5A, a region of interested is repeatedly scanned by spatiotemporally variable emissions, and detected reflectance signals are analyzed to identify the object and monitor its movements and other attributes. Initially, one or more pre-scans may be performed (502) to monitor the region for the presence of any objects therein. If desirable to improve the signal-to-noise ratio, signals from two or more scans may be averaged. The pre-scan(s) may be conducted at a low or moderate spatial resolution (compared with subsequent scans) in accordance with a first scan pattern. For example, a wide-angle emission may be directed successively into the four quadrants of a room. The system may be configured such that, in the absence of any object within the region, any reflection by physical boundaries of or beyond the region (e.g., walls) is low in intensity (in some embodiments below the noise threshold), whereas the presence of an object generally results in detectable reflectance signal. A full emission cycle (corresponding, e.g., to the sequential activation of all individual emitters) preferably illuminates the entire region of interest such that an object of any size anywhere within the region causes a detectable reflectance. Alternatively, if objects of interest are known a priori to have a certain minimum size, illumination of only a fraction of the region in accordance with a pattern that provides sufficiently dense coverage to resolve objects of the size of the objects of interest may be used. For instance, if the region is scanned for a person, narrow-angle emissions that scan the region at a resolution of about 10 cm (i.e., such that the emissions intercept any plane in the region of interest about every 10 cm) may suffice.

Once a reflectance has been detected (504) in a pre-scan, upon which a presence of an object can be inferred, the region may be scanned (506) in accordance with a second, higher-resolution scan pattern. This higher-resolution scan may take longer than the pre-scan, i.e., the cycle time may be increased. Alternatively, with the requisite signal-processing power available, the emission system may be operated faster, e.g., by sampling the reflection signal at a higher rate to accommodate the higher resolution without decreasing the repetition rate (i.e., increasing the cycle time) for the scan. Again, multiple of the higher-resolution scans may be averaged to improve the signal-to-noise ratio. The reflection signal of the refined scan may be used to confirm (508) the presence of an object of interest as well as determine (510) object attributes such as location, shape, configuration, surface detail, etc. In some embodiments, the object attributes may be used to identify (512) a portion of the object as the control portion. For instance, in an application context where machine control is performed by hand gestures, the system may, upon detection of a person in the region of interest, determine and analyze the person's contours to identify the person's hand or even individual fingers. Following such identification of control portions, subsequent scans may be limited to a region containing the control portion to save unnecessary computational expense.

An individual fine scan of the control object (or object portion) may by itself provide attributes sufficient to be interpreted (514) as control information to a machine or application under control. For instance, if a scan captures sufficient surface detail about a human operator's face, such information may be used to identify the operator and authorize the operator's access to the system. In many instances, however, control information is based on a plurality of scans and comparisons (516) therebetween. For example, scans (or sequences of scans that are averaged for noise-reduction purposes) may be repeated to determine object attribute sets at different points in time and facilitate comparisons (518) between these object attributes sets to detect any state changes (i.e., movements, deformations, changes in shape or configuration, etc.) of the control object. In some embodiments, the pre-scan(s) provide estimates of object attributes that allow comparisons with object attributes determined from a subsequent more refined scan, and in some embodiments, state changes are determined based on comparisons of two or more of the refined scans performed according to the second scan pattern. In yet further embodiments, the scan pattern may be varied (resulting in third, fourth, fifth patterns, etc.), e.g., to make adjustments for state changes of the control object. For example, as the control object moves, the scanned region may be moved along with it so as to track the object. As another example, if detected object attributes indicate a type of control input that requires more or less detail, finer or coarser scans may subsequently be performed by adjusting (520) the scan pattern and performing additional scan(s). Thus, control input discerned from the object attributes may be provided as feedback to the scan itself.

Additionally, the object attribute sets may be further processed and/or interpreted (522) as control information. In some embodiments, the control information includes the position or orientation of the control object relative to a programmatically defined "virtual" object, such as an engagement plane or other engagement target; see FIGS. 8A and 8B below. The control information, in turn, may be used as input to a device or application under control to elicit a response. The response is typically determined based on response criteria, which may be stored in memory accessible by the device or application under control. Response criteria allow control information to be filtered and a particular type of control information to cause different responses, depending on contextual information. Response criteria may include, e.g., the type of device or application that is being controlled; the status, mode, or settings of the device or application; the currently active user; the time of day; environmental parameters (e.g., lighting conditions, temperature, etc.); combinations thereof; and others. Possible responses include actions taken by the device or application under control (such as movement of a cursor or selection of an on-screen virtual object in response to a movement of the control object; granting of access to a secure system in response to the detection of an authorized user based on, e.g., biometric information; a physical action by a machine under control (e.g., movement of a robot part, dispensing of a fluid, printing of a document, etc.)), but also the absence of any action if the system discerns, for instance, that the detected control information was noise, an error, or can be ignored for other reasons.

FIG. 5B illustrates an embodiment in which scanning and image-based sensing functionalities are used in conjunction. Flowchart 500B of FIG. 5B shows a region of interest may initially be scanned (or pre-scanned) (530) to detect any objects of interest therein. A reflectance signal observed (532) can indicate a presence of an object in the region. Images of the region may be acquired (534). The images may be processed to locate (536) the object therein and determine (538) object attributes. For example, two or more cameras viewing the region from different vantage points may be used to image the region simultaneously to reconstruct the three-dimensional position, shape, configuration, and orientation of the object as described above with respect to FIGS. 4B-1 through 4B-3. In some embodiments, a control portion of the object is identified (540), and attributes specific to that control portion are determined. An individual set of attributes from the control object (or object portion) may by itself be sufficient to be interpreted (542) as control information to a machine or application under control. For example, if the control portion is a finger, the finger orientation or fingertip position may be computed. As another example, if the control portion is a person's face, key points and features of the face (e.g., the position of the nose tip, the distance between the eyes, the orientation of eyebrows, the curvature of the lips, etc.) can be extracted for purposes of identification of the person, characterization of a facial expression, or others. A temporal sequence of images (or pairs or multiplets of images taken with two or more cameras) may be acquired and compared (544) to track changes in the attributes of the control object or object portion. The attributes and changes thereof may be interpreted (546) as control information and used to cause a suitable response (550) by the machine or application under control, again, in general, in accordance with response criteria. The control information may also include control feedback to the imaging hardware itself. For instance, imaging parameters such as the frame rate, spatial resolution (which may be varied, e.g., by reading out only a subset of pixels or interlacing rows), noise threshold, etc. may be adjusted (548) based on the speed with which the control object moves, its size, the image contrast, and/or other object attributes.

Imaging of the region may continue until a termination criterion is satisfied, such as, e.g., when the control object has left the region, has ceased to move, or has provided control information (e.g., a characteristic gesture) indicative of deliberate termination, as determined, e.g., from the images themselves. Upon termination, the scanner hardware, which may have been idle during the imaging, may resume scanning the region. Alternatively, the scanner may continue scanning the region during the imaging, and the imaging may be controlled based thereon. For example, the scans may be used to track the location of a control object within a larger region and continuously adjust the field of view of the imaging camera(s) to center them at the object location, to detect a second control object entering the region, or to discern satisfaction of a termination criterion.

In yet another embodiment, shown by flowchart 500C in FIG. 5C, initial imaging of the region is combined with subsequent repeated scanning thereof to obtain more detailed information. For example, a wide-angle camera with a large, static field of view may acquire (560) images to "monitor" a region for any motions, foreground objects, or recognizable control objects (e.g., as stored in a library of template images) to identify possible control objects within the region. Upon detection (562) of the presence of a control object, one or more fine scans of the region, or a subregion around the object, may be conducted (564). Reflection can be detected to confirm (566) the presence of the object. Processing the reflection can determine (568) object attributes. A control portion of the object can be determined (570) from the reflection information, and attributes associated with the control portion can be interpreted (572) as control information. Alternatively, or additionally, attributes from multiple scans can be compared (574) to track changes of such object attributes. Changes in attributes can be interpreted (576) as control information and used to cause a suitable response (580) by the machine or application under control, again, in general, in accordance with response criteria. The scan parameters, such as the size and location of the subregion to be scanned or the particular scan pattern used, may depend at least in part on information from the initial imaging, and may be further adjusted (578) based on control information derived from the scans.

Imaging and scanning of a region may also be combined on equal footing, i.e., information obtained through both sensing modalities may be used in conjunction to monitor control object attributes and derive control information therefrom. The two modalities may provide redundant information, useful, e.g., for detecting error conditions in either modality, or complementary information that can increase the accuracy and/or completeness of the control information. For example, scanning may provide a means for accurately tracking the location of a fast-moving control object, while imaging the object (possibly at a much lower rate than the scan rate) with two cameras with overlapping fields of view may facilitate obtaining detailed information about the object's shape and surface features.

Figure 6A:
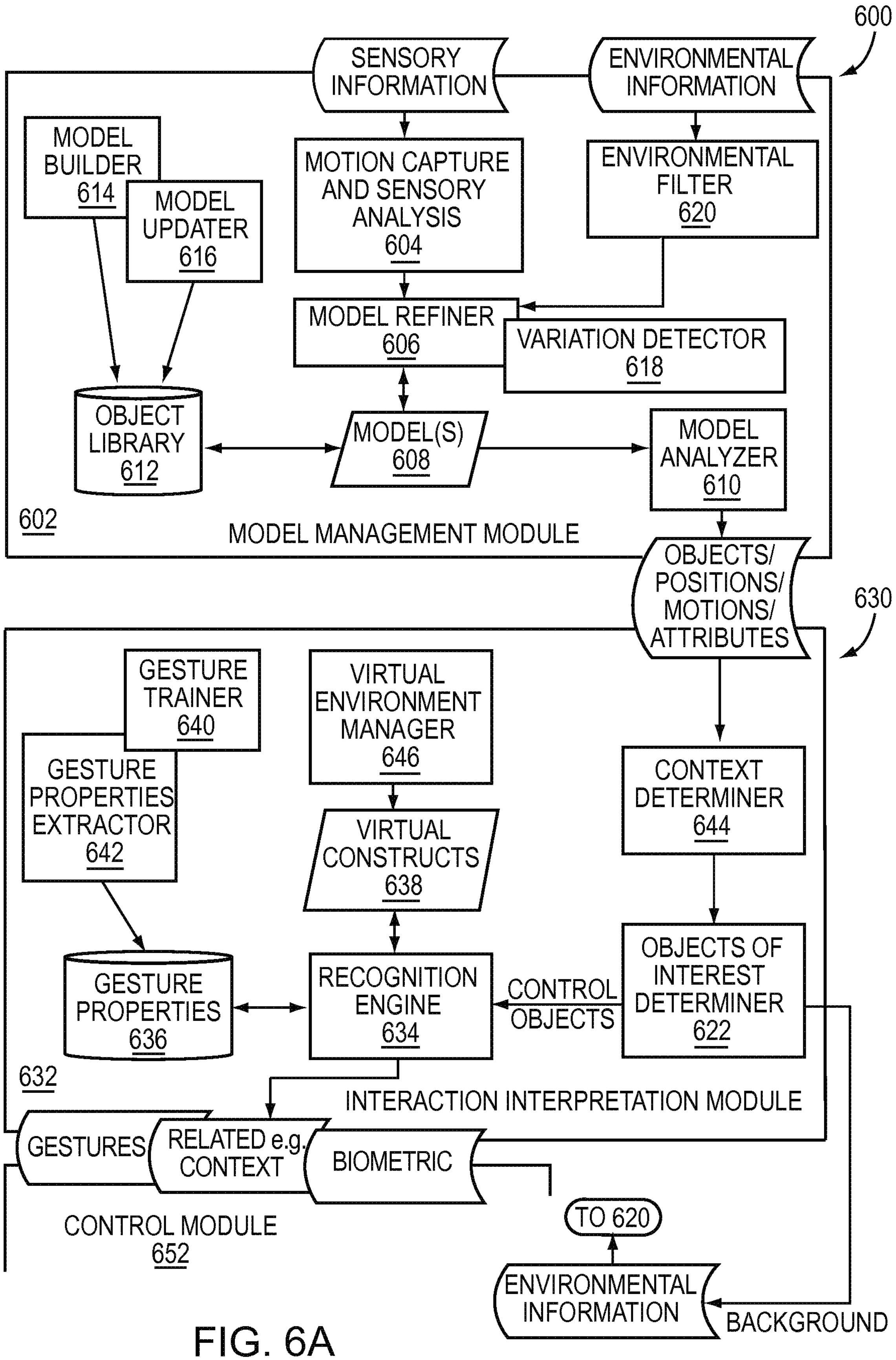
FIGS. 6A and 6B illustrate a variation determination system in accordance with various embodiments.
Figure 6B:
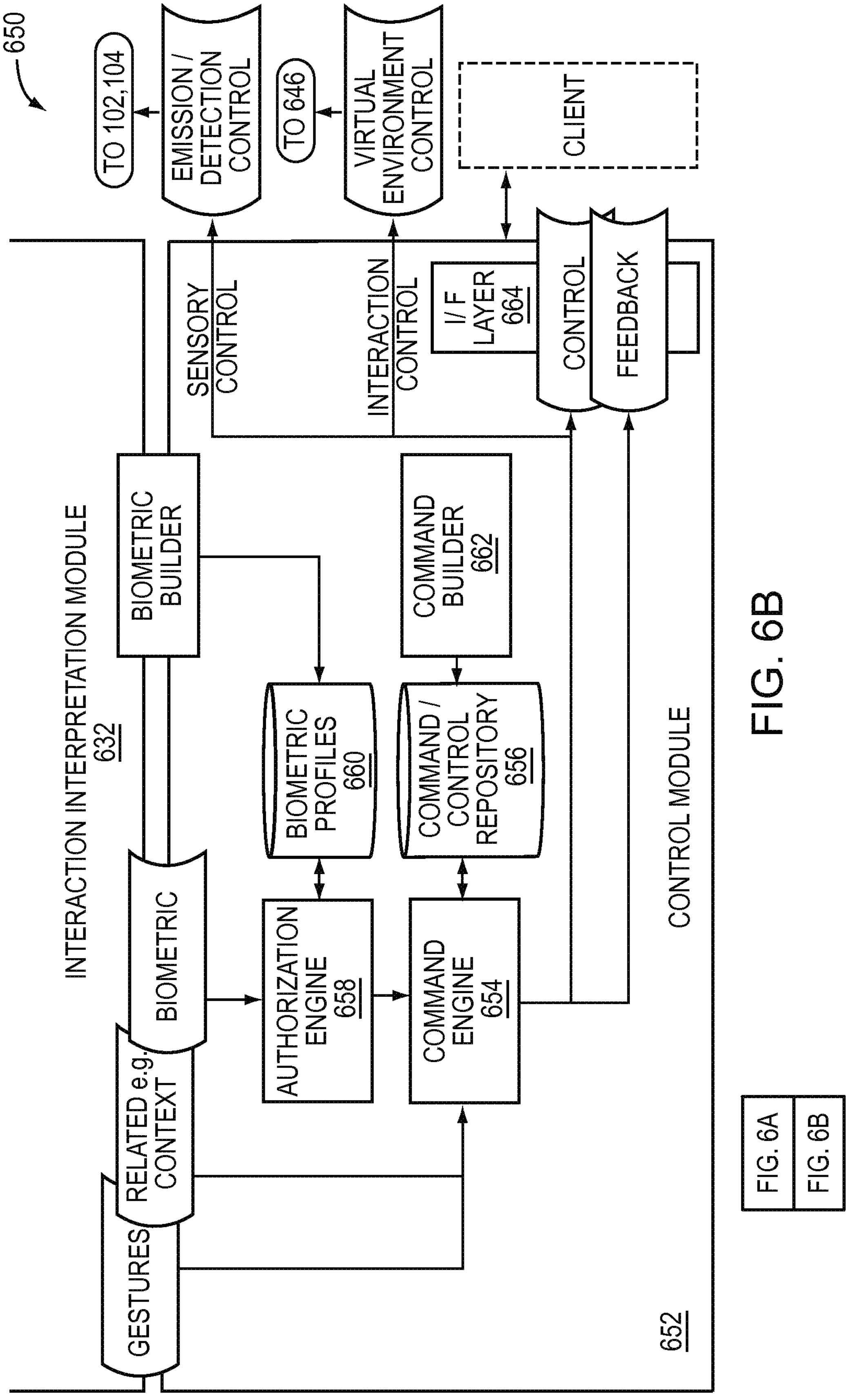

With reference to FIGS. 6A and 6B, a system for processing the reflectance signals and/or images acquired by the detection system to determine control information therefrom will now be described in detail. As shown, a variation-determination system 600 may comprise a model-management module 602 that provides functionality to build, modify, customize, and update one or more models to recognize variations in objects, positions, motions and attribute state and/or change in attribute state (of one or more attributes) from sensory information obtained from detection system 100. The model-management module 602 may model the variations in real-time as sensory information is received, or even predict variations based on a predictive model that can be updated and refined using the sensory information. A motion capture and sensory analyzer 604 finds motions (i.e., translational, rotational), conformations, and presence of objects within sensory information provided by detection system 100. The findings of motion capture and sensory analyzer 604 serve as input of sensed (e.g., observed) information from the environment with which model refiner 606 can update predictive information (e.g., models, model portions, model attributes, etc.).

The model refiner 606 may update one or more models 608 (or portions thereof) from sensory information (e.g., images, scans, other sensory-perceptible phenomena) and environmental information (i.e., context, noise, and so forth); enabling a model analyzer 610 to recognize object, position, motion, and/or attribute information that might be useful in controlling a machine. Model refiner 606 employs an object library 612 to manage objects including one or more models 608 (e.g., of user portions (e.g., hand, face), other control objects (e.g., styli, tools) or the like) (see, e.g., the models depicted in FIGS. 7A and 7B), and/or model components (e.g., shapes, 2D model portions that sum to 3D, outlines and/or outline portions (e.g., closed curves), attributes (e.g., attach points, neighbors, sizes (e.g., length, width, depth), rigidity/flexibility, torsional rotation, degrees of freedom of motion, and others), and so forth) useful to define and update models 608 and model attributes. While illustrated with reference to a particular embodiment in which models, model components, and attributes are co-located within a common object library 612, it should be understood that these objects will be maintained separately in some embodiments.

With the model-management module 602, one or more object attributes may be determined based on the detected light. Object attributes may include (but are not limited to) the presence or absence of the object; positional attributes such as the (e.g., one-, two-, or three-dimensional) location and/or orientation of the object (or locations and/or orientations of various parts thereof); dynamic attributes characterizing translational, rotational, or other forms of motion of the object (e.g., one-, two-, or three-dimensional momentum or angular momentum); physical attributes (e.g., structural or mechanical attributes such as appearance, shape, structure, conformation, articulation, deformation, flow/dispersion (for liquids), elasticity); optical properties or, more generally, properties affecting or indicative of interaction with electromagnetic radiation of any wavelength (e.g., color, translucence, opaqueness, reflectivity, absorptivity); and/or even chemical properties (as inferred, e.g., from optical properties) (such as material properties and composition).

In some embodiments, scanning the region involves multiple emission cycles. During different emission cycles, the region may (but need not) be scanned in accordance with different scan patterns. For example, an initial emission cycle may serve to detect an object, and during a subsequent cycle, a more refined scan pattern may serve to capture surface detail about the object, determining positional information for at least a portion of the object, or determining other kinds of object attributes. Multiple sequential emission cycles may also serve to detect changes in any of the object attributes, e.g., due to motion or deformation; for such differential object-attribute determinations, the same or similar scan patterns are typically used throughout the cycles. The object attributes may be analyzed to identify a potential control surface of the object.

Figure 7A:
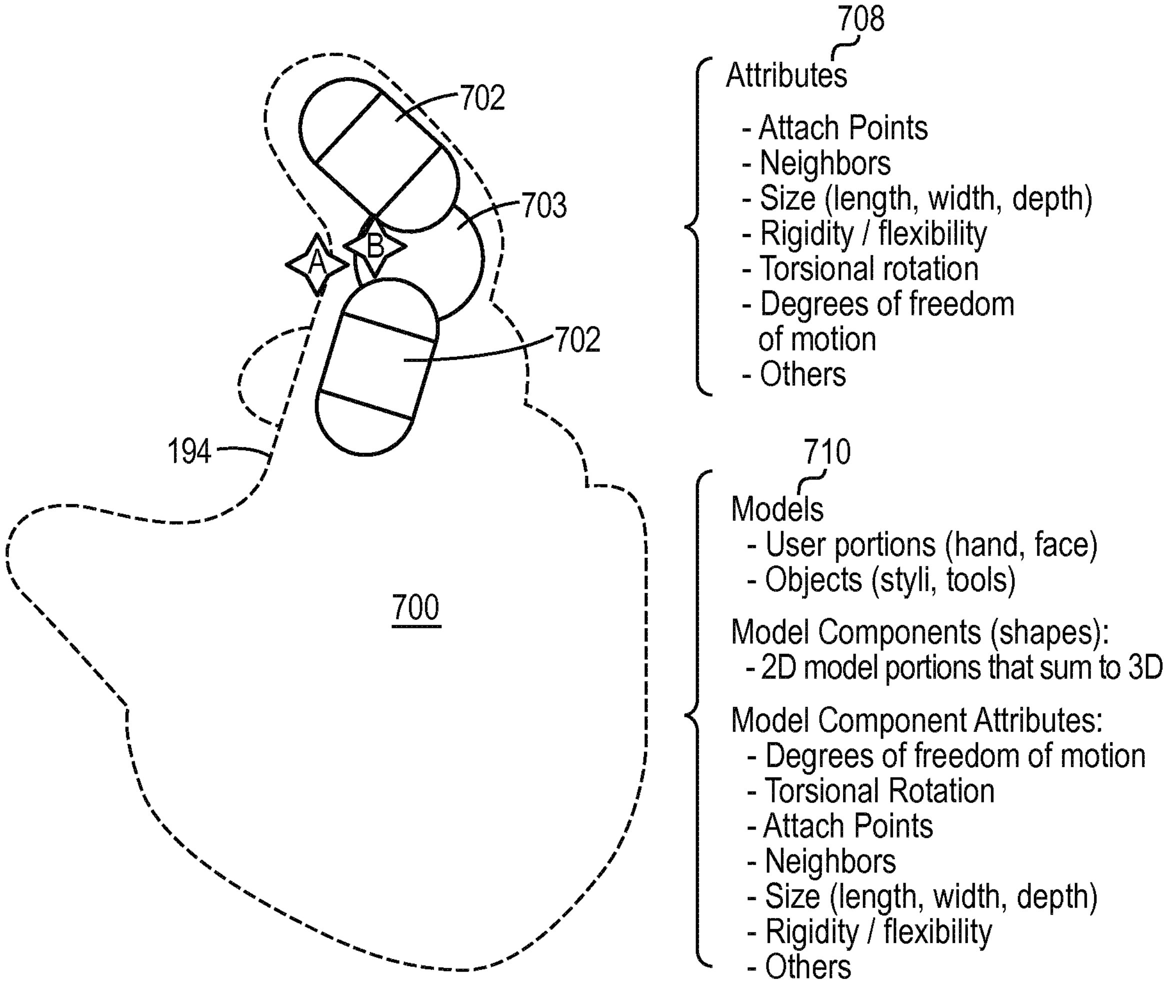
FIGS. 7A and 7B illustrate predictive information including a model in accordance with various embodiments.

FIG. 7A illustrates predictive information including a model 700 of a control object constructed from one or more model subcomponents 702, 703 selected and/or configured to represent at least a portion of a surface of control object 112, a virtual surface portion 706 and one or more attributes 708. Other components can be included in predictive information 710 not shown in FIG. 7A for clarity sake; such as models (user portions (hand, face), objects (styli, tools), model components (shapes, e.g., 2D model portions that sum to 3D), and model-component attributes (e.g., degrees of freedom of motion, torsional rotation, attach points, neighbors, size (length, width, depth), rigidity/flexibility), and others). In an embodiment, the model subcomponents 702, 703 can be selected from a set of radial solids, which can reflect at least a portion of a control object 112 in terms of one or more of structure, motion characteristics, conformational characteristics, other types of characteristics, and/or combinations thereof. In one embodiment, radial solids include a contour and a surface defined by a set of points having a fixed distance from the closest corresponding point on the contour. Another radial solid embodiment includes a set of points a fixed distance from corresponding points on a contour along a line normal thereto. In an embodiment, computational technique(s) for defining the radial solid include finding a closest point on the contour and the arbitrary point, then projecting outward the length of the radius of the solid. In an embodiment, such projection can be a vector normal to the contour at the closest point. An example radial solid (e.g., 702) includes a "capsuloid", i.e., a capsule-shaped solid including a cylindrical body and semi-spherical ends. Another type of radial solid (e.g., 703) includes a sphere. Other types of radial solids can be identified based on the foregoing teachings.

Figure 7B:
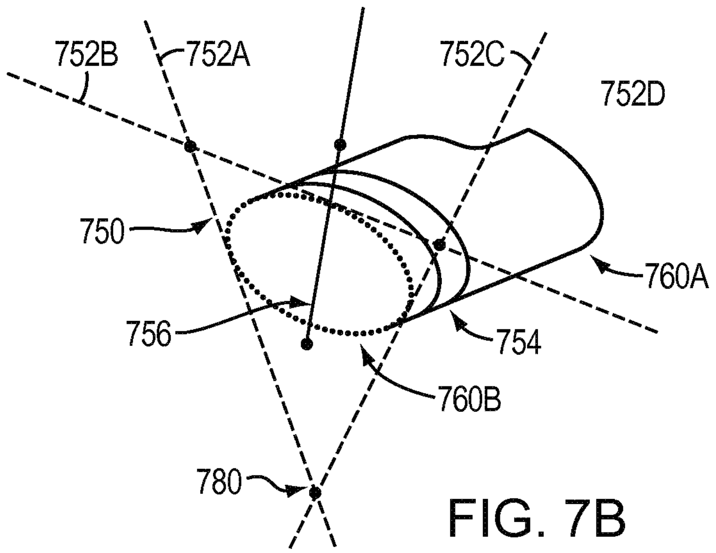

In an embodiment and with reference to FIG. 7B, updating predictive information to observed information comprises selecting one or more sets of points 750 in space surrounding or bounding the control object within a field of view of one or more image-capture device(s). As shown, points 750 can be determined using one or more sets of lines 752A, 752B, 752C, and 752D originating at vantage point(s) associated with the image-capture device(s) (e.g., FIG. 1: 130A, 130B) and determining therefrom one or more intersection point(s) defining a bounding region (i.e., region formed by lines 752A, 752B, 752C, and 752D) surrounding a cross-section of the control object. The bounding region can be used to define a virtual surface (FIG. 7A: 706) to which model subcomponents 702, 703, and 754 can be compared. The virtual surface 706 can include a visible portion 760A and a non-visible "inferred" portion 760B. Virtual surfaces 706 can include straight portions and/or curved surface portions of one or more virtual solids (i.e., model portions) determined by model refiner 606.

For example and according to one embodiment illustrated by FIG. 7B, model refiner 606 determines to model subcomponent 754 of an object portion (happens to be a finger) using a virtual solid, an ellipse in this illustration, or any of a variety of 3D shapes (e.g., ellipsoid, sphere, or custom shape) and/or 2D slice(s) that are added together to form a 3D volume. Accordingly, beginning with generalized equations for an ellipse (1) with (x, y) being the coordinates of a point on the ellipse, ($x_C$, $y_C$) the center, a and b the axes, and θ the rotation angle, the coefficients $C_1$, $C_2$ and $C_3$ are defined in terms of these parameters, as shown:

$$C_1x^2 + C_2xy + C_3y^{2-}(2C_1x_c + C_2y_c)x - (2C_3y_c + C_2x_c)y + \left(C_1x_c^2 + C_2x_cy_c + C_3y_c^2 - 1\right) = 0 \quad (1)$$

$$C_1 = \frac{\cos^2\theta}{a^2} + \frac{\sin^2\theta}{b^2}$$

$$C_2 = -2\cos\theta\sin\theta\left(\frac{1}{a^2} - \frac{1}{b^2}\right)$$

$$C_3 = \frac{\sin^2\theta}{a^2} + \frac{\cos^2\theta}{b^2}$$

The ellipse equation (1) is solved for θ, subject to the constraints that: (1) ($x_C$, $y_C$) must lie on the centerline determined from the four tangents 752A, 752B, 752C, and 752D (i.e., centerline 756 of FIG. 7B); and (2) a is fixed at the assumed value $a_0$. The ellipse equation can either be solved for θ analytically or solved using an iterative numerical solver (e.g., a Newtonian solver as is known in the art). An analytic solution can be obtained by writing an equation for the distances to the four tangent lines given a $y_C$ position, then solving for the value of $y_C$ that corresponds to the desired radius parameter $a=a_0$. Accordingly, equations (2) for four tangent lines in the x-y plane (of the slice), in which coefficients $A_i$, $B_i$ and $D_i$ (for i=1 to 4) are determined from the tangent lines 752A, 752B, 752C, and 752D identified in an image slice as described above.

$$A_1x + B_1y + D_1 = 0 \quad (2)$$

$$A_2x + B_2y + D_2 = 0$$

$$A_3x + B_3y + D_3 = 0$$

$$A_4x + B_4y + D_4 = 0$$

Four column vectors $r_{12}$, $r_{23}$, $r_{14}$ and $r_{24}$ are obtained from the coefficients $A_i$, $B_i$ and $D_i$ of equations (2) according to equations (3), in which the "\" operator denotes matrix left division, which is defined for a square matrix M and a column vector v such that M\v=r, where r is the column vector that satisfies Mr=v:

$$
\begin{aligned}
r_{13} &= \begin{bmatrix} A_1 & B_1 \\ A_3 & B_3 \end{bmatrix} \backslash \begin{bmatrix} -D_1 \\ -D_3 \end{bmatrix} \\
r_{23} &= \begin{bmatrix} A_2 & B_2 \\ A_3 & B_3 \end{bmatrix} \backslash \begin{bmatrix} -D_{21} \\ -D_3 \end{bmatrix} \\
r_{14} &= \begin{bmatrix} A_1 & B_1 \\ A_4 & B_4 \end{bmatrix} \backslash \begin{bmatrix} -D_1 \\ -D_4 \end{bmatrix} \\
r_{24} &= \begin{bmatrix} A_2 & B_2 \\ A_4 & B_4 \end{bmatrix} \backslash \begin{bmatrix} -D_2 \\ -D_4 \end{bmatrix}
\end{aligned} \tag{3}
$$

Four component vectors G and H are defined in equations (4) from the vectors of tangent coefficients A, B and D and scalar quantities p and q, which are defined using the column vectors $r_{12}$, $r_{23}$, $r_{14}$ and $r_{24}$ from equations (3).

$$
\begin{aligned}
c1 &= (r_{13} + r_{24})/2 \\
c2 &= (r_{14} + r_{23})/2 \\
\delta 1 &= c2_1 - c1_1 \\
\delta 2 &= c2_2 - c1_2 \\
p &= \delta 1/\delta 2 \\
q &= c1_1 - c1_2 * p \\
G &= Ap + B \\
H &= Aq + D
\end{aligned} \tag{4}
$$

Six scalar quantities $v_{A2}$, $v_{AB}$, $v_{B2}$, $w_{A2}$, $w_{AB}$, and $w_{B2}$ are defined by equation (5) in terms of the components of vectors G and H of equation (4).

$$
\begin{aligned}
v &= \begin{bmatrix} G_2^2 & G_3^2 & G_4^2 \\ (G_2H_2)^2 & (G_3H_3)^2 & (G_4H_4)^2 \\ H_2^2 & H_3^2 & H_4^2 \end{bmatrix} \backslash \begin{bmatrix} 0 \\ 0 \\ 1 \end{bmatrix} \\
w &= \begin{bmatrix} G_2^2 & G_3^2 & G_4^2 \\ (G_2H_2)^2 & (G_3H_3)^2 & (G_4H_4)^2 \\ H_2^2 & H_3^2 & H_4^2 \end{bmatrix} \backslash \begin{bmatrix} 0 \\ 1 \\ 0 \end{bmatrix} \\
v_{A2} &= (v_1A_1)^2 + (v_2A_2)^2 + (v_3A_3)^2 \\
v_{AB} &= (v_1A_1B_1)^2 + (v_2A_2B_2)^2 + (v_3A_3B_3)^2 \\
v_{B2} &= (v_1B_1)^2 + (v_2B_2)^2 + (v_3B_3)^2 \\
w_{A2} &= (w_1A_1)^2 + (w_2A_2)^2 + (w_3A_3)^2 \\
w_{AB} &= (w_1A_1B_1)^2 + (w_2A_2B_2)^2 + (w_3A_3B_3)^2 \\
w_{B2} &= (w_1B_1)^2 + (w_2B_2)^2 + (w_3B_3)^2
\end{aligned} \tag{5}
$$

Using the parameters defined in equations (1)-(5), solving for θ is accomplished by solving the eighth-degree polynomial equation (6) for t, where the coefficients Qi (for i=0 to 8) are defined as shown in equations (7)-(15).

$$
0 = Q_8t^8 + Q_7t^7 + Q_6t^6 + Q_5t^5 + Q_4t^4 + Q_3t^3 + Q_2t^2 + Q_1t + Q_0 \tag{6}
$$

The parameters A1, B1, G1, H1, vA2, vAB, vB2, wA2, wAB, and wB2 used in equations (7)-(15) are defined as shown in equations (1)-(4). The parameter n is the assumed semi-major axis (in other words, a0). Once the real roots t are known, the possible values of θ are defined as θ=a tan(t).

$$
\begin{aligned}
Q_8 = {} & 4A_1^2n^2v_{B2}^2 + 4v_{B2}B_1^2(1 - n^2v_{A2}) - \\
& (G_1(1 - n^2v_{A2})w_{B2} + n^2v_{B2}w_{A2} + 2H_1v_{B2})^2
\end{aligned} \tag{7}
$$

$$
\begin{aligned}
Q_7 = {} & -(2(2n^2v_{AB}w_{A2} + 4H_1v_{AB} + 2G_1n^2v_{AB}w_{B2} + 2G_1(1 - n^2v_{A2})w_{AB})) \\
& (G_1(1 - n^2v_{A2})w_{B2} + n^2v_{B2}w_{A2} + 2H_1v_{B2}) - 8A_1B_1n^2v_{B2}^2 + \\
& 16A_1^2n^2v_{AB}v_{B2} + (4(2A_1B_1(1 - n^2v_{A2}) + 2B_1^2n^2v_{AB}))v_{B2} + \\
& 8B_1^2(1 - n^2v_{A2})v_{AB}
\end{aligned} \tag{8}
$$

$$
\begin{aligned}
Q_6 = {} & -(2(2H_1v_{B2} + 2H_1v_{A2} + n^2v_{A2}w_{A2} + n^2v_{B2}(-2w_{AB} + w_{B2}) + \\
& G_1(n^2v_{B2} + 1)w_{B2} + 4G_1n^2v_{AB}w_{AB} + G_1(1 - n^2v_{A2})v_{A2})) \times \\
& (G_1(1 - n^2v_{A2})w_{B2} + n^2v_{B2}w_{A2} + 2H_1v_{B2}) - \\
& (2n^2v_{AB}w_{A2} + 4H_1v_{AB} + 2G_1n^2v_{AB}w_{B2} + 2G_1(1 - n^2v_{A2})w_{AB})^2 + \\
& 4B_1^2n^2v_{B2}^2 - 32A_1B_1n^2v_{AB}v_{B2} + \\
& 4A_1^2n^2(2v_{A2}v_{B2} + 4v_{AB}^2) + 4A_1^2n^2v_{B2}^2 + \\
& (4(A_1^2(1 - n^2v_{A2}) + 4A_1B_1n^2v_{AB} + B_1^2(-n^2v_{B2} + 1) + B_1^2(1 - n^2v_{A2})))v_{B2} + \\
& (8(2A_1B_1(1 - n^2v_{A2}) + 2B_1^2n^2v_{AB}))v_{AB} + 4B_1^2(1 - n^2v_{A2})v_{A2}
\end{aligned} \tag{9}
$$

$$
\begin{aligned}
Q_5 = {} & -(2(4H_1v_{AB} + 2G_1(-n^2v_{B2} + 1)w_{AB} + 2G_1n^2v_{AB}v_{A2} + \\
& 2n^2v_A(-2w_{AB} + w_{B2})))(G_1(1 - n^2v_{A2})w_{B2} + n^2v_{B2}w_{A2} + 2H_1v_{B2}) \\
& (2(2H_1v_{B2} + 2H_1v_{A2} + n^2v_{A2}w_{A2} + n^2v_{B2})(-2w_{AB} + w_{B2}) + \\
& G_1(-n^2v_{B2} + 1)w_{B2} + 4G_1n^2v_{AB}w_{AB} + G_1(1 - n^2v_{A2})v_{A2})) \times \\
& (2n^2v_{AB}w_{A2} + 4H_1v_{AB} + 2G_1n^2v_{AB}w_{B2} + 2G_1(1 - n^2v_{A2})w_{AB}) + \\
& 16B_1^2n^2v_{AB} - 8A_1B_1n^2(2v_{A2}v_{B2} + 4v_{AB}^2) + \\
& 16A_1^2n^2v_{A2}v_{AB} - 8A_1B_1n^2v_{B2}^2 + 16A_1^2n^2v_{AB}v_{B2}(4 \\
& (2A_1^2n^2v_{AB} + 2A_1B_1(-n^2v_{B2} + 1) + 2A_1B_1(1 - n^2v_{A2}) + 2B_1^2n^2v_{AB}))v_{B2} + \\
& (8(A_1^2(1 - n^2v_{A2}) + 4A_1B_1n^2v_{AB} + B_1^2(-n^2v_{B2} + 1) + B_1^2(1 - n^2v_{A2}))) \\
& v_{AB} + (4(2A_1B_1(1 - n^2v_{A2}) + 2B_1^2n^2v_{AB}))v_{A2}
\end{aligned} \tag{10}
$$

$$
\begin{aligned}
Q_4 = {} & \\
& (4(A_1^2(-n^2v_{B2}) + A_1^2(1 - n^2v_{A2}) + 4A_1B_1n^2v_{AB} + B_1^2(-n^2v_{B2} + 1)))v_{B2} + \\
& (8(2A_1^2n^2v_{AB} + 2A_1B_1(-n^2v_{B2} + 1) + 2A_1B_1(1 - n^2v_{A2}) + 2B_1^2n^2v_{AB})) \\
& v_{AB} + \\
& (4(A_1^2(1 - n^2v_{A2}) + 4A_1B_1n^2v_{AB} + B_1^2(-n^2v_{B2} + 1) + B_1^2(1 - n^2v_{A2}))) \\
& v_{A2} + 4B_1^2n^2(2v_{A2}v_{B2} + 4v_{AB}^2) - 32A_1B_1n^2v_{A2}v_{AB} + 4A_1^2n^2v_{A2}^2 + \\
& 4B_1^2n^2v_{B2}^2 - 32A_1B_1n^2v_{AB}v_{B2} + 4A_1^2n^2(2v_{A2}v_{B2} + 4v_{AB}^2) - \\
& (2(G_1(-n^2v_{B2} + 1)v_{A2} + n^2v_{A2}(-2w_{AB} + w_{B2}) + 2H_1v_{A2})) \\
& (G_1(1 - n^2v_{A2})w_{B2} + n^2v_{B2}w_{A2} + 2H_1v_{B2}) - (2(4H_1v_{AB} + \\
& 2G_1(-n^2v_{B2} + 1)w_{AB} + 2G_1n^2v_{AB} + 2n^2v_{AB}(-2w_{AB} + w_{A2}))) \times \\
& (2n^2v_{AB}w_{A2} + 4H_1v_{AB} + 2G_1n^2v_{AB}w_{B2} + 2G_1(1 - n^2v_{A2})w_{AB}) - \\
& {}_2(-2w_{AB} + w_{B2}) + G_1(-n^2v_{B2} + 1)w_{B2} + 4G_1n^2v_{AB} + G_1(1 - n^2v_{A2})v_{A2})^2
\end{aligned} \tag{11}
$$

$$
\begin{aligned}
Q_3 = {} & -(2(G_1(-n^2v_{B2} + 1)v_{A2} + n^2v_{A2}(-2w_{AB} + w_{B2}) + 2H_1v_{A2})) \\
& (2n^2v_{AB}w_{A2} + 4H_1v_{AB} + 2G_1n^2v_{AB}w_{B2} + \\
& 2G_1n^2v_{AB}w_{B2} + 2G_1(1 - n^2v_{A2})w_{AB}) - \\
& (2(4H_1v_{AB} + 2G_1(-n^2v_{B2} + 1)w_{AB} + 2G_1n^2v_{AB}v_{A2} + \\
& 2n^2v_{AB}(-2w_{AB} + w_{B2}))) \times \\
& (2H_1v_{B2} + 2H_1v_{A2} + n^2v_{A2}w_{A2} + n^2v_{B2}(-2w_{AB} + w_{B2}) + \\
& G_1(-n^2v_{B2} + 1)w_{B2} + 4G_1n^2v_{AB}w_{AB} + G_1(1 - n^2v_{A2})v_{A2}) +
\end{aligned} \tag{12}
$$

-continued $$16B_1^2 n^2 v_{A2} v_{AB} - 8A_1 B_1 n^2 v_{A2}^2 + 16B_1^2 n^2 v_{AB} v_{B2} - 8A_1 B_1 n^2 (2v_{A2} v_{B2} + 4v_{AB}^2) + 16A_1^2 n^2 v_{A2} v_{AB} + (4(2A_1^2 n^2 v_{AB} + 2A_1 B_1 (-n^2 v_{B2} + 1)))v_{B2} + (8(A_1^2(-n^2 v_{B2} + 1) + A_1^2(1 - n^2 v_{A2}) + 4A_1 B_1 n^2 v_{AB} + B_1({}^2 - n^2 v_{B2} + 1))) v_{AB} + (4(2A_1^2 n^2 v_{AB} + 2A_1 B_1(-n^2 v_{B2} + 1) + 2A_1 B_1(1 - n^2 v_{A2}) + 2B_1^2 n^2 v_{AB}))v_{A2}$$

$$Q_2 = 4A_1^2(-n^2 v_{B2} + 1)v_{B2} + (8(2A_1^2 n^2 v_{AB} + 2A_1 B_1(-n^2 v_{B2} + 1)))v_{AB} + (4(A_1^2(-n^2 v_{B2} + 1) + A_1^2(1 - n^2 v_{A2}) + 4A_1 B_1 n^2 v_{AB} + B_1^2(-n^2 v_{B2} + 1))) v_{A2} + 4B_1^2 n^2 v_{A2}^2 + 4B_1^2 n^2 (2v_{A2} + v_{B2} + 4v_{AB}^2) - 32A_1 B_1 n^2 v_{A2} v_{AB} + 4A_1^2 n^2 v_{A2}^2 - (2(G_1(n^2 v_{B2} + 1)w_{B2} + 4G_1 n^2 v_{AB} w_{AB} + G_1(1 - n^2 v_{A2})v_{A2}) - H_1 v_{AB} + 2G_1(-n^2 v_{B2} + 1)w_{AB} + 2G_1 n^2 v_{AB} v_{A2} + 2n^2 v_{AB}(-2w_{AB} + w_{B2}))^2 \quad (13)$$

$$Q_1 = 8A_1^2(-n^2 v_{B2} + 1)v_{AB} + (4(2A_1^2 n^2 v_{AB} + 2A_1 B_1(-n^2 v_{B2} + 1)))v_{A2} + 16B_1^2 n^2 v_{A2} v_{AB} - 8A_1 B_1 n^2 v_{A2}^2 - (2(G_1(-n^2 v_{B2} + 1)v_{A2} + n^2 v_{A2}(-2w_{AB} + w_{B2}) + 2H_1 v_{A2}))) (4H_1 v_{AB} + 2G_1(-n^2 v_{B2} + 1)w_{AB} + 2G_1 n^2 v_{AB} v_{A2} + 2n^2 v_{AB}(-2w_{AB} + w_{B2})) \quad (14)$$

$$Q_0 = 4A_1^2(-n^2 v_{B2} + 1)v_{A2} - (G_1(-n^2 v_{B2} + 1)v_{A2} + n^2 v_{A2}(-2w_{AB} + w_{B2}) + 2H_1 v_{A2})^2 + 4B_1^2 n^2 v_{A2}^2 \quad (15)$$

In this exemplary embodiment, equations (6)-(15) have at most three real roots; thus, for any four tangent lines, there are at most three possible ellipses that are tangent to all four lines and that satisfy the a=a0 constraint. (In some instances, there may be fewer than three real roots.) For each real root θ, the corresponding values of (xC, yC) and b can be readily determined. Depending on the particular inputs, zero or more solutions will be obtained; for example, in some instances, three solutions can be obtained for a typical configuration of tangents. Each solution is completely characterized by the parameters {θ, a=a0, b, (xC, yC)}. Alternatively, or additionally, referring to FIGS. 6A and 6B, a model builder 614 and model updater 616 provide functionality to define, build, and/or customize model(s) 608 using one or more components in object library 612. Once built, model refiner 606 updates and refines the model, bringing the predictive information of the model in line with observed information from the detection system 102.

The model subcomponents 702, 703, 754 can be scaled, sized, selected, rotated, translated, moved, or otherwise re-ordered to enable portions of the model corresponding to the virtual surface(s) to conform within the points 750 in space. Model refiner 606 employs a variation detector 618 to substantially continuously determine differences between sensed information and predictive information and provide to model refiner 606 a variance useful to adjust the model 608 accordingly. Variation detector 618 and model refiner 606 are further enabled to correlate among model portions to preserve continuity with characteristic information of a corresponding object being modeled, continuity in motion, and/or continuity in deformation, conformation and/or torsional rotations.

In an embodiment, when the control object morphs, conforms, and/or translates, motion information reflecting such motion(s) is included in the observed information. Points in space can be recomputed based on the new observation information. The model subcomponents can be scaled, sized, selected, rotated, translated, moved, or otherwise re-ordered to enable portions of the model corresponding to the virtual surface(s) to conform to the set of points in space.

In an embodiment, motion(s) of the control object can be rigid transformations, in which case points on the virtual surface(s) remain at the same distance(s) from one another through the motion. Motion(s) can be non-rigid transformations, in which points on the virtual surface(s) can vary in distance(s) from one another during the motion. In an embodiment, observation information can be used to adjust (and/or re-compute) predictive information, thereby enabling "tracking" the control object. In embodiments, the control object can be tracked by determining whether a rigid transformation or a non-rigid transformation occurs. In an embodiment, when a rigid transformation occurs, a transformation matrix is applied to each point of the model uniformly. Otherwise, when a non-rigid transformation occurs, an error indication can be determined, and an error-minimization technique such as described herein above can be applied. In an embodiment, rigid transformations and/or non-rigid transformations can be composed. One example composition embodiment includes applying a rigid transformation to predictive information. Then an error indication can be determined, and an error minimization technique such as described herein above can be applied. In an embodiment, determining a transformation can include calculating a rotation matrix that provides a reduced RMSD (root mean squared deviation) between two paired sets of points. One embodiment can include using Kabsch Algorithm to produce a rotation matrix. In an embodiment and by way of example, one or more force lines can be determined from one or more portions of a virtual surface.

Collisions: In an embodiment, predictive information can include collision information concerning two or more capsuloids. By means of illustration, several possible fits of predicted information to observed information can be removed from consideration based upon a determination that these potential solutions would result in collisions of capsuloids. In an embodiment, a relationship between neighboring capsuloids, each having one or more attributes (e.g., determined minima and/or maxima of intersection angles between capsuloids) can be determined. In an embodiment, determining a relationship between a first capsuloid having a first set of attributes and a second capsuloid having a second set of attributes includes detecting and resolving conflicts between first attributes and second attributes. For example, a conflict can include a capsuloid having one type of angle value with a neighbor having a second type of angle value incompatible with the first type of angle value. Attempts to attach a capsuloid with a neighboring capsuloid having attributes such that the combination will exceed what is allowed in the observed—or to pair incompatible angles, lengths, shapes, or other such attributes—can be removed from the predicted information without further consideration.

Lean Model: In an embodiment, predictive information can be artificially constrained to capsuloids positioned in a subset of the observed information—thereby enabling creation of a "lean model." For example, as illustrated in FIG. 7A, capsuloid 702 could be used to denote the portion of the observed without addition of capsuloids 703. In a yet further embodiment, connections can be made using artificial constructs to link together capsuloids of a lean model. In another embodiment, the predictive information can be constrained to a subset of topological information about the observed information representing the control object to form a lean model. In an embodiment, a lean model can be associated with a full predictive model. The lean model (or topological information, or properties described above) can be extracted from the predictive model to form a constraint. Then, the constraint can be imposed on the predictive information, thereby enabling the predictive information to be constrained in one or more of behavior, shape, total (system) energy, structure, orientation, compression, shear, torsion, other properties, and/or combinations thereof.

Figure 7C:
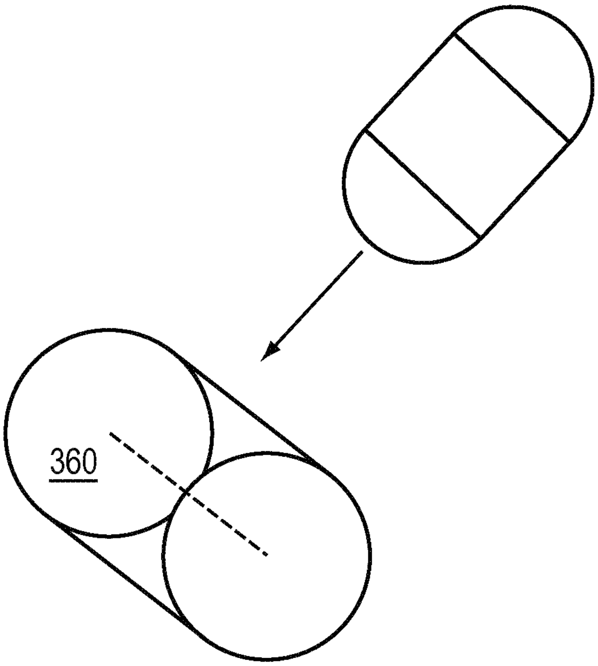
FIGS. 7C and 7D illustrate deformation using the predictive information of FIGS. 7A and 7B.
Figure 7D:
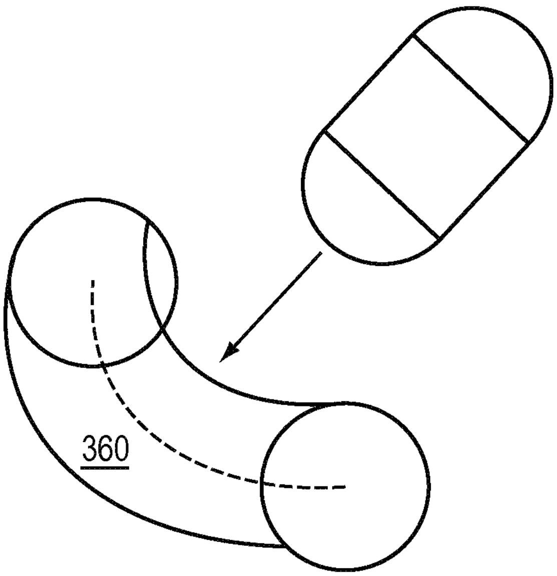

Occlusions: In an embodiment, the observed can include components reflecting portions of the control object which are occluded from view of the device ("occlusions" or "occluded components"). In one embodiment, the predictive information can be "fit" to the observed as described herein above with the additional constraint(s) that some total property of the predictive information (e.g., potential energy) be minimized or maximized (or driven to lower or higher value(s) through iteration or solution). Properties can be derived from nature, properties of the control object being viewed, others, and/or combinations thereof. In another embodiment, as shown by FIGS. 7C and 7D, a deformation of the predictive information subcomponent 760 can be allowed subject to an overall permitted value of compression, deformation, flexibility, others, and/or combinations thereof.

Friction: In an embodiment, a "friction constraint" is applied on the model 700. For example, if fingers of a hand being modeled are close together (in position or orientation), corresponding portions of the model will have more "friction". The more friction a model subcomponent has in the model, the less the subcomponent moves in response to new observed information. Accordingly, the model is enabled to mimic the way portions of the hand that are physically close together move together, and move less overall. Further detail about capsuloids, occlusion, collisions and lean models, friction and robustness can be found in U.S. Provisional Patent Application Nos. 61/871,790, filed Aug. 29, 2013, 61/873,758, filed Sep. 4, 2013, and 61/898,462, filed Oct. 31, 2013, which are hereby incorporated herein by reference in their entirety.

With renewed reference to FIGS. 6A and 6B, an environmental filter 620 reduces extraneous noise in sensed information received from the detection system 100 using environmental information to eliminate extraneous elements from the sensory information. Environmental filter 620 employs contrast enhancement, subtraction of a difference image from an image, software filtering, and background subtraction (using background information provided by objects-of-interest determiner 622 (see below) to enable model refiner 606 to build, refine, manage, and maintain model(s) 608 of objects of interest from which control inputs can be determined.

A model analyzer 610 determines that a reconstructed shape of a sensed object portion matches an object model in an object library, and interprets the reconstructed shape (and/or variations thereon) as user input. Model analyzer 610 provides output in the form of object, position, motion, and attribute information to an interaction system 630.

Figure 8A:
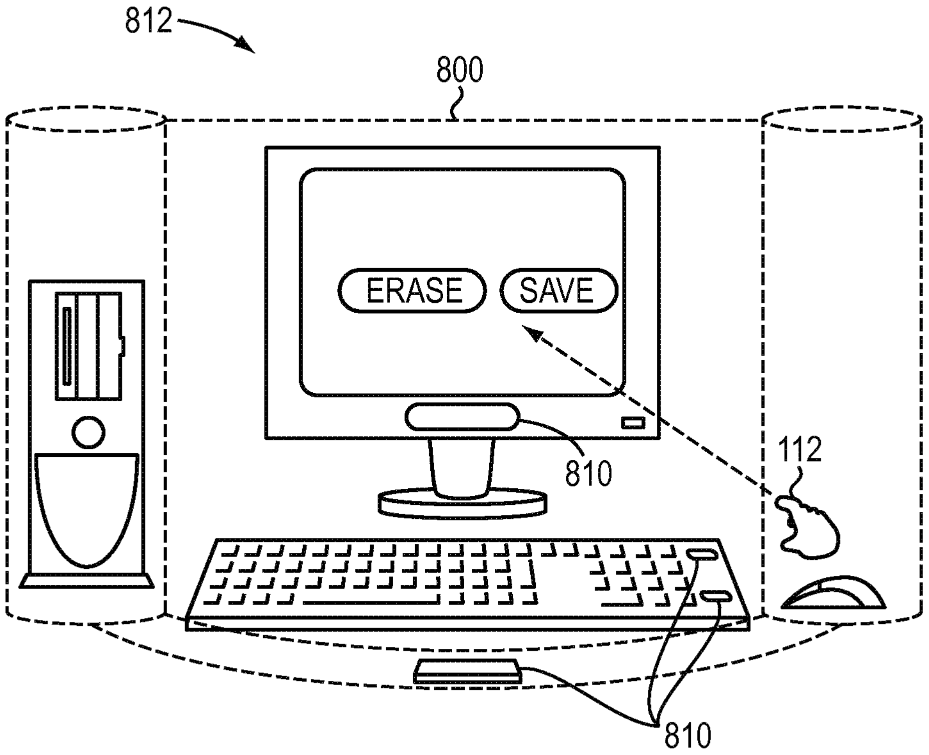
FIGS. 8A and 8B illustrate virtual constructs implementing an engagement target with which a control object interacts in accordance with various embodiments.
Figure 8B:
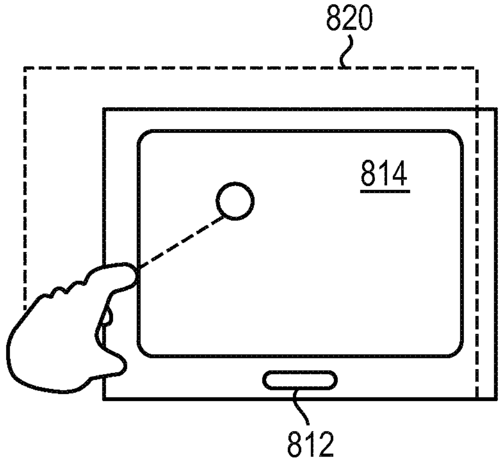

The interaction system 630 includes an interaction-interpretation module 632 that provides functionality to recognize command and other information from object, position, motion and attribute information obtained from variation system 600. An interaction-interpretation module 632 embodiment comprises a recognition engine 634 to recognize command information such as command inputs (i.e., gestures and/or other command inputs (e.g., speech, and so forth)), related information (i.e., biometrics), environmental information (i.e., context, noise, and so forth) and other information discernable from the object, position, motion, and attribute information that might be useful in controlling a machine. Recognition engine 634 employs gesture properties 636 (e.g., path, velocity, acceleration, and so forth), control objects determined from the object, position, motion, and attribute information by an objects-of-interest determiner 622 and optionally one or more virtual constructs 638 (see e.g., FIGS. 8A and 8B: 800 and 820) to recognize variations in control-object presence or motion indicating command information, related information, environmental information, and other information discernable from the object, position, motion, and attribute information that might be useful in controlling a machine. With reference to FIGS. 8A and 8B, virtual construct 800, 820 implement an engagement target with which a control object 112 interacts-enabling the machine sensory and control system to discern variations in control object (i.e., motions into, out of or relative to virtual construct 800, 820) as indicating control or other useful information. Returning to FIGS. 6A and 6B, a gesture trainer 640 and gesture-properties extractor 642 provide functionality to define, build, and/or customize gesture properties 636.

A context determiner 644 and object-of-interest determiner 622 provide functionality to determine from the object, position, motion, and attribute information objects of interest (e.g., control objects, or other objects to be modeled and analyzed) and/or objects not of interest (e.g., background), based upon a detected context. For example, when the context is determined to be an identification context, a human face will be determined to be an object of interest to the system and will be determined to be a control object. On the other hand, when the context is determined to be a fingertip control context, the finger tips will be determined to be object(s) of interest and will be determined to be control objects whereas the user's face will be determined not to be an object of interest (i.e., background). Further, when the context is determined to be a stylus (or other tool) held in the fingers of the user, the tool tip will be determined to be object of interest and a control object whereas the user's fingertips might be determined not to be objects of interest (i.e., background). Background objects can be included in the environmental information provided to environmental filter 620 of model-management module 602.

A virtual environment manager 646 provides creation, selection, modification, and de-selection of one or more virtual constructs 800, 820 (see FIGS. 8A and 8B). In some embodiments, virtual constructs (e.g., a virtual object defined in space such that variations in real objects relative to the virtual construct, when detected, can be interpreted for control or other purposes) are used to determine variations (i.e., virtual "contact" with the virtual construct, breaking of virtual contact, motion relative to a construct portion, and so forth) to be interpreted as engagements, dis-engagements, motions relative to the construct(s), and so forth, enabling the system to interpret pinches, pokes and grabs, and so forth. Interaction-interpretation module 632 provides as output the command information, related information, and other information discernable from the object, position, motion, and attribute information that might be useful in controlling a machine from recognition engine 634 to an application control system 650.

Further with reference to FIGS. 6A and 6B, an application control system 650 includes a control module 652 that provides functionality to determine and authorize commands based upon the command and other information obtained from interaction system 630.

A control module 652 embodiment comprises a command engine 654 to determine whether to issue command(s) and what command(s) to issue based upon the command information, related information, and other information discernable from the object, position, motion, and attribute information, as received from the interaction-interpretation module 632. Command engine 654 employs command/control repository 656 (e.g., application commands, OS commands, commands to the machine sensory and control system, miscellaneous commands) and related information indicating context received from the interaction-interpretation module 632 to determine one or more commands corresponding to the gestures, context, and so forth indicated by the command information. For example, engagement gestures can be mapped to one or more controls, or a control-less screen location, of a presentation device associated with a machine under control. Controls can include imbedded controls (e.g., sliders, buttons, and other control objects in an application), or environmental level controls (e.g., windowing controls, scrolls within a window, and other controls affecting the control environment). In embodiments, controls may be displayed using 2D presentations (e.g., a cursor, cross-hairs, icon, graphical representation of the control object, or other displayable object) on display screens and/or presented in 3D forms using holography, projectors, or other mechanisms for creating 3D presentations, or may be audible (e.g., mapped to sounds, or other mechanisms for conveying audible information) and/or touchable via haptic techniques.

Further, an authorization engine 658 employs biometric profiles 660 (e.g., users, identification information, privileges, and so forth) and biometric information received from the interaction-interpretation module 632 to determine whether commands and/or controls determined by the command engine 654 are authorized. A command builder 662 and biometric profile builder 660 provide functionality to define, build, and/or customize command/control repository 652 and biometric profiles 660.

Selected authorized commands are provided to machine(s) under control (i.e., "client") via interface layer 664. Commands/controls to the virtual environment (i.e., interaction control) are provided to virtual environment manager 646. Commands/controls to the emission/detection systems (i.e., sensory control) are provided to emission module 102 and/or detection module 104 as appropriate.

For example, if the control object is a hand, analysis of the hand's shape and configuration (which may be the object attributes of interest) may determine the positions of the finger tips, which may constitute the relevant control surfaces. Furthermore, changes in control attributes of the identified control surface(s), such as positional changes of the fingertips, may be analyzed to determine whether they are indicative of control information. In hand-gesture-based machine control, for instance, this may serve to discriminate between deliberate motions intended to provide control input and hand jitter or other inevitable motions. Such discrimination may be based, e.g., on the scale and speed of motion, similarity of the motions to pre-defined motion patterns stored in a library, and/or consistency with deliberate motions as characterized using machine learning algorithms or other approaches.

Further, in some embodiments, as illustrated with reference to FIGS. 8A and 8B, a hand gesture or other motion is analyzed relative to a programmatically defined engagement target (e.g., a plane, curved surface (whether open or closed), point, line, or volume whose position and location in space is well-defined and which need generally not coincide with a physical surface) to determine whether the change in the control surface is indicative of an engagement gesture. For example, if the fingertip pierces an engagement surface, this may be interpreted as a click event, or if one or more fingertips or the entire hand moves substantially parallel to an engagement surface defined relative to a display screen, this may be interpreted as a scrolling gesture. If a particular detected motion (or, more generally, change in object attributes) corresponds to control information, an appropriate response action is taken, generally in accordance with and/or based on response criteria, such as the context in which the control information was received (e.g., the particular software application active at the time, the user accessing the system, an active security level, etc.). The response may involve issuing a command (e.g., open a new document upon a "click," or shift the displayed content in response to a scrolling motion) to a user interface based on the detected gesture or motion. As illustrated in, FIGS. 8A and 8B, a machine sensory and controller system 810 can be embodied as a standalone unit(s) 810 coupleable via an interface (e.g., wired or wireless), embedded (e.g., within a machine 812, 814 or machinery under control), or combinations thereof. Further information about virtual constructs and engagement can be found in U.S. patent application Ser. No. 14/154,730, filed Jan. 14, 2014), the entire disclosure of which is hereby incorporated by reference.

Figure 9:
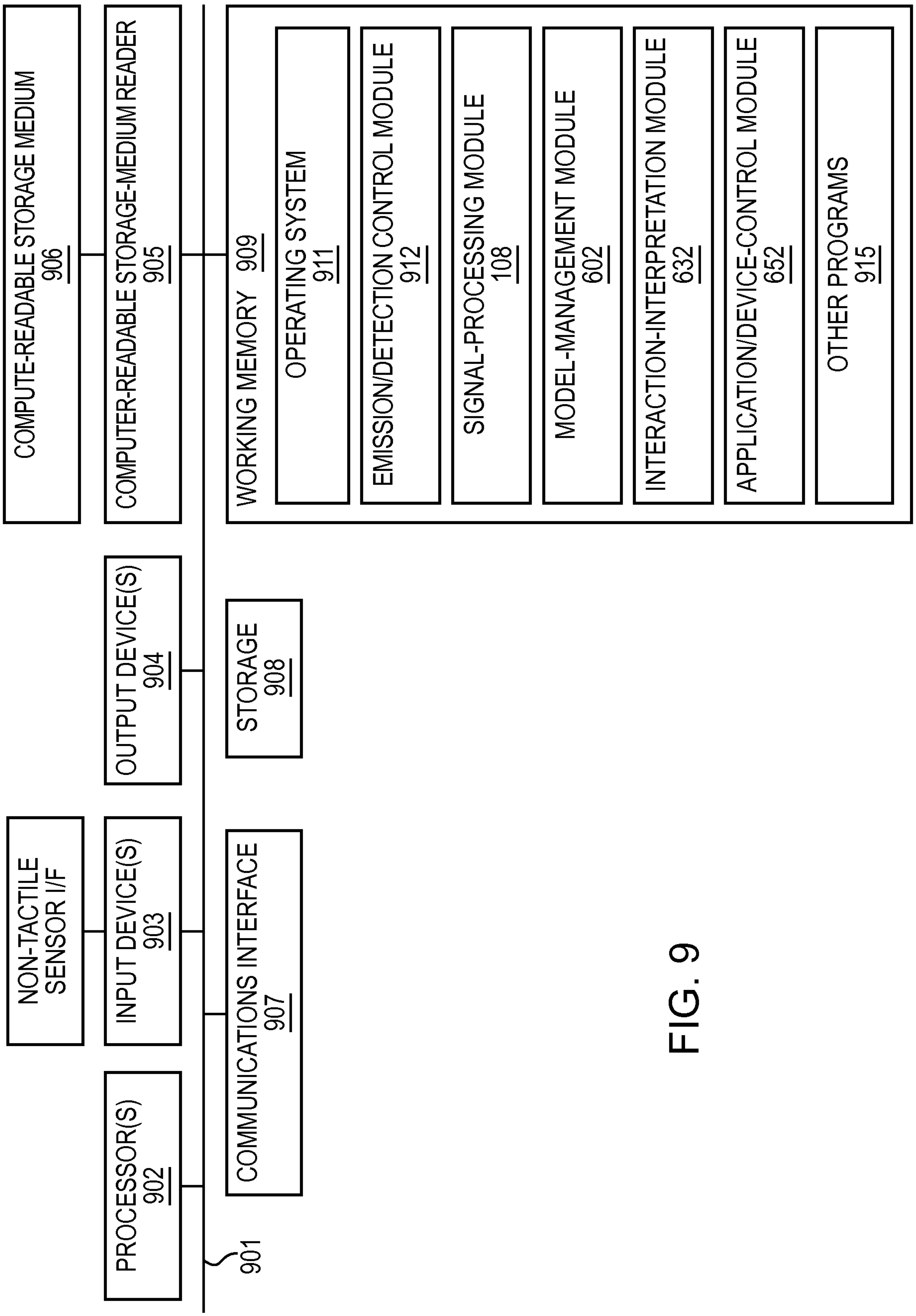
FIG. 9 illustrates a computational facility for sensory-based machine control according to embodiments, components thereof, and interrelations therebetween.

FIG. 9 illustrates an exemplary computing system 900, such as a PC (or other suitable "processing" system), that can comprise one or more of the elements of the machine sensory and control system shown in FIGS. 1 and 4 according to an embodiment. While other application-specific device/process alternatives might be utilized, such as those already noted in discussions of specific embodiments, it will be presumed for clarity sake that various systems 100, 600, 630, 650 are implemented by, or using, one or more processing systems consistent therewith, unless otherwise indicated. As shown, computer system 900 comprises elements coupled via communication channels (e.g., one or more buses 901), including one or more general-purpose or special-purpose processors 902, such as a Pentium® or Power PC®, digital signal processor ("DSP"), or other processing component. System 900 elements also include one or more input devices 903 (such as a mouse, keyboard, joystick, microphone, remote control unit, tactile, biometric or other sensors, and so on), and one or more output devices 904 (such as a suitable display, joystick feedback components, speakers, biometric or other actuators, and so on, in accordance with a particular application).

System 900 elements also include a computer-readable storage-media reader 905 coupled to a computer-readable storage medium 906, such as a storage/memory device or hard or removable storage/memory media; examples are further indicated separately as storage device 908 and non-transitory memory 909, which can include hard disk variants, floppy/compact disk variants, digital versatile disk ("DVD") variants, smart cards, read only memory, random access memory, cache memory or others, in accordance with a particular application (e.g., see data store(s) 612, 636, 656 and 660 of FIGS. 6A and 6B). One or more suitable communication devices 910 can also be included, such as a modem, DSL, infrared, etc. for providing inter-device communication directly or via suitable private or public networks, such as the Internet. Working memory 909 may load therein and/or store processor-executable instructions, programmed in any one or combination of suitable programming languages, such as, e.g., C, C++, Python, Basic, Pascal, Fortran, and/or others. The instructions may be grouped into program modules. For example, as shown, the working memory 909 may store an operating system ("OS") 911 for providing basic system-level functionality (such as file management, memory allocation, and communication with the various input/output and other hardware devices); an emission/detection control module 912 constituting or communicating with the controller 106; a signal-processing module 108; model-management, interaction-interpretation, and application/device-control modules 602, 632, 652; and other programs 915, such as application programs, mobile code, data, or other information for implementing systems 100, 600, 630, 650 elements. However, as will be readily apparent to one of skill in the art, the functionality of systems 100, 600, 630, 650 can also be grouped and organized in many alternative ways.

In general, system 900 element implementations can include hardware, software, firmware, or a suitable combination. When implemented in software (e.g., as an application program, object, downloadable, servlet, and so on, in whole or part), a system 900 element can be communicated transitionally or more persistently from local or remote storage to memory for execution, or another suitable mechanism can be utilized, and elements can be implemented in compiled, simulated, interpretive, or other suitable forms. Input, intermediate or resulting data or functional elements can further reside more transitionally or more persistently in storage media or memory (e.g., storage device 908 or memory 909) in accordance with a particular application.

Certain aspects enabled by input/output processors and other element embodiments disclosed herein (such as the determination of a potential interaction, virtual object selection, or authorization issuance) can also be provided in a manner that enables a high degree of broad or even global applicability; these can also be suitably implemented at a lower hardware/software layer. Note, however, that aspects of such elements can also be more closely linked to a particular application type or machine, or might benefit from the use of mobile code, among other considerations; a more distributed or loosely coupled correspondence of such elements with OS processes might thus be more desirable in such cases.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer-implemented method for conducting machine control, the method comprising:

coordinating (i) directing an emission cycle to a region of interest in accordance with a scan pattern, (ii) detecting a time-variable reflection signal indicative of a reflection of the emission cycle, and (iii) acquiring images of the region of interest, the directing, the detecting, and the acquiring being coordinated by controlling a variance of the scan pattern according to a detected attribute of an object, wherein the varied scan pattern varies intensities of the emission cycle according to the detected attribute of the object; and processing the time-variable reflection signal and the images to (i) determine a presence of the object and object attributes and (ii) infer machine-control information from the object attributes.

2. The computer-implemented method of claim 1, wherein the acquiring the images implements one or more cameras to acquire the images of the region of interest.

3. The computer-implemented method of claim 1, wherein the detecting the time-variable reflection signal indicative of the reflection implements a photosensitive element to detect the reflection.

4. The computer-implemented method of claim 1, wherein the detecting the time-variable reflection signal indicative of the reflection extracts the time-variable reflection signal based at least in part upon the reflection.

5. The computer-implemented method of claim 1, wherein the detected attribute of the object is at least one of a color of the object, a translucence of the object, an opacity of the object, a reflectivity of the object and an absorptivity of the object.

6. The computer-implemented method of claim 5, wherein the detected attribute of the object dictates whether a finer or coarser scan pattern is required.

7. The computer-implemented method of claim 1, further comprising:

detecting that the object is of a certain minimum size; and responsive to the detection that the object is of the certain minimum size, varying the scan pattern to cover only a fraction of the region of interest.

8. A non-transitory computer-readable recording medium having a program recorded thereon, the program, when executed by a computer, causes the computer to perform a method comprising:

coordinating (i) directing an emission cycle to a region of interest in accordance with a scan pattern, (ii) detecting a time-variable reflection signal indicative of a reflection of the emission cycle and (iii) acquiring images of the region of interest, the directing, the detecting, and the acquiring being coordinated by controlling a variance of the scan pattern according to a detected attribute of an object, wherein the varied scan pattern varies intensities of the emission cycle according to the detected attribute of the object; and processing the time-variable reflection signal and the images to (i) determine a presence of the object and object attributes and (ii) infer machine-control information from the object attributes.

9. The non-transitory computer-readable recording medium of claim 8, wherein the acquiring the images implements one or more cameras to acquire the images of the region of interest.

10. The non-transitory computer-readable recording medium of claim 8, wherein the detecting the time-variable reflection signal indicative of the reflection implements a photosensitive element to detect the reflection.

11. The non-transitory computer-readable recording medium of claim 8, wherein the detecting the time-variable reflection signal indicative of the reflection extracts the time-variable reflection signal based at least in part upon the reflection.

12. The non-transitory computer-readable recording medium of claim 8, wherein the detected attribute of the object is at least one of a color of the object, a translucence of the object, an opacity of the object, a reflectivity of the object and an absorptivity of the object.

13. The non-transitory computer-readable recording medium of claim 12, wherein the detected attribute of the object dictates whether a finer or coarser scan pattern is required.

14. The non-transitory computer-readable recording medium of claim 8, further comprising:

detecting that the object is of a certain minimum size; and responsive to the detection that the object is of the certain minimum size, varying the scan pattern to cover only a fraction of the region of interest.

15. A system for conducting machine control, the system comprising:

a controller including a processor configured to coordinate:

(i) directing an emission cycle to a region of interest in accordance with a scan pattern;

(ii) detecting a time-variable reflection signal indicative of a reflection of the emission cycle; and (iii) acquiring images of the region of interest;

the directing, the detecting, and the acquiring being coordinated by controlling a variance of the scan pattern according to a detected attribute of an object, wherein the varied scan pattern varies intensities of the emission cycle according to the detected attribute of the object; and a computational facility including a processor configured to (i) process the time-variable reflection signal and the images to determine a presence of the object and object attributes and (ii) infer machine-control information from the object attributes.

16. The system according to claim 15, wherein the acquiring the images implements one or more cameras configured to acquire the images of the region of interest.

17. The system according to claim 15, wherein the detecting the time-variable reflection signal indicative of the reflection comprises a photosensitive element configured to detect the reflection.

18. The system according to claim 15, wherein the detecting the time-variable reflection signal indicative of the reflection extracts the time-variable reflection signal based at least in part upon the reflection.

19. The system of claim 15, wherein the processor configuration of the controller includes the detected attribute of the object is at least one of a color of the object, a translucence of the object, an opacity of the object, a reflectivity of the object and an absorptivity of the object.

20. The system of claim 15, the processor configuration of the controller further comprising:

detecting that the object is of a certain minimum size; and responsive to the detection that the object is of the certain minimum size, varying the scan pattern to cover only a fraction of the region of interest.

* * * * *